(12) United States Patent
Kanamoto et al.

(10) Patent No.: US 8,581,777 B2
(45) Date of Patent: Nov. 12, 2013

(54) ELECTRONIC SCANNING RADAR APPARATUS, RECEIVED WAVE DIRECTION ESTIMATING METHOD, AND RECEIVED WAVE DIRECTION ESTIMATION PROGRAM

(75) Inventors: Junji Kanamoto, Yokohama (JP); Itaru Izumi, Yokohama (JP); Hiroyuki Akimoto, Yokohams (JP)

(73) Assignee: Honda elesys Co., Ltd., Kanagawa (JP)

( * ) Notice: Subject to any disclaimer, the term of this patent is extended or adjusted under 35 U.S.C. 154(b) by 178 days.

(21) Appl. No.: 13/175,054

(22) Filed: Jul. 1, 2011

(65) Prior Publication Data

US 2012/0038506 A1    Feb. 16, 2012

(30) Foreign Application Priority Data

Jul. 1, 2010    (JP) ................................ P2010-151046

(51) Int. Cl.
*G01S 13/00* (2006.01)

(52) U.S. Cl.
USPC .............. 342/158; 342/70; 342/118; 342/147

(58) Field of Classification Search
USPC ............ 342/70, 118, 127–128, 147, 158, 194
See application file for complete search history.

(56) References Cited

U.S. PATENT DOCUMENTS

| 5,299,148 | A * | 3/1994 | Gardner et al. ................ 702/196 |
| 7,567,201 | B2 * | 7/2009 | Miyake ........................... 342/70 |
| 7,912,680 | B2 * | 3/2011 | Shirakawa ..................... 702/196 |
| 2002/0126045 | A1 * | 9/2002 | Kishigami et al. ............ 342/417 |
| 2009/0040097 | A1 * | 2/2009 | Sakamoto et al. ............ 342/118 |
| 2009/0309784 | A1 * | 12/2009 | Natsume ....................... 342/189 |
| 2010/0134343 | A1 * | 6/2010 | Nakagawa ..................... 342/147 |

FOREIGN PATENT DOCUMENTS

| JP | 2006-047282 A | 2/2006 |
| JP | 2006-153579 A | 6/2006 |
| JP | 2006-275840 A | 10/2006 |

(Continued)

OTHER PUBLICATIONS

Navarro-Mesa, J.L.; Millan-Munoz, M.J.; Hernandez-Perez, E., "An approach to DOA estimation of wide-band sources based on AR signal modeling," Sensor Array and Multichannel Signal Processing Workshop Proceedings, 2004, vol., No., pp. 323,326, Jul. 18-21, 2004.*

(Continued)

*Primary Examiner* — John B Sotomayor
*Assistant Examiner* — Marcus Windrich
(74) *Attorney, Agent, or Firm* — Arent Fox LLP

(57) ABSTRACT

In an electronic scanning radar apparatus, a receiving unit includes a plurality of antennas receiving a reflected wave arriving from a target having reflected a transmitted wave as a received wave. A beat signal generating unit generates beat signals from the transmitted wave and the received wave. A frequency resolving unit resolves the beat signals in beat frequencies having a predetermined frequency bandwidth and calculates complex data based on the resolved beat signals for each beat frequency. An azimuth calculating unit estimates an order of a normal equation used to calculate a DOA of the received wave on the basis of eigenvalues of a primary order matrix having complex data calculated from the beat signals as elements, creates a secondary order normal equation based on the estimated order, and calculates the DOA of the received wave based on the created secondary order normal equation.

31 Claims, 41 Drawing Sheets

(56) References Cited

FOREIGN PATENT DOCUMENTS

| JP | 2009-025195 A | 2/2009 |
| JP | 2009-156582 A | 7/2009 |
| JP | 2009-162688 A | 7/2009 |

OTHER PUBLICATIONS

Ikehara and Shimamura, "Fundamentals of Digital Signals on MATLAB Multimedia Signal Processing", 2004, pp. 169-170 and 177-179, Baifukan Co., Ltd.

Kikuma, "Adaptive Antenna Technology", 2003, pp. 137-141, Ohmsha Ltd.

* cited by examiner

FIG. 5

| | ASCENDING PEAK → | | | | |
|---|---|---|---|---|---|
| | 1 | 2 | 3 | 4 | 5 |
| 1 | $r_{11}$ $v_{11}$ $pu_1$ $pd_1$ | $r_{12}$ $v_{12}$ $pu_2$ $pd_2$ | ... | | |
| 2 | $r_{21}$ $v_{21}$ $pu_1$ $pd_2$ | $r_{22}$ $v_{22}$ $pu_2$ $pd_2$ | | | |
| 3 | ... | ... | | | |
| 4 | | | | | |
| 5 | | | | | $r_{55}$ $v_{55}$ $pu_5$ $pd_5$ |

DESCENDING PEAK ↓

AFTER DBF, MATRIX IS CREATED FOR EVERY ANGLE CH

FIG. 6

| TARGET GROUP NUMBER | DISTANCE | RELATIVE VELOCITY | FREQUENCY POINT |
|---|---|---|---|
| TARGET GROUP NUMBER 1 | $r_1$ | $v_1$ | $f_1$ |
| TARGET GROUP NUMBER 2 | $r_2$ | $v_2$ | $f_2$ |
| TARGET GROUP NUMBER 3 | $r_3$ | $v_3$ | $f_3$ |
| TARGET GROUP NUMBER 4 | $r_4$ | $v_4$ | $f_4$ |
| ⋮ | | | |

FIG. 11
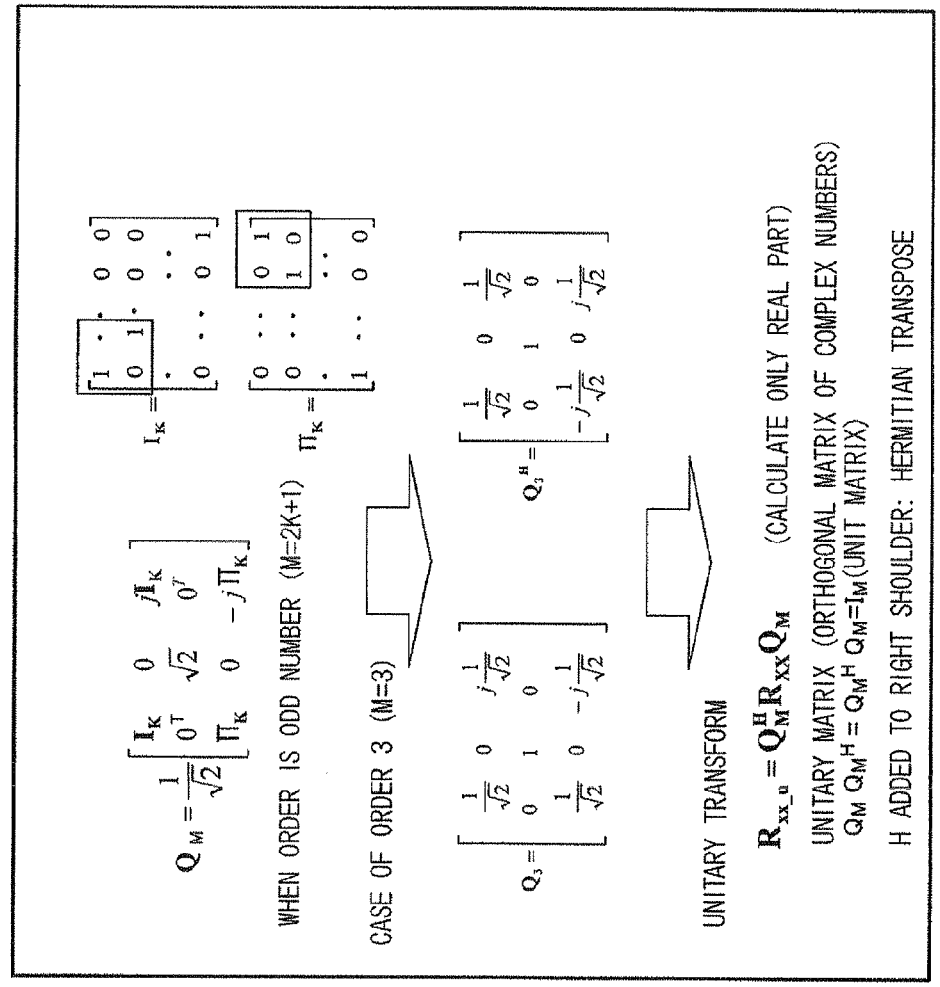
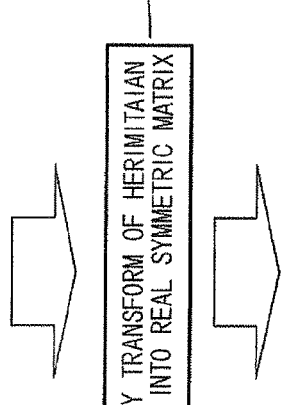

ASCENDING

|  | ANGLE 1 | ANGLE 2 | ... | FREQUENCY POINT |
|---|---|---|---|---|
| TARGET GROUP 1 | $t_1\_ang_1$ | $t_1\_ang_2$ |  | $f_1$ |
| TARGET GROUP 2 | $t_2\_ang_1$ | $t_2\_ang_2$ |  | $f_2$ |
| TARGET GROUP 3 | $t_3\_ang_1$ | $t_3\_ang_2$ |  | $f_3$ |
| TARGET GROUP 4 | $t_4\_ang_1$ | $t_4\_ang_2$ |  | $f_4$ |
| ⋮ |  |  |  |  |

DESCENT

|  | ANGLE 1 | ANGLE 2 | ... | FREQUENCY POINT |
|---|---|---|---|---|
| TARGET GROUP 1 | $t_1\_ang_1$ | $t_1\_ang_2$ |  | $f_1$ |
| TARGET GROUP 2 | $t_2\_ang_1$ | $t_2\_ang_2$ |  | $f_2$ |
| TARGET GROUP 3 | $t_3\_ang_1$ | $t_3\_ang_2$ |  | $f_3$ |
| TARGET GROUP 4 | $t_4\_ang_1$ | $t_4\_ang_2$ |  | $f_4$ |
| ⋮ |  |  |  |  |

FIG. 20

| TARGET GROUP NO. | LONGITUDINAL DISTANCE | LONGITUDINAL POSITION | LATERAL POSITION | RELATIVE VELOCITY | FREQUENCY POINT |
|---|---|---|---|---|---|
| TARGET GROUP 1 | $r_1$ | $long\_d_1$ | $late\_d_1$ | $v_1$ | $f_1$ |
| TARGET GROUP 2 | $r_2$ | $long\_d_2$ | $late\_d_2$ | $v_2$ | $f_2$ |
| TARGET GROUP 3 | $r_3$ | $long\_d_3$ | $late\_d_3$ | $v_3$ | $f_3$ |
| TARGET GROUP 4 | $r_4$ | $long\_d_4$ | $late\_d_4$ | $v_4$ | $f_4$ |
| ⋮ | | | | | |

FIG. 28

|  |  | t (GROUP) | t (PREDICTION) | t − 1 |
|---|---|---|---|---|
| TARGET 1 | r |  |  |  |
|  | Long_d |  |  |  |
|  | Late_d |  |  |  |
|  | velo |  |  |  |
|  | f_up |  |  |  |
|  | x_up_1 |  |  |  |
|  | x_up_2 |  |  |  |
|  | f_dwn |  |  |  |
|  | x_dwn_1 |  |  |  |
|  | x_dwn_2 |  |  |  |
| TARGET 2 | r |  |  |  |
|  | Long_d |  |  |  |
|  | Late_d |  |  |  |
|  | velo |  |  |  |
|  | f_up |  |  |  |
|  | x_up_1 |  |  |  |
|  | x_up_2 |  |  |  |
|  | f_dwn |  |  |  |
|  | x_dwn_1 |  |  |  |
|  | x_dwn_2 |  |  |  |
| ⋮ | ⋮ | ⋮ | ⋮ | ⋮ | r: DISTANCE
Long_d: LONGITUDINAL POSITION
Late_d: LATERL POSITION
velo: RELATIVE VELOCITY
f_up: ASCENDING PEAK FREQUENCY
x_up_1: COMPLEX DATA (FIRST) OF ASCENDING PEAK FREQUENCY
x_up_2: COMPLEX DATA (SECOND) OF ASCENDING PEAK FREQUENCY
f_dwn: DESCENDING PEAK FREQUENCY
x_dwn_1: COMPLEX DATA (FIRST) OF DESCENDING PEAK FREQUENCY
x_dwn_2: COMPLEX DATA (SECOND) OF DECENDING PEAK FREQUENCY

FIG. 35

|  |  | t (GROUP) | t (PREDICTION) | t − 1 |
|---|---|---|---|---|
| TARGET 1 | r |  |  |  |
|  | Long_d |  |  |  |
|  | Late_d |  |  |  |
|  | velo |  |  |  |
|  | f_up |  |  |  |
|  | x_up_1 |  |  |  |
|  | x_up_2 |  |  |  |
|  | f_dwn |  |  |  |
|  | x_dwn_1 |  |  |  |
|  | x_dwn_2 |  |  |  |
| TARGET 2 | r |  |  |  |
|  | Long_d |  |  |  |
|  | Late_d |  |  |  |
|  | velo |  |  |  |
|  | f_up |  |  |  |
|  | x_up_1 |  |  |  |
|  | x_up_2 |  |  |  |
|  | f_dwn |  |  |  |
|  | x_dwn_1 |  |  |  |
|  | x_dwn_2 |  |  |  |
| ⋮ | ⋮ | ⋮ | ⋮ | ⋮ | r: DISTANCE
Long_d: LONGITUDINAL POSITION
Late_d: LATERL POSITION
velo: RELATIVE VELOCITY
f_up: ASCENDING PEAK FREQUENCY
x_up_1: COMPLEX DATA (FIRST) OF ASCENDING PEAK FREQUENCY
x_up_2: COMPLEX DATA (SECOND) OF ASCENDING PEAK FREQUENCY
f_dwn: DESCENDING PEAK FREQUENCY
x_dwn_1: COMPLEX DATA (FIRST) OF DESCENDING PEAK FREQUENCY
x_dwn_2: COMPLEX DATA (SECOND) OF DECENDING PEAK FREQUENCY

FIG. 36A

ASCENDING

|  | ANGLE 1 | ANGLE 2 | ... | FREQUENCY POINT |
|---|---|---|---|---|
| TARGET GROUP 1 | $t_1\_ang_1$ | $t_1\_ang_2$ |  | $f_1$ |
| TARGET GROUP 2 | $t_2\_ang_1$ | $t_2\_ang_2$ |  | $f_2$ |
| TARGET GROUP 3 | $t_3\_ang_1$ | $t_3\_ang_2$ |  | $f_3$ |
| TARGET GROUP 4 | $t_4\_ang_1$ | $t_4\_ang_2$ |  | $f_4$ |
| ⋮ |  |  |  |  |

FIG. 36B

DESCENT

|  | ANGLE 1 | ANGLE 2 | ... | FREQUENCY POINT |
|---|---|---|---|---|
| TARGET GROUP 1 | $t_1\_ang_1$ | $t_1\_ang_2$ |  | $f_1$ |
| TARGET GROUP 2 | $t_2\_ang_1$ | $t_2\_ang_2$ |  | $f_2$ |
| TARGET GROUP 3 | $t_3\_ang_1$ | $t_3\_ang_2$ |  | $f_3$ |
| TARGET GROUP 4 | $t_4\_ang_1$ | $t_4\_ang_2$ |  | $f_4$ |
| ⋮ |  |  |  |  |

FIG. 38

| TARGET GROUP NO. | LONGITUDINAL DISTANCE | LONGITUDINAL POSITION | LATERAL POSITION | RELATIVE VELOCITY | FREQUENCY POINT |
|---|---|---|---|---|---|
| TARGET GROUP 1 | $r_1$ | $long\_d_1$ | $late\_d_1$ | $v_1$ | $f_1$ |
| TARGET GROUP 2 | $r_2$ | $long\_d_2$ | $late\_d_2$ | $v_2$ | $f_2$ |
| TARGET GROUP 3 | $r_3$ | $long\_d_3$ | $late\_d_3$ | $v_3$ | $f_3$ |
| TARGET GROUP 4 | $r_4$ | $long\_d_4$ | $late\_d_4$ | $v_4$ | $f_4$ |
| ⋮ | | | | | |

FIG. 42A

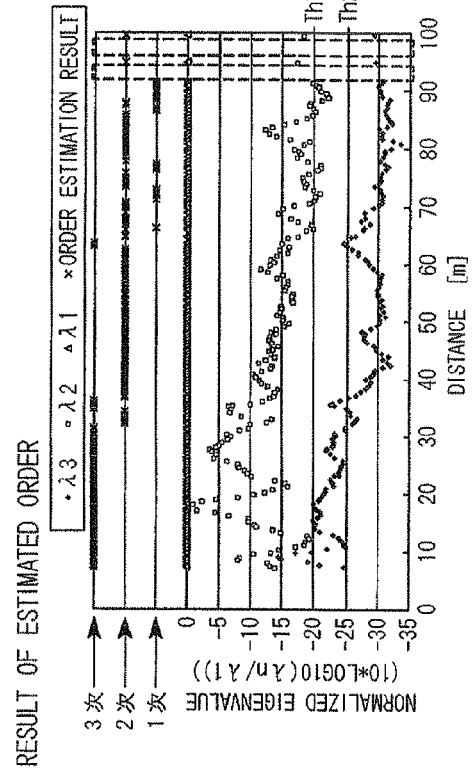

SINGLE TARGET VEHICLE

IN CASE OF SINGLE TARGET VEHICLE,
ESTIMATION WITH ORDER OF 1 OR 2 IS PREFERABLE

FIG. 42B

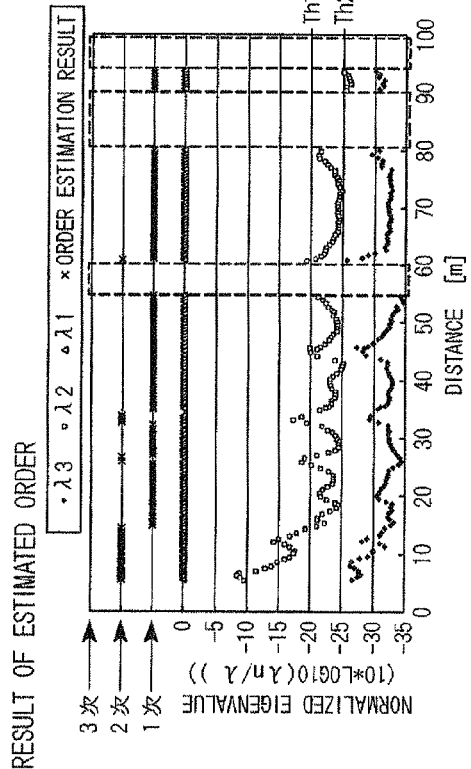

TWO TARGET VEHICLES

IN CASE OF TWO TARGET VEHICLES,
ESTIMATION WITH ORDER OF 2 OR 3 IS PREFERABLE

☐ : MAXIMUM EIGENVALUE IS EQUAL TO OR LESS THAN THRESHOLD
Th1:DETERMINATION OF NORMALIZED SECOND EIGENVALUE λ2 (ORDER =1 OR ORDER≧2)
Th2:DETERMINATION OF NORMALIZED THIRD EIGENVALUE λ3 (ORDER =2 OR ORDER=3)

ELECTRONIC SCANNING RADAR APPARATUS, RECEIVED WAVE DIRECTION ESTIMATING METHOD, AND RECEIVED WAVE DIRECTION ESTIMATION PROGRAM

BACKGROUND OF THE INVENTION

1. Field of the Invention

The present invention relates to an electronic scanning radar apparatus and a received wave direction estimating method, which can detect a target using a reflected wave from the target in response to a transmitted wave and which can be suitably used for a vehicle, and a received wave direction estimating program used therein.

Priority is claimed on Japanese Patent Application No. 2010-151046, filed Jul. 1, 2010, the content of which is incorporated herein by reference.

2. Description of Related Art

Electronic scanning type radars such as an FMCW (Frequency Modulated Continuous Wave) radar, a multi-frequency CW (Continuous Wave) radar, and a pulse radar have been known for some time.

In the radars, an arrival wave direction estimating method of an array antenna is used as a technique of detecting an arrival wave (or a received wave) from a target (a reflecting object).

As such an arrival wave direction estimating method, high-resolution (high-precision) algorithms such as an AR spectrum estimating method (FIG. 44) which can obtain high resolution without increasing the number of channels of a receiving antenna and a MUSIC (Multiple Signal Classification) method have been used. Such methods are described in Japanese Patent Application Nos. JP-A-2006-275840, JP-A-2009-156582, JP-A-2006-47282, JP-A-2009-25195, and JP-A-2009-162688, and also described in "Fundamentals of Digital Signals on MATLAB Multimedia Signal Processing," written by Ikehara and Shimamura, published by Baifukan Co., Ltd., 2004, and "Adaptive Antenna Technology," written by Kikuma, published by Ohmsha Ltd., 2003. The AR spectrum estimating method may be called a maximum entropy method (MEM) or a linear prediction method.

When an arrival wave direction from a target (a reflecting object) is estimated using such algorithms, the estimation process is performed after input data (data in which a noise component is mixed into a complex sinusoidal wave) expressed by a complex number is transformed into a matrix format of a correlation matrix.

Japanese Patent Application No. JP-A-2009-156582 describes an arrival wave direction estimating method used in an in-vehicle radar, in which a correlation matrix in a past control cycle is stored and is subjected to an averaging process (or an adding process) with a correlation matrix in the present control cycle and then a direction estimating process is performed, to suppress a noise component and to improve estimation precision.

As the number of channels of an array antenna becomes smaller, a radar apparatus becomes smaller in size and cost to be suitable for a vehicle, but the information quantity of data used for the estimation becomes more insufficient. Accordingly, even when an high-resolution algorithm is used, the estimation precision is lowered. That is, when the information quantity of data used for the estimation is insufficient, a received signal cannot be equivalently processed as an ideal sinusoidal wave, which affects the correlation process result. Accordingly, by performing an averaging process on the correlation matrix, it is possible to enhance the detection precision.

In such an algorithm, the estimation should be performed after an appropriate number of arrival waves (received waves) (model order in the case of the AR spectrum estimating method) is set. It is necessary to set an appropriate value when it is applied to an in-vehicle radar. For example, in the techniques described in Japanese Patent Application Nos. JP-A-2006-47282, JP-A-2009-25195, JP-A-2009-162688, and JP-A-2006-153579, since the algorithm such as the MUSIC method of estimating a received wave direction through the use of eigenvalue resolution is an algorithm in which a correlation matrix should be resolved in eigenvalues, the number of received waves is estimated by separating a signal component and a noise component on the basis of the magnitude relation of eigenvalues every time.

The AR spectrum estimating method is an algorithm having a relatively small computational load and can perform an azimuth estimating process on targets existing in a distance direction, which is a method suitable for use in in-vehicle radar. Compared with the MUSIC method, there is an advantage that the estimation can be performed without being sensitive to the setting of the number of received waves (=model order), and the higher model order tends to enhance the estimation precision.

However, when the number of received waves is much smaller than the set order and the noise component is great, there is a problem in that spurious peaks may appear.

"Adaptive Antenna Technology", written by Kikuma, published by Ohmsha Ltd., 2003 discloses a method of estimating the number of received waves using an AIC (Akaike Information Criterion) method, an MDL (Minimum Description Length) method, or the like. However, this does not guarantee the high-precision estimation result. Studies of the smaller number of channels and the lower order suitable for in-vehicle radar have hardly been reported.

SUMMARY OF THE INVENTION

An advantage of some aspects of the invention is that it provides an electronic scanning radar apparatus, a received wave direction estimating method, and a received wave direction estimating program, which can be easily put into practice, can set an appropriate order of an AR model, and can estimate an azimuth with high precision.

According to an aspect of the invention, there is provided an electronic scanning radar apparatus mounted on a moving object, including: a receiving unit that includes a plurality of antennas receiving a reflected wave arriving from a target having reflected a transmitted wave as a received wave; a beat signal generating unit that generates beat signals from the transmitted wave and the received wave; a frequency resolving unit that resolves the beat signals in beat frequencies having a predetermined frequency bandwidth and calculates complex data (complex number data) based on the resolved beat signals for each beat frequency; and an azimuth calculating unit that estimates an order of a normal equation used to calculate an arrival direction of the received wave on the basis of eigenvalues of a primary order matrix having complex data calculated from the beat signals as elements, creates a secondary order normal equation based on the estimated order, and calculates the arrival direction of the received wave on the basis of the created secondary order normal equation. An arrival direction may be referred to as a DOA (Direction of Arrival).

In the electronic scanning radar apparatus, the azimuth calculating unit may calculate the DOA of the received wave on the basis of the secondary order normal equation by the use of an AR spectrum estimating method using an autoregressive model.

In the electronic scanning radar apparatus, the azimuth calculating unit may calculate the eigenvalues from the primary order matrix created on the basis of the complex data calculated on the basis of the beat signals.

In the electronic scanning radar apparatus, the azimuth calculating unit may calculate the eigenvalues from a matrix as a constituent part of the primary order normal equation which has the same order as the highest order capable of being applied to the normal equation and which is the normal equation created on the basis of the complex data calculated based on the beat signals.

In the electronic scanning radar apparatus, the azimuth calculating unit may determine a correlation matrix having the same order as the highest order capable of being applied to the secondary order of the normal equation to be the primary order matrix.

In the electronic scanning radar apparatus, the azimuth calculating unit may calculate the eigenvalues from an averaged matrix obtained by averaging a plurality of primary order matrices.

In the electronic scanning radar apparatus, the azimuth calculating unit may calculate the eigenvalues from a matrix as a constituent part of an averaged normal equation obtained by averaging a plurality of primary order normal equations.

In the electronic scanning radar apparatus, the azimuth calculating unit may create the averaged matrix used to calculate the eigenvalues from the complex data acquired in a present detection cycle of detection cycles in which a process of calculating the DOA of the received wave is repeatedly performed.

In the electronic scanning radar apparatus, the azimuth calculating unit may create the averaged normal equation used to calculate the eigenvalues from the complex data acquired in the present detection cycle of the detection cycles in which a process of calculating the DOA of the received wave is repeatedly performed.

In the electronic scanning radar apparatus, the azimuth calculating unit may perform a unitary transform on the primary order matrix before calculating the eigenvalues.

In the electronic scanning radar apparatus, the azimuth calculating unit may select the secondary order on the basis of the values of the eigenvalues and may create the selected secondary order normal equation.

In the electronic scanning radar apparatus, the azimuth calculating unit may create a normal equation or an averaged normal equation which is the normal equation used to calculate the DOA of the received wave and which includes the primary order normal equation or the secondary order normal equation from the complex data acquired in the present detection cycle of the detection cycles in which a process of calculating the DOA of the received wave is repeatedly performed.

In the electronic scanning radar apparatus, the azimuth calculating unit may normalize the eigenvalues on the basis of the maximum value of the eigenvalues when a value calculated from the eigenvalues is equal to or greater than a predetermined threshold value.

In the electronic scanning radar apparatus, the value calculated from the eigenvalues may be any one of the maximum value of the eigenvalues, the sum of all the eigenvalues in the present detection cycle of the detection cycles in which a process of calculating the DOA of the received wave is repeatedly performed, and the sum of diagonal elements of the primary order matrix.

In the electronic scanning radar apparatus, the azimuth calculating unit may determine the normalized eigenvalues on the basis of a predetermined threshold value and may select the secondary order on the basis of the determination result.

In the electronic scanning radar apparatus, the azimuth calculating unit may select the secondary order on the basis of the results of determination of the value calculated from the eigenvalues using a plurality of threshold values.

In the electronic scanning radar apparatus, the azimuth calculating unit may stop an order estimating process of the secondary order normal equation on the basis of the value of the primary order matrix.

In the electronic scanning radar apparatus, the azimuth calculating unit may determine whether the order estimating process of the secondary order normal equation should be stopped on the basis of any one of the maximum value of the eigenvalues, the total sum of the eigenvalues, and the sum of diagonal elements of the primary order matrix.

In the electronic scanning radar apparatus, the azimuth calculating unit may stop the process of calculating the DOA of the received wave when the order estimating process is stopped.

In the electronic scanning radar apparatus, the azimuth calculating unit may forcibly designate the secondary order to a predetermined order when the order estimating process is stopped.

The electronic scanning radar apparatus may further include: a storage unit that stores the complex data based on the beat signals detected in a detection cycle in which a process of calculating the DOA of the received wave is repeatedly performed; and a target link unit that links the target detected in a present detection cycle and a past detection cycle previous to the present detection cycle and stores the complex data correlated with the linked target in the storage unit.

In the electronic scanning radar apparatus, the storage unit may store the distance from the linked target and the relative velocity of the linked target detected in the past detection cycle in correlation with the complex data, and the target link unit may link a target in the present detection cycle to a target which is detected in the past detection cycle corresponding to the present detection cycle in time series and which corresponds to the target in the present detection cycle.

In the electronic scanning radar apparatus, when linking targets detected in the present detection cycle and the past detection cycle, the target link unit may determine whether the targets detected in the present detection cycle and the past detection cycle correspond to each other on the basis of the determination result on whether the distance and the relative velocity acquired from the detection beat frequencies in the present detection cycle are included in a distance range and a relative velocity range calculated on the basis of the distance and the relative velocity acquired in the past detection cycle.

In the electronic scanning radar apparatus, the azimuth calculating unit may create an averaged matrix and an averaged normal equation used to calculate the eigenvalues so as to include the complex data acquired in the past detection cycle.

In the electronic scanning radar apparatus, the azimuth calculating unit may create an averaged normal equation which is a normal equation used to calculate the DOA of the received wave and which includes the primary order normal equation or the secondary order normal equation so as to include the complex data acquired in the past detection cycle.

The electronic scanning radar apparatus may further include a target detecting unit that detects peak values from intensity values of the beat frequencies to detect the presence of the target. The azimuth calculating unit may calculate the DOA of the received wave on the basis of the complex data corresponding to the target, the presence of which is detected by the target detecting unit.

The electronic scanning radar apparatus may further include a DBF unit that detects the presence and the azimuth of the target through the use of a digital beam forming process which enhances the receiving sensitivity in a desired direction to the received wave on the basis of the complex data. Here, the target detecting unit may detect the azimuth of the target on the basis of the digital beam forming process in the beat frequencies in the present detection cycle and the target link unit may link targets in the present and past detection cycles to each other on the basis of the distance, the relative velocity, and the azimuth.

The DBF unit may calculate spatial complex data indicating a spectrum intensity of each angular channel corresponding to the desired direction set on the basis of the digital beam forming process. The electronic scanning radar apparatus may further include: a channel deleting unit that recognizes the presence of a target when the spectrum intensities of the adjacent angular channels are greater than a predetermined DBF threshold value in a predetermined width range of the angular channels, replaces the spectrum intensity of an angular channel in which the presence of a target is not detected with "0", and outputs new spatial complex data; and an IDBF unit that creates reproduced complex data by performing an inverse DBF process on the new spatial complex data. Here, the normal equation creating unit may create the normal equation from the reproduced complex data.

In the electronic scanning radar apparatus, the channel deleting unit recognizes the target of which the presence is recognized as a DBF detection target and divides the spectrum for each of the angular channels corresponding to a plurality of the DBF detection targets and creates the spatial complex data corresponding to the number of DBF detection targets when the plurality of DBF detection targets are detected. The IDBF unit may create reproduced complex data for each DBF detection target by performing the inverse DBF process on the spatial complex data for each DBF detection target. The normal equation creating unit may calculate the normal equation for each DBF detection target on the basis of the reproduced complex data for each DBF detection target.

According to another aspect of the invention, there is provided a received wave direction estimating method using an electronic scanning radar apparatus mounted on a moving object, including: a receiving step of causing a receiving unit to receive a reflected wave arriving from a target having reflected a transmitted wave as a received wave through the use of a plurality of antennas; a beat signal generating step of causing a beat signal generating unit to generate beat signals from the transmitted wave and the received wave; a frequency resolving step of causing a frequency resolving unit to resolve the beat signals in beat frequencies having a predetermined frequency bandwidth and to calculate complex data based on the resolved beat signals for each beat frequency; and an azimuth detecting step of causing an azimuth calculating unit to estimate an order of a normal equation used to calculate a DOA of the received wave on the basis of eigenvalues of a primary order matrix having complex data calculated from the beat signals as elements, to create a secondary order normal equation based on the estimated order, and to calculate the DOA of the received wave on the basis of the created secondary order normal equation.

According to still another aspect of the invention, there is provided a program causing a computer to control a received wave direction estimating procedure using an electronic scanning radar apparatus mounted on a moving object, the received wave direction estimating procedure including: a receiving process of receiving a reflected wave arriving from a target having reflected a transmitted wave as a received wave through the use of a plurality of antennas; a beat signal generating process of generating beat signals from the transmitted wave and the received wave; a frequency resolving process of frequency-resolving the beat signals in beat frequencies having a predetermined frequency bandwidth and calculating complex data based on the resolved beat signals for each beat frequency; and an azimuth detecting order estimating process of a normal equation used to calculate a DOA of the received wave on the basis of eigenvalues of a primary order matrix having complex data calculated from the beat signals as elements, creating a secondary order normal equation based on the estimated order, and calculating the DOA of the received wave on the basis of the created secondary order normal equation.

BRIEF DESCRIPTION OF THE DRAWINGS

FIG. 5 is a table illustrating intersections of matrices of beat frequencies in an ascending region and a descending region and intersections of the matrices in a peak combining unit, that is, distances and relative velocities in combinations of beat frequencies in an ascending region and a descending region;

FIG. 6 is a table illustrating a distance, a relative velocity, and a frequency point for each target in the present detection cycle;

FIG. 11 is a diagram illustrating calculation of eigenvalues;

FIG. 20 is a diagram illustrating a table storing fixed peak pairs in an ascending region and a descending region;

FIG. 28 is a diagram illustrating a table stored in a memory;

FIG. 35 is a diagram illustrating a table stored in a memory of the eighth embodiment;

FIG. 36A is a diagram illustrating a table stored in the memory of the eighth embodiment;

FIG. 36B is a diagram illustrating a table stored in the memory in the eighth embodiment;

FIG. 38 is a diagram illustrating a table stored in a memory;

FIG. 42A is a diagram illustrating a model order estimation characteristic of the electronic scanning radar apparatus according to the first to tenth embodiments (one target vehicle);

FIG. 42B is a diagram illustrating a model order estimation characteristic of the electronic scanning radar apparatus according to the first to tenth embodiments (two target vehicles);

DETAILED DESCRIPTION OF THE INVENTION (AR Spectrum Estimation)

Hereinafter, an AR spectrum estimating method applied to embodiments of the invention will be described.

In the AR spectrum estimating method, an estimation process is performed using an AR model (Autoregressive model). This is a spectrum estimating method of estimating a spectrum in the same way as the MUSIC method and is described in "Fundamentals of Digital Signals on MATLAB Multimedia Signal Processing", written by Ikehara and Shimamura, published by Baifukan Co., Ltd., 2004. The AR spectrum estimating method is classified into a parametric method, when the MUSIC method is classified into a partial space method. The AR spectrum estimating method may be referred to as a maximum entropy method or a linear prediction method, which is included in the classification of the parametric method.

Figure 44:
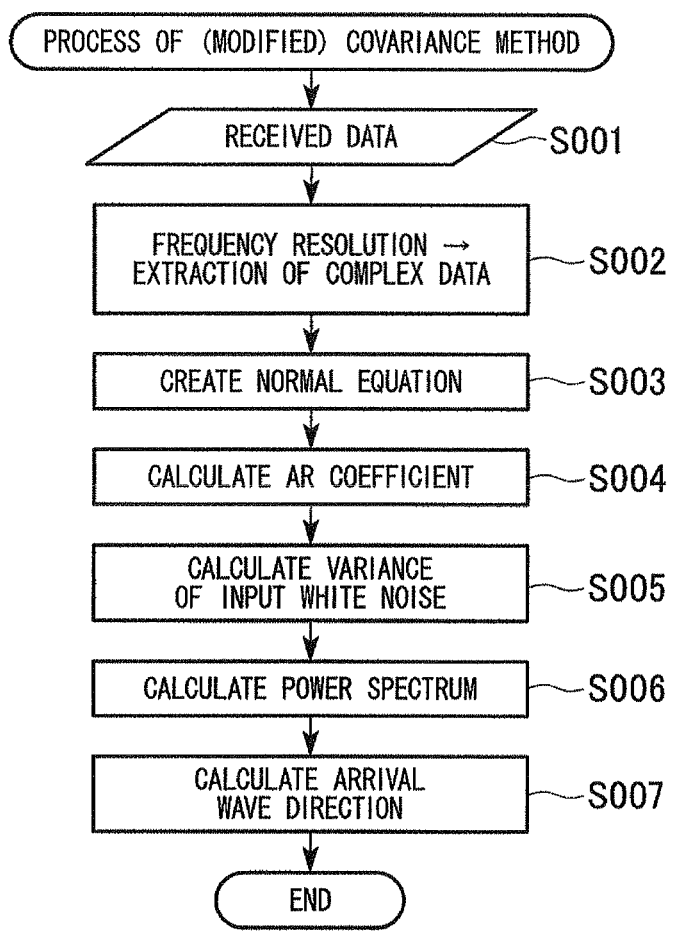
FIG. 44 is a diagram illustrating an AR spectrum estimating process in the related art.

In the AR spectrum estimating method, first, an object is modeled using an AR model expressed in a linear format and a normal equation is created on the basis of input data. The normal equation includes a matrix (correlation matrix) referred to as a self-correlation matrix and a vector (right-hand vector) referred to as a covariance matrix and a right-hand vector or a cross-correlation vector. The coefficient of an AR filter (AR coefficient) and the variance value of input white noise are calculated on the basis of the normal equation and then a power spectrum is calculated and estimated using the AR coefficient and the variance value of the input white noise. The procedure is shown in FIG. 44. Channel data in spatial directions like the radar of the invention as well as time-series data can be used as the input data. The AR spectrum estimating method is roughly divided into a method using a self-correlation matrix and a method using a covariance matrix. Examples of the method using a self-correlation matrix include a self-correlation method (or a Yule-Walker method) and a Berg method. Examples of the method using a covariance matrix include a covariance method and a modified covariance method. The modified covariance method is also referred to as a forward and backward linear prediction method. Any method is an algorithm of creating a normal equation and calculating an AR coefficient.

First Embodiment

Hereinafter, an electronic scanning radar apparatus (FMCW millimeter wave radar) according to a first embodiment of the invention will be described with reference to the accompanying drawings.

Figure 1:
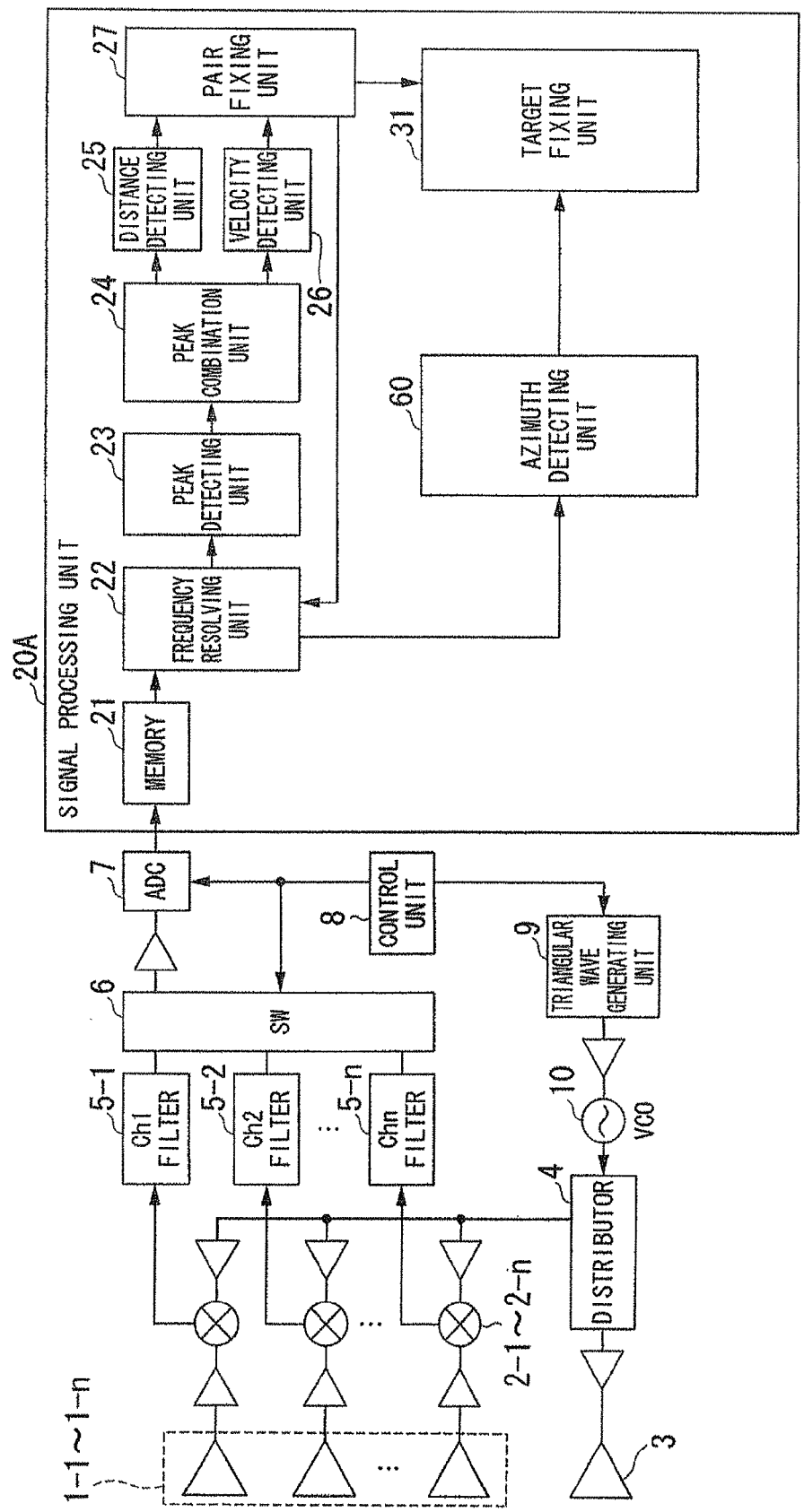
FIG. 1 is a block diagram illustrating the configuration of an electronic scanning radar apparatus according to a first embodiment of the invention.

FIG. 1 is a block diagram illustrating the configuration of the electronic scanning radar apparatus according to the first embodiment.

In the drawing, the electronic scanning radar apparatus according to the first embodiment includes receiving antennas 1-1 to 1-$n$, mixers 2-1 to 2-$n$, a transmitting antenna 3, a distributor 4, filters 5-1 to 5-$n$, a SW (switch) 6, an ADC (A/D converter) 7, a control unit 8, a triangular wave generating unit 9, a VCO 10, and a signal processing unit 20A.

The signal processing unit 20A includes a memory 21, a frequency resolving unit 22, a peak detecting unit 23, a peak combining unit 24, a distance detecting unit 25, a velocity detecting unit 26, a pair fixing unit 27, a target fixing unit 31, and an azimuth detecting unit 60. The azimuth detecting unit 60A may be referred to as an azimuth calculating unit.

The operation of the electronic scanning radar apparatus according to the first embodiment will be described below with reference to FIG. 1.

The receiving antennas 1-1 to 1-$n$ receive a reflected wave arriving from a target as a received wave by causing a transmitted wave to be reflected by the target.

The mixers 2-1 to 2-$n$ mix signals acquired by amplifying the transmitted wave transmitted from the transmitting antenna 3 and the received wave received by the receiving antennas 1-1 to 1-$n$ through the use of an amplifier and generate beat signals corresponding to frequency differences.

The transmitting antenna 3 transmits a transmission signal, which is acquired by frequency-modulating a triangular wave signal generated by the triangular wave generating unit 9 by the use of the VCO (Voltage-Controlled Oscillator) 10, to a target as the transmitted wave.

The distributor 4 distributes the frequency-modulated transmission signal from the VCO 10 to the mixers 2-1 to 2-$n$ and the transmitting antenna 3.

The filters 5-1 to 5-$n$ limit bands of the beat signals of Ch1 to Ch$n$, which are generated by the mixers 2-1 to 2-$n$, corresponding to the receiving antennas 1-1 to 1-$n$ and output band-limited beat signals to the SW (switch) 6.

The SW 6 sequentially switches the beat signal of Ch1 to Ch$n$, which have passed through the filters 5-1 to 5-$n$, corresponding to the receiving antennas 1-1 to 1-$n$ and outputs the beat signals to the ADC (A/D converter) 7, in response to a sampling signal input from the control unit 8.

The ADC 7 converts the beat signal of Ch1 to Ch$n$, which are input from the SW 7 in synchronization with the sampling signal, corresponding to the receiving antennas 1-1 to 1-$n$ into digital signals in synchronization with the sampling signal and sequentially stores the digital signals in a waveform storage area of the memory 21 in the signal processing unit 20.

The control unit 8 is constructed by a micro computer or the like and controls the entire electronic scanning radar apparatus shown in FIG. 1 on the basis of a control program stored in a ROM (not shown) or the like.

(Detection Principle of Distance, Relative Velocity, Angle (Azimuth))

The principle of detecting the distance, the relative velocity, and the angle (azimuth), which are used in the signal processing unit 20, between the electronic scanning radar apparatus according to the first embodiment and a target will be described in detail below with reference to the accompanying drawings.

Figure 2A:
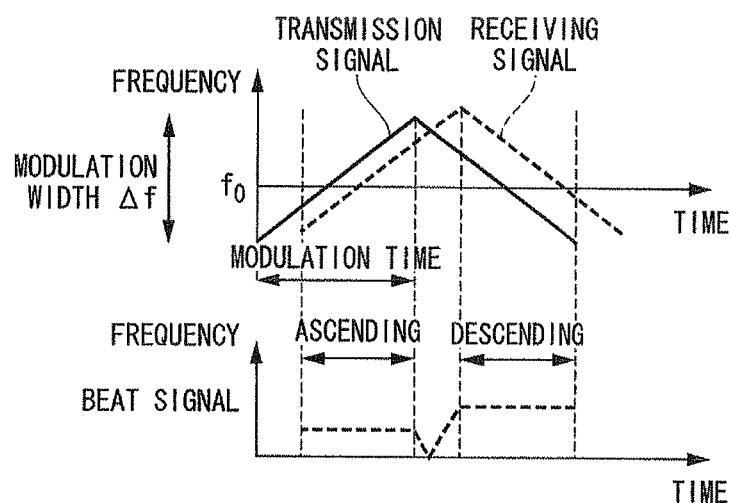
FIG. 2A is a diagram illustrating a state in which a transmitted signal and a received signal reflected from a target are input.

FIG. 2A is a diagram illustrating a state in which a transmission signal and a received signal reflected from a target are input.

The signals shown in the drawing are the transmission signal acquired by frequency-modulating a signal generated by the triangular wave generating unit 9 shown in FIG. 1 by the use of the VCO 10 and the received signal received by causing the transmission signal to be reflected by the target. In the example shown in the drawing, the number of targets is one.

Figure 2B:
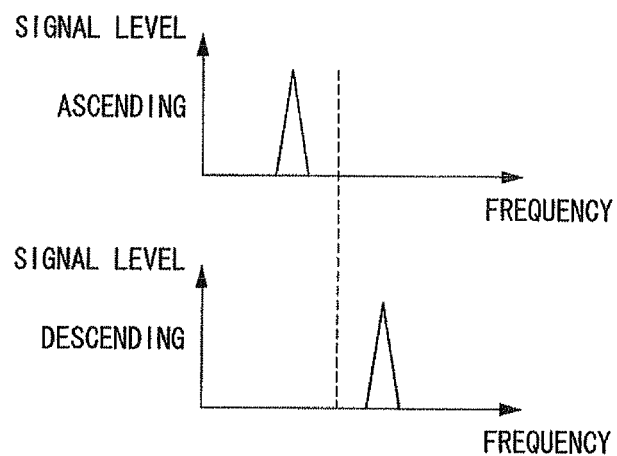
FIG. 2B is a diagram illustrating a state in which beat signals acquired in FIG. 2A are frequency-transformed.

As can be seen from FIG. 2A, the received signal which is a reflected wave from the target is received with a delay in a right-hand direction (time delay direction) with respect to the transmission signal. The time delay is proportional to the distance between the electronic scanning radar apparatus and the target. The received signal is shifted with respect to the transmission signal in the vertical direction (frequency direction) in proportion to the relative velocity between the electronic scanning radar apparatus and the target. When the beat signals acquired in FIG. 2A are frequency-transformed through the use of a Fourier transform, a DTC, a Hadamard transform, a wavelet transform, or the like, one peak value is generated in each of an ascending region and a descending region in the case of a single target. The result is shown in FIG. 2B. In FIG. 2B, the horizontal axis represents the frequency and the vertical axis represents the intensity.

The frequency resolving unit 22 frequency-transforms the ascending region (ascending) and the descending region (descending) of the triangular wave into discrete times through the use of frequency resolution, for example, the Fourier transform, on the basis of sampled data of the beat signals stored in the memory 21. That is, frequency resolving unit 22 resolves the beat signals into beat frequencies having a predetermined frequency bandwidth and calculates complex data (complex number data) based on the beat signals resolved for each beat frequency.

As a result, as shown in FIG. 2B, a graph of signal levels for the resolved beat frequencies in the ascending region and the descending region is obtained.

The peak detecting unit 23 detects the peak value from the signal level for each beat frequency shown in FIG. 2B and detects the presence of a target. The peak detecting unit 23 outputs the beat frequencies (both the ascending region and the descending region) of the peak values as target frequencies.

The distance detecting unit 25 calculates the distance between the electronic scanning radar apparatus and the target using the following expression on the basis of the target frequency fu of the ascending region and the target frequency fd of the descending region input from the peak combining unit 24.

$r = \{C \cdot T/(2 \cdot \Delta f)\} \cdot \{(fu+fd)/2\}$

The velocity detecting unit 26 calculates the relative velocity between the electronic scanning radar apparatus and the target using the following expression on the basis of the target frequency fu of the ascending region and the target frequency fd of the descending region input from the peak combining unit 24.

$$v=\{C/(2 \cdot f0)\} \cdot \{(fu-fd)/2\}$$

In the expressions, r represents the distance, v represents the relative velocity, C represents the light velocity, $\Delta f$ represents the frequency modulation width of a triangular wave, f0 represents the central frequency of the triangular wave, T represents the modulation time (ascending region/descending region), fu represents the target frequency of the ascending region, and fd represents the target frequency of the descending region.

The receiving antennas 1-1 to 1-n in the first embodiment will be described below.

Figure 3:
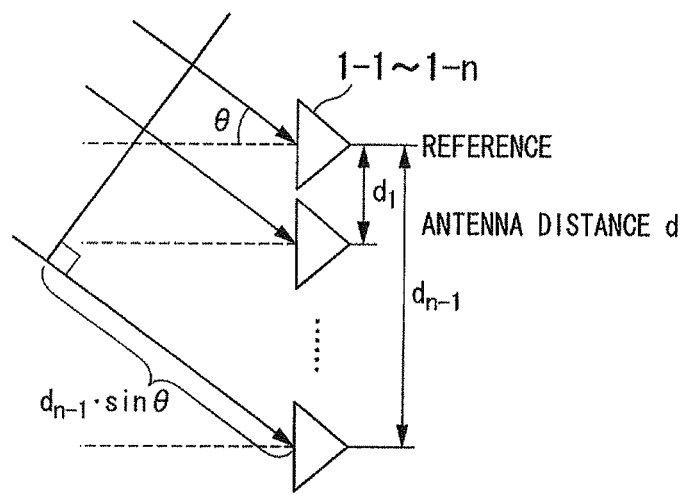
FIG. 3 is a conceptual diagram illustrating a received wave in a receiving antenna.

FIG. 3 is a conceptual diagram illustrating the received wave in the receiving antennas.

As shown in the drawing, the receiving antennas 1-1 to 1-n are arranged in an array with a pitch $d_1$. The received wave (incident wave or arrival wave) is incident on receiving antennas 1-1 to 1-n from the direction of angle θ about the axis perpendicular to the plane in which the antennas are arranged. That is, the arrival wave (incident wave) from the target, that is, the reflected wave from the target in response to the transmitted wave transmitted from the transmitting antenna 3, is input to the receiving antennas 1-1 to 1-n.

At this time, the arrival antenna is received with the same angle by the receiving antennas 1-1 to 1-n.

A phase difference "$d_{n-1} \cdot \sin \theta$" calculated by the same angle, for example, the angle θ and the pitch $d_1$ between the antennas, appears between the adjacent receiving antennas.

The angle θ can be detected through the use of a signal process such as a digital beam forming (DBF) or a high-resolution algorithm of additionally Fourier-transforming the values, which are subjected to the frequency resolution in the time direction for each antenna, in the antenna direction.

(Signal Process on Received Wave in Signal Processing Unit)

The memory 21 stores the time-series data (the ascending region and the descending region) of the received signal, which is subjected to the A/D conversion by the ADC 7, in a waveform storage area in correlation with the receiving antennas 1-1 to 1-n. For example, when 256 pieces of data are sampled from the ascending region and the descending region, data pieces of 2×256× antenna number are stored in the waveform storage area.

The frequency resolving unit 22 transforms the beat signals corresponding to Ch1 to Chn (the antennas 1-1 to 1-n) into frequency components with a predetermined resolution, for example, through the use of the Fourier transform. Accordingly, frequency resolving unit 22 outputs frequency points indicating the beat frequencies and complex data of the beat frequencies. For example, when each of the ascending region and the descending region of each antenna has 256 sampled data pieces, the frequency resolving unit 22 transforms the data pieces into beat frequencies as complex frequency-domain data of the antennas and generates 128 pieces of complex data for each of the ascending region and the descending region (2×128× antenna number). The beat frequencies are indicated by the frequency points.

Here, the phase difference depending on the angle θ exists in the complex data for the antennas. The absolute values (receiving intensities or amplitudes) of the complex data pieces in the complex plane are equivalent to each other.

The peak detecting unit 23 detects the beat frequencies having a peak value greater than a predetermined value from the peaks of the signal intensities (or amplitudes) using the peak values of the intensities in the ascending region and the descending region of the triangular wave of the frequency-transformed beat frequencies and the complex data. Accordingly, the presence of a target for each beat frequency is detected and the target frequency is selected.

Therefore, the peak detecting unit 23 generates a frequency spectrum from the complex data for any one antenna or the sum of the complex value of the overall antennas. Accordingly, the peaks of the spectrum can be detected as the presence of a target depending on the beat frequencies, that is, the distance from the electronic scanning radar apparatus. By adding the complex data of the overall antennas, the noise component is averaged and the S/N ratio is improved.

Figure 4A:
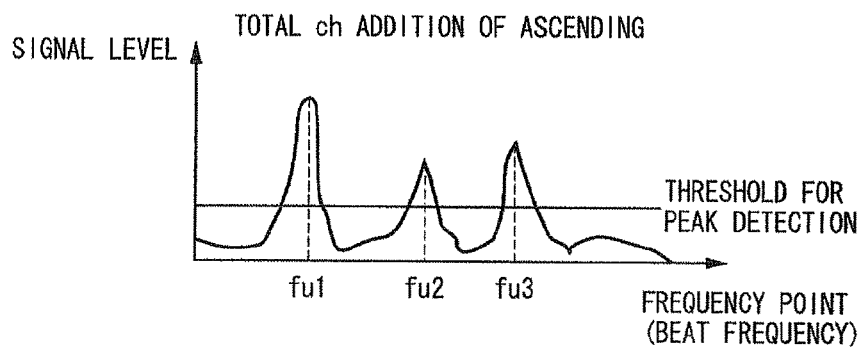
FIG. 4A is a graph illustrating a state in which a beat signal in an ascending region is frequency-resolved, where the horizontal axis represents a beat frequency and the vertical axis represents a peak value thereof.
Figure 4B:
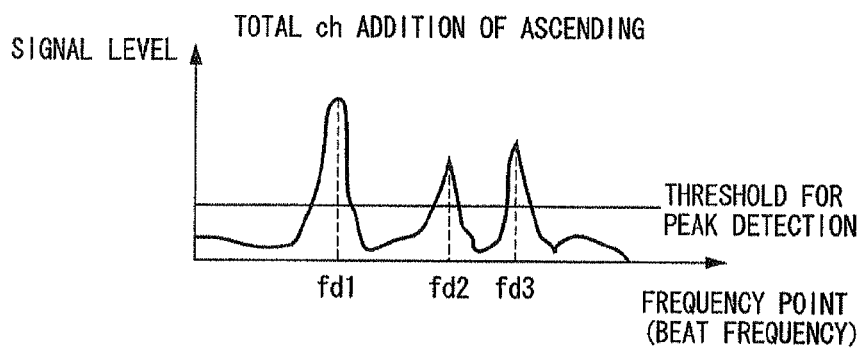
FIG. 4B is a graph illustrating a state in which a beat signal in a descending region is frequency-resolved, where the horizontal axis represents a beat frequency and the vertical axis represents a peak value thereof.

The peak combining unit 24 totally combines the beat frequencies of the ascending region and the descending region and the peak values thereof with the beat frequencies and the peak values input from the peak detecting unit 23 and shown in FIGS. 4A and 4B over the matrix. That is, the peak combining unit 24 combines all the beat frequencies of the ascending region and the descending region and sequentially outputs the combinations to the distance detecting unit 25 and the velocity detecting unit 26. In FIGS. 4A and 4B, the horizontal axis represents the frequency point and the vertical axis represents the signal level (intensity).

The distance detecting unit 25 calculates the distance r between the electronic scanning radar apparatus and the target using the values obtained by adding the beat frequencies of the combinations of the ascending region and the descending region sequentially input from the peak combining unit 24.

The velocity detecting unit 26 calculates the relative velocity v between the target and the electronic scanning radar apparatus on the basis of the difference between the beat frequencies of the combinations of the ascending region and the descending region sequentially input from the peak combining unit 24.

The pair fixing unit 27 creates a table shown in FIG. 5 on the basis of the distance r input from the distance detecting unit 25, the relative velocity V input from the velocity detecting unit 26, and the peak levels pu and pd of the ascending region and the descending region. The suitable combination of the peaks of the ascending region and the descending region is determined for each target. The pair fixing unit 27 fixes the pair of the peaks of the ascending region and the descending region as shown in FIG. 6 and outputs a target group number indicating the fixed distance r and relative velocity v to the target fixing unit 31. In FIG. 6, the distance, the relative velocity, and the frequency point (the ascending region or the descending region) is stored in the pair fixing unit 27 in correspondence to the target group number. The tables shown in FIGS. 5 and 6 are stored in an internal storage of the pair fixing unit 27. Here, since the directions of the respective target groups are not determined, the positions in the lateral direction parallel to the arrangement direction of the receiving antennas 1-1 to 1-n with respect to the axis perpendicular to the arrangement direction of the antenna array in the electronic scanning radar apparatus are not determined.

Here, the pair fixing unit 27 may employ a method of selecting the combination of the target groups preferentially using the values predicted in the present detection cycle out of the distances r and the relative velocities v between the targets and the electronic scanning radar apparatus, which are finally fixed in the past detection cycle.

The azimuth detecting unit 30 performs a spectrum estimating process using the AR spectrum estimating process as a high-resolution algorithm or a process such as the MUSIC method. The azimuth of the corresponding target is detected on the basis of the spectrum estimation result and is output to the target fixing unit 31.

The target fixing unit 31 correlates the azimuth detected by the azimuth detecting unit 60 with the distance r, the relative velocity v, and the frequency points input from the pair fixing unit 27 and shown in FIG. 6 and then fixes and outputs the present status.

The configurational example where the AR spectrum estimating method known as a high-resolution algorithm is used for the spectrum estimating process will be described in more detail below.

Figure 7:
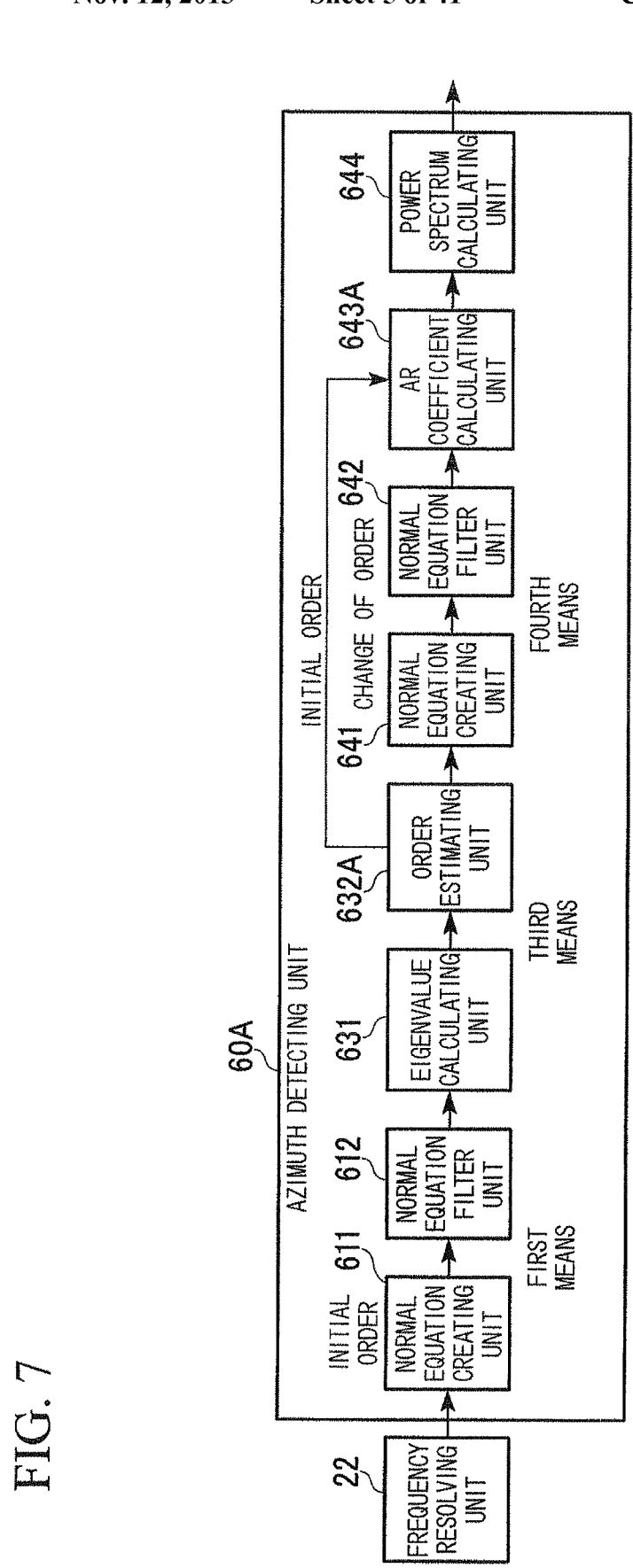
FIG. 7 is a block diagram illustrating the configuration of an azimuth detecting unit according to a first embodiment of the invention.

FIG. 7 is a block diagram illustrating the configuration of the azimuth detecting unit in the first embodiment.

The azimuth detecting unit 60A shown in FIG. 7 is an example of the azimuth detecting unit 60 shown in FIG. 1.

The azimuth detecting unit 60A includes a normal equation creating unit 611, a normal equation filter unit 612, an eigenvalue calculating unit 631, an order estimating unit 632A, a normal equation creating unit 641, a normal equation filter unit 642, an AR coefficient calculating unit 643A, and a power spectrum calculating unit 644.

In the first embodiment, the normal equation creating unit 611 and the normal equation filter unit 612 serve as first means, the eigenvalue calculating unit 631 and the order estimating unit 632A serve as third means, and the normal equation creating unit 641 and the normal equation filter unit 642 serve as fourth means.

The normal equation creating unit 611 of the azimuth detecting unit 60A creates a normal equation necessary for estimating the order of a normal equation used for the AR spectrum estimating process in the subsequent stages. The normal equation creating unit 611 creates a normal equation derived from the complex data corresponding to the beat frequencies (one or both of the ascending region and the descending region) frequency-resolved by the frequency resolving unit 22.

The normal equation filter unit 612 performs an averaging process on the normal equation in the "present detection cycle" created by the normal equation creating unit 611.

The eigenvalue calculating unit 631 performs a unitary transform on a matrix (a covariance matrix or a self-correlation matrix) which is a constituent part of the normal equation averaged by the normal equation filter unit 612. The eigenvalue calculating unit 631 calculates eigenvalues of the matrix (the covariance matrix or the self-correlation matrix) subjected to the unitary transform and determines the eigenvalue (the maximum eigenvalue) thereof. The eigenvalue calculating unit 631 normalizes the calculated eigenvalues on the basis of the maximum eigenvalue, when the calculated eigenvalues are greater than a predetermined threshold value.

The order estimating unit 632A determines the eigenvalue normalized by the eigenvalue calculating unit 631 on the basis of a predetermined threshold value and selects the processing order (the secondary order) in the subsequent stages on the basis of the determination result.

As a normal equation necessary for the AR spectrum estimating process, the normal equation creating unit 641 creates a normal equation (the secondary order normal equation) on the basis of the order estimated by the order estimating unit 632A. The normal equation creating unit 641 creates a normal equation derived from the complex data corresponding to the beat frequencies (one or both of the ascending region and the descending region) frequency-resolved by the frequency resolving unit 22.

The normal equation filter unit 642 performs an averaging process on the normal equation in the present detection cycle created by the normal equation creating unit 641.

The AR coefficient calculating unit 643A calculates an AR coefficient and a variance $\sigma^2$ of the input white noise derived from the normal equation averaged by the normal equation filter unit 642 or 612. In this way, the AR coefficient calculating unit 643A can derive the AR coefficient and the variance $\sigma^2$ of the input white noise based on the complex data of the detection beat frequency which is the beat frequency from which the presence of a target for each antenna in each detection cycle. The AR coefficient calculating unit 643A outputs the derived AR coefficient and the derived variance $\sigma^2$ of the input white noise to the power spectrum calculating unit 644.

The power spectrum calculating unit 644 calculates the DOA of the received wave from the power spectrum derived on the basis of the AR coefficient and the variance $\sigma^2$ of the input white noise.

Figure 8:
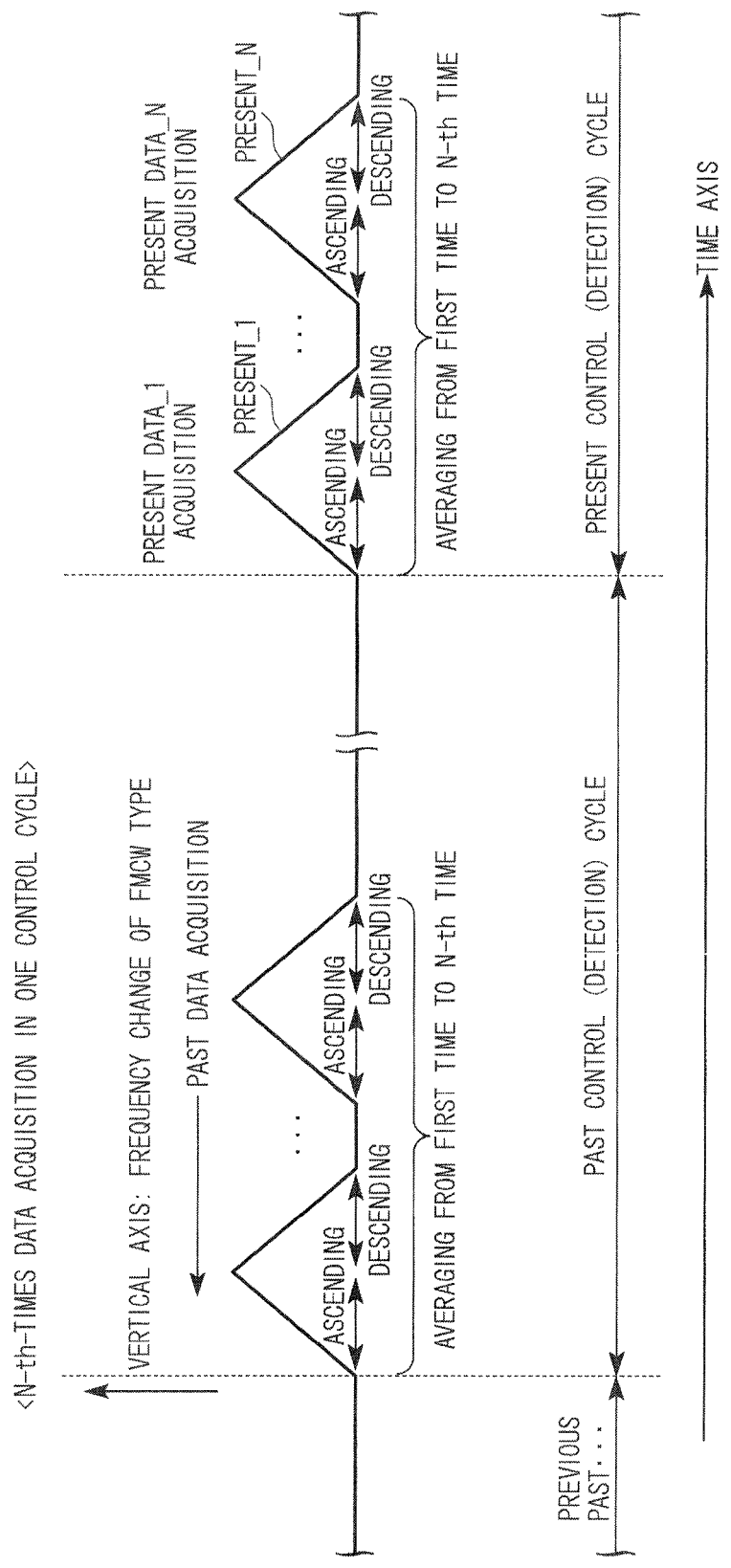
FIG. 8 is a timing diagram illustrating a data acquiring process in detection cycles.

FIG. 8 is a timing diagram illustrating a data acquiring process in the detection cycles.

The past control (detection) cycles performed previously to the present control (detection) cycle are shown in FIG. 8.

In each cycle, at least one data acquisition is performed and the one data acquisition is indicated by a triangular waveform. The triangular waveform represents a signal modulated by the FMCW method, and the ascending at the rising timing and the descending at the falling timing are detected.

The individual data acquisition is repeatedly performed at such a time gap so as not to interfere with each other and the frequency modulation period of the triangular wave may not be constant.

N times of data acquisition are performed in the present control (detection) cycle, the first data acquisition is represented by "present data_1 acquisition", and the N-th data acquisition is represented by "present data_N acquisition".

Various averaging processes in the subsequent stages are performed on the basis of data acquired in the same cycle.

The control (detection) cycle in which data is presently acquired is referred to as "present control (detection) cycle" and the control (detection) cycle in which data was acquired previously to the "present control (detection) cycle" is referred to as "past control (detection) cycle".

(Principle of Creating Normal Equation Using AR Model)

The modified covariance method will be described in detail below as an example of a normal equation creating process using an AR model.

A normal equation using a covariance matrix is expressed by Expression 1.

$$C_{xx} a = -c_{xx} \tag{1}$$

$$C_{xx} = \begin{bmatrix} \hat{C}x(1,1) & \hat{C}x(1,2) & \cdots & \hat{C}x(1,M) \\ \hat{C}x(2,1) & \hat{C}x(2,2) & \cdots & \hat{C}x(2,M) \\ \vdots & \vdots & \ddots & \vdots \\ \hat{C}x(M,1) & \hat{C}x(M,2) & \cdots & \hat{C}x(M,M) \end{bmatrix}$$

$$a = \begin{bmatrix} \hat{a}(1) \\ \hat{a}(2) \\ \vdots \\ \hat{a}(M) \end{bmatrix} \quad c_{xx} = \begin{bmatrix} Cx(1,0) \\ Cx(2,0) \\ \vdots \\ Cx(M,0) \end{bmatrix}$$

In Expression 1, the left-hand side represents the product of a covariance matrix $C_{xx}$ and an AR coefficient a and the right-hand side represents a right-hand vector $c_{xx}$. Elements of the covariance matrix $C_{xx}$ are derived by the relational expression of Expression 2.

$$c_x(j,k) = \frac{1}{2(N-M)}\left\{\sum_{n=M}^{N-1} x^*(n-j)x(n-k) + \sum_{n=0}^{N-1-M} x(n+j)x^*(n+k)\right\} \quad (2)$$

$$k, j = 0, 1, \ldots, M.$$

An example where an order three process is performed using data of five channels will be described below as a specific configuration. The maximum model order can be set to any value, but in case of data of five channels, the order three is the maximum model order when the modified covariance method is used. When the number of data channels can be increased, the maximum order applicable to the normal equation is also raised, thereby enhancing the flexibility of the maximum mode order to be applied.

The $C_{xx}$ can be expressed by a matrix of 3 rows and 3 columns. The matrix is expressed by Expression 3.

$$\begin{bmatrix} \hat{C}_{x3}(1,1) & \hat{C}_{x3}(1,2) & \hat{C}_{x3}(1,3) \\ \hat{C}_{x3}(2,1) & \hat{C}_{x3}(2,2) & \hat{C}_{x3}(2,3) \\ \hat{C}_{x3}(3,1) & \hat{C}_{x3}(3,2) & \hat{C}_{x3}(3,3) \end{bmatrix} \quad (3)$$

In Expression 3, elements $C_{x3}(k,j)$ of the matrix represent complex numbers. A computational expression developed for the elements is described. $x(n)$, that is, $x(0)$, $x(1)$, $x(2)$, $x(3)$, and $x(4)$, represents complex data and "*" represents the complex conjugate.

The covariance matrix $C_{xx}$ of Expression 3 has the relationship expressed by Expression 4 and thus is a Herimitian matrix (complex symmetric matrix).

$$c_{x3}(k,j) = c_{x3}{}^*(j,k) \quad (4)$$

The right-hand vector $c_{xx}$ used to perform the order three process is expressed by Expression 5.

$$\begin{bmatrix} \hat{C}_{x3}(1,0) \\ \hat{C}_{x3}(2,0) \\ \hat{C}_{x3}(3,0) \end{bmatrix}. \quad (5)$$

The relational expression used to derive the variance $\sigma^2$ of the input white noise is expressed by Expression 6.

$$\hat{\sigma}_v^2 = \hat{c}_x(0,0) + \sum_{k=1}^{M} \hat{a}(k)c_x(0,k) \quad (6)$$

In the linear prediction using an AR model, the normal equation is derived from the conditions that the mean square error of differences (prediction errors) between predicted values and measured values is the minimum.

By solving this normal equation using a typical method, the AR coefficient is derived.

The power spectrum $Sxx(\omega)$ is calculated using Expression 7 on the basis of the variance $\sigma^2$ of the input white noise calculated by Expression 6.

$$Sxx(\omega) = |H_{AR}(\omega)|^2 S_{vv}(\omega) \quad (7)$$

$$= \frac{\sigma_v^2}{\left|1 + \sum_{k=1}^{M} a(k)e^{-j\omega k}\right|^2}$$

In Expression 7, $\omega$ represents the angular velocity, $H_{AR}(\omega)$ represents the frequency characteristic from a transfer function of an AR filter at the angular velocity $\omega$, and $S_{vv}(\omega)$ represents the power spectrum of the input white noise at the angular velocity $\omega$, which can be expressed by $S_{vv}(\omega) = \sigma_v^2$. The angular velocity $\omega$ is converted into the phase difference of the received wave when it is used in direction detection like the radar of the invention.

By using the above-mentioned expressions, it is possible to derive a spectrum having the peak characteristic matched with the direction of a target.

Figure 9:
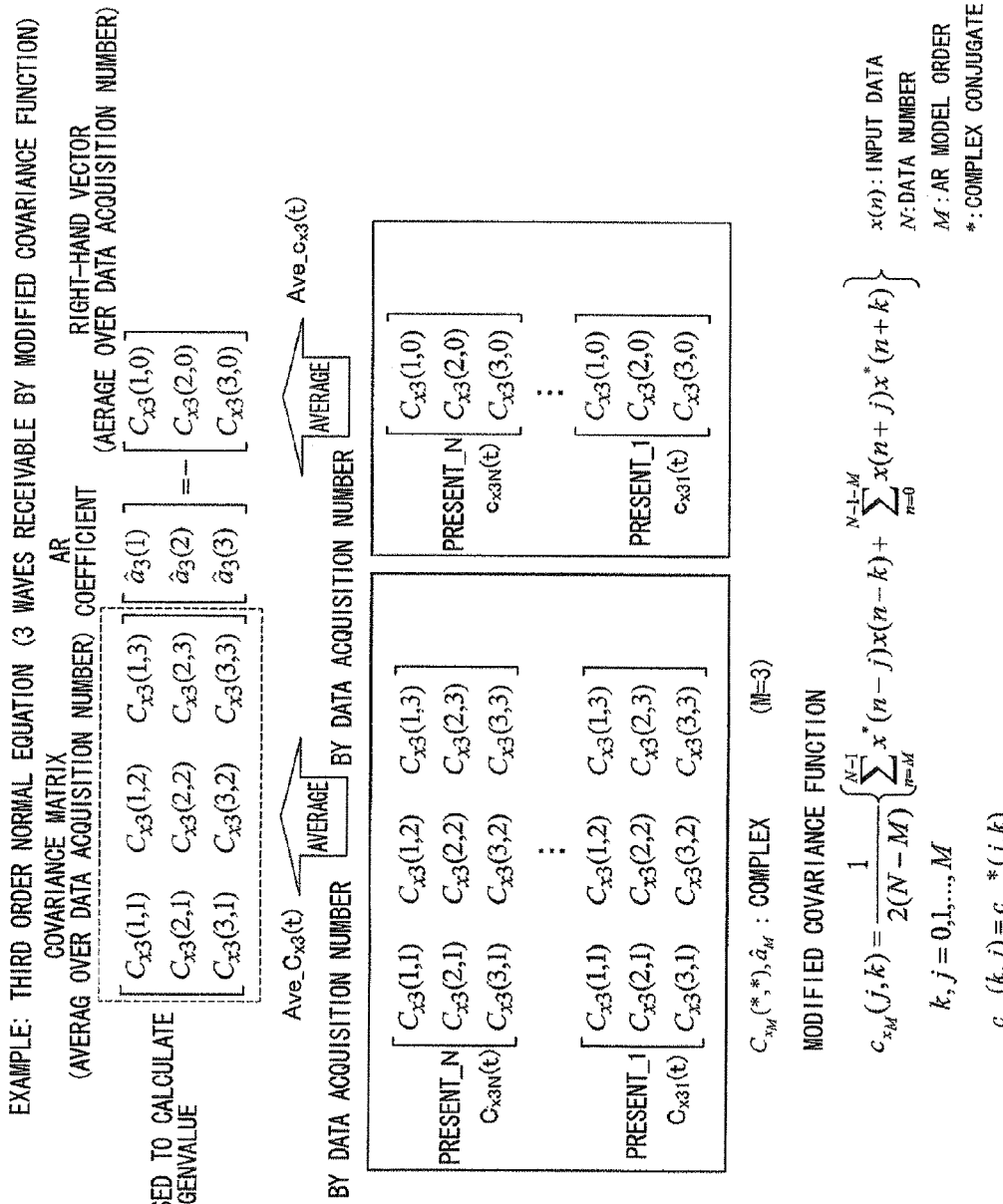
FIG. 9 is a diagram illustrating an order three normal equation based on the acquired complex data and an averaging process thereof.

FIG. 9 is a diagram illustrating the configuration of a order three normal equation based on the acquired complex data and the averaging process thereof.

The order three normal equation shown in FIG. 9 includes as constituent parts a covariance matrix which is a order three normal matrix, an AR coefficient of 3 rows and 1 column, and a right-hand vector of 3 rows and 1 column.

The covariance matrix and the right-hand vector are created on the basis of the acquired complex data. The AR coefficient is calculated by solving the normal equation.

As shown in FIG. 8, data are acquired plural times in one control (detection) cycle. The covariance matrix $C_{xxk}(t)$ and the right-hand vector $c_{xxk}(t)$ are created in the acquisition order of the acquired complex data.

In the example shown in FIG. 8, the number of times that data is acquired in one control (detection) cycle is set to N.

To correspond to the times of data acquisition, the covariance matrix $C_{xxk}(t)$ and the right-hand vector $c_{xxk}(t)$ are expressed in the order of "present_1", ..., and "present_N".

In the first embodiment, the process of averaging the normal equation is performed on the basis of the data acquired in the same control (detection) cycle. That is, by averaging the elements of the covariance matrix $C_{xxk}(t)$ and the right-hand vector $c_{xxk}(t)$ from "present_1" to "present_N", the averaging process is performed. A computational expression for calculating an averaged covariance matrix Ave_$C_{xxk}(t)$ is expressed by Expression 8.

$$\text{Ave}\_C_{xx}(t) = k1*C_{xx1}(t) + k2*C_{xx2}(t) + \ldots + kN*C_{xxN}(t) \quad (8)$$

In Expression 8, k1 to kn represent weighting coefficients used for weighted-averaging.

A computational expression for calculating an averaged right-hand vector Ave_$c_{xxk}(t)$ is expressed by Expression 9.

$$\text{Ave}\_c_{xx}(t) = k1*c_{xx1}(t) + k2*c_{xx2}(t) + \ldots + kN*c_{xxN}(t) \quad (9)$$

In Expression 9, k1 to kn represent weighting coefficients used for weighted-averaging.

When the eigenvalues are calculated on the basis of the averaged normal equation, the eigenvalues of the covariance matrix of the averaged normal equation are calculated.

Figure 10:
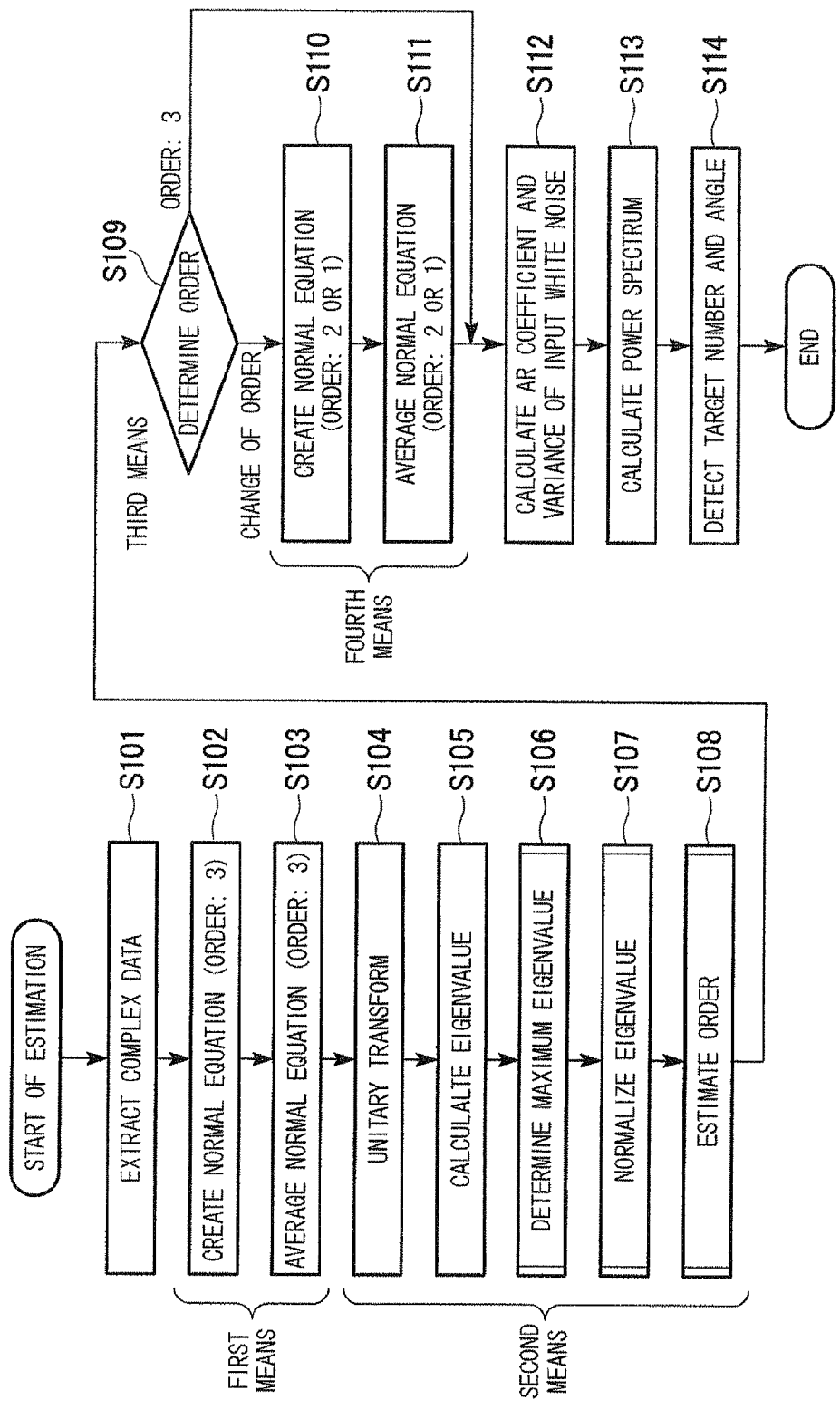
FIG. 10 is a flowchart illustrating a flow of processes in the first embodiment.

FIG. 10 is a flowchart illustrating the flow of processes in the first embodiment.

The flow of processes is repeatedly performed for each control cycle (see FIG. 8). The flow of processes is repeatedly performed for each of plural targets selected by detecting the peaks through the use of the entire configuration of the radar.

In step S101, complex data is acquired one or more times in the same control cycle for each channel (CH). The frequency resolving unit 22 reads the beat signals based on the received wave stored in the memory 21 and frequency-transforms the beat signals for each antenna.

The acquired complex data may be processed separately in the ascending and the descending by individually using one or both of the ascending data and the descending data of the frequency-modulated triangular wave.

In step S102, the normal equation creating unit 611 creates the normal equation of the order corresponding to the maximum order of the AR model for each acquisition time. In the first embodiment, the maximum order is set to three.

In step S103, the normal equation filter unit 612 averages the elements of the covariance matrix and the right-hand vector (cross-correlation vector) of the normal equation created in step S102.

The processes of steps S102 and S103 correspond to the first means in the first embodiment and the covariance matrix of the modified covariance method is itself used as the correlation matrix used to calculate the eigenvalues in the subsequent stages. The covariance matrix of the AR model is the same Herimitian matrix (complex symmetric matrix) as the correlation matrix to be described later and the eigenvalues have the same features. Therefore, it is possible to calculate the eigenvalues using the maximum order of the AR model.

The processes of steps S104 and S109 correspond to the third means in the first embodiment.

In step S104, the eigenvalue calculating unit 631 performs a unitary transform to transform the created covariance matrix into a real correlation matrix (symmetric matrix).

In step S105, the eigenvalue calculating unit 631 calculates the eigenvalues of the unitary-transformed real symmetric matrix.

FIG. 11 is a diagram illustrating the calculation of the eigenvalues.

By performing the unitary transform, it is possible to transform the covariance matrix into the real correlation matrix and to perform the eigenvalue calculation having the heaviest computational load in the subsequent steps through the real calculation, thereby reducing the computational load greatly.

When the order is set to three as described in the first embodiment, the transform of the Herimitian matrix into the real correlation matrix (symmetric matrix) using the unitary transform can be performed by the computational expression expressed by Expression 10 (refer to pp. 158-160 of "Adaptive Antenna Technology", written by Kikuma, published by Ohmsha Ltd., 2003 for the general expression).

$$R_{xx\_u} = Q_M^H R_{xx} Q_M \tag{10}$$

$$Q_3 = \begin{bmatrix} \frac{1}{\sqrt{2}} & 0 & j\frac{1}{\sqrt{2}} \\ 0 & 1 & 0 \\ \frac{1}{\sqrt{2}} & 0 & -j\frac{1}{\sqrt{2}} \end{bmatrix} \quad Q_3^H = \begin{bmatrix} \frac{1}{\sqrt{2}} & 0 & \frac{1}{\sqrt{2}} \\ 0 & 1 & 0 \\ -j\frac{1}{\sqrt{2}} & 0 & j\frac{1}{\sqrt{2}} \end{bmatrix}$$

$$Q_M Q_M^H = Q_M^H Q_M = I_M$$

(Calculation of Real Part), Unitary Matrix (Complex Orthogonal Matrix), (Unit Matrix), H added to Right Shoulder: Herimitian Transpose In Expression 10, H added to the right shoulder represents the Herimitian matrix.

By performing the unitary transform, it is possible to reduce the load of the eigenvalue calculation in the rear stages and to suppress the signal correlation. Accordingly, the calculation of eigenvalue in the subsequent step can be performed using the complex number without transform to the real correlation matrix by the unitary transform, but it is preferable that the transform into the real correlation matrix is performed using the unitary transform.

The calculation of eigenvalues can be performed by Expressions 11 and 12.

$$R_{xx\_u} e = \lambda e \tag{11}$$

$$|R_{xx\_u} - \lambda I| = 0 \tag{12}$$

The calculation of eigenvalues can save the processing of an eigenvector and can be performed by using any solution algorithm as well as solving the eigen equation of Expression 12. For example, repeated calculation type algorithms such as a Jacobi method, a Householder method, and a QR method can be employed.

In step S106, the order estimating unit 632A calculates the maximum eigenvalue out of the eigenvalues of the correlation matrix $R_{xx}$ transformed in step S105.

In step S107, the order estimating unit 632A normalizes the values of the elements with reference to the calculated maximum value, that is, divides the values of the elements by the maximum value.

In step S108, the order for optimizing the spectrum estimating process to be performed in the subsequent stage is estimated.

The series of processes of steps S106 to S108 is referred to as a model order estimating process.

Figure 12:
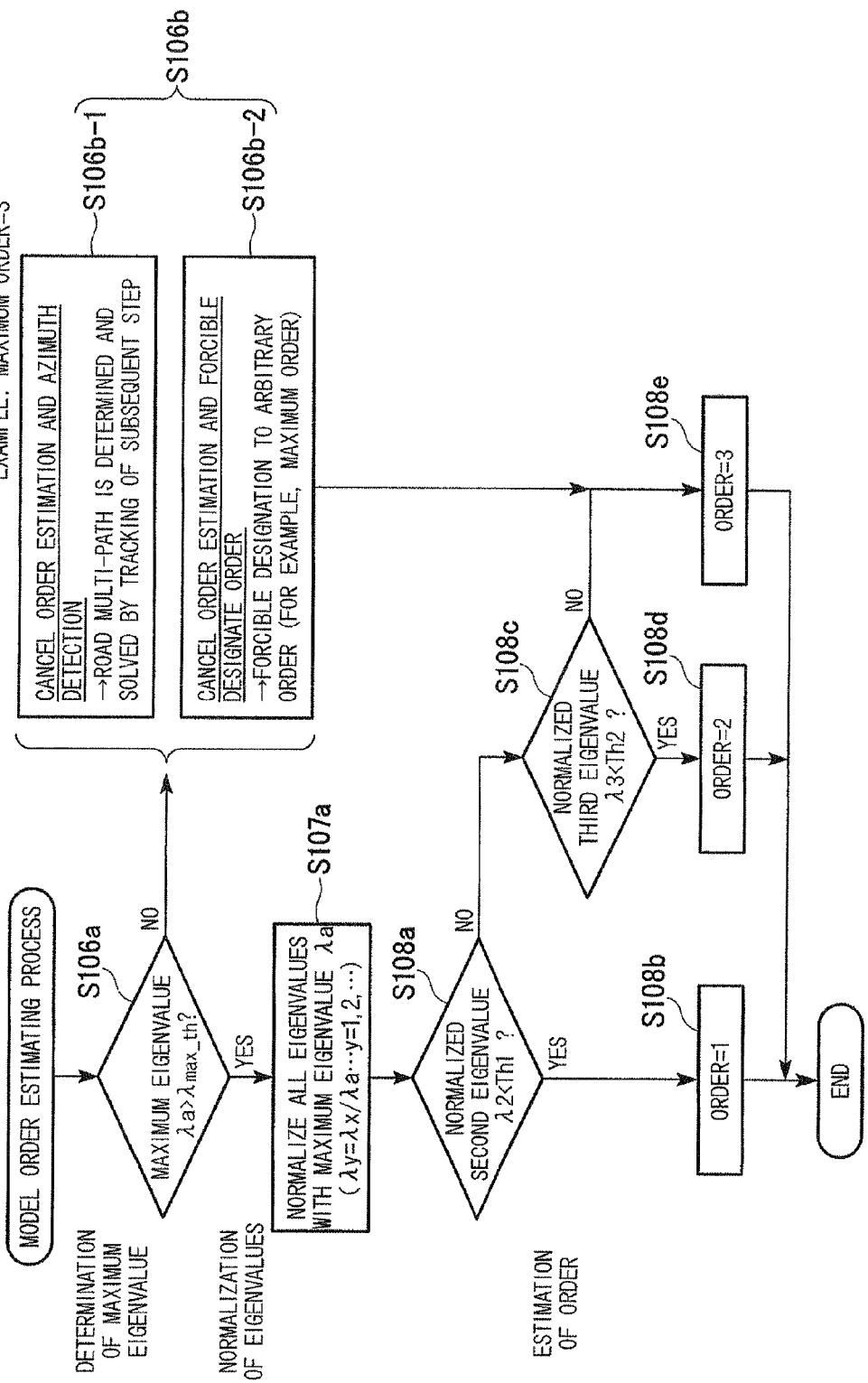
FIG. 12 is a flowchart illustrating details of a model order estimating process of steps S106 to S108 shown in FIG. 10.

FIG. 12 is a diagram illustrating details of the model order estimating process shown in steps S106 to S108 of FIG. 10. The process of step S106a is the maximum eigenvalue determining process corresponding to step S106. When it is determined in step S106a that the maximum eigenvalue is smaller than a predetermined threshold value (NO in step S106a), it is determined in step S106b that the reliability of the acquired information (the complex data) is low and the order estimating unit 632A does not perform the order estimating process of the next step on the corresponding target. The maximum eigenvalue is equivalent (proportional) to the intensity of the input signal. Accordingly, even when a signal is received on the basis of a clutter unique to the in-vehicle radar such as the road multi-path, it is possible to prevent the incorrect azimuth estimation by determining the maximum eigenvalue. The order estimating unit 632A may perform the determination using the total sum of the calculated eigenvalues (or the sum of diagonal elements of the original correlation matrix) instead of the maximum eigenvalue.

For example, in step S106b, both the order estimation and the azimuth estimation can be cancelled as in step S106b-1. As in step S106b-2, the order estimation may be cancelled and any order (for example, the maximum order of 3) may be forcibly designated.

When it is determined in step S106a that the maximum eigenvalue is not smaller than the predetermined threshold value (YES in step S106a), the process of step S107a is an eigenvalue normalizing process corresponding to step S107 and the values obtained by dividing the eigenvalues λx by the maximum eigenvalue λ are set as the normalized eigenvalues λy. Like the radar, when the eigenvalues (signal intensity) varies depending on the distance from the target, it is preferable that the magnitude relation between the eigenvalues is determined by the normalization.

The processes of steps S108a to S108e are the order estimating process corresponding to step S108 performed by the order estimating unit 632A.

In step S108a, the eigenvalue (normalized second eigenvalue) which is the second largest out of the eigenvalues normalized in step S107 is selected and it is determined whether the normalized second eigenvalue is smaller than a predetermined threshold value Th1. When it is determined that the normalized second eigenvalue is not smaller than the predetermined threshold value Th1 (NO in step S108a), the process of step S108c is performed.

When it is determined in step S108a that the normalized second eigenvalue is smaller than the predetermined threshold Th1 (YES in step S108a), the estimated order is set to one and is stored in a memory area storing the estimated order information not shown in step S108b, and the order estimating process is ended.

In step S108c, the eigenvalue (normalized third eigenvalue) which is the third largest out of the eigenvalues normalized in step S107 is selected and it is determined whether the normalized third eigenvalue is smaller than a predetermined threshold value Th2. When it is determined that the normalized third eigenvalue is not smaller than the predetermined threshold value Th2 (NO in step S108c), the process of step S108e is performed.

When it is determined in step S108c that the normalized third eigenvalue is smaller than the predetermined threshold Th2 (YES in step S108c), the estimated order is set to two and is stored in the memory area storing the estimated order information not shown in step S108d, and the order estimating process is ended.

When it is determined in step S108c that the normalized third eigenvalue is not smaller than the predetermined threshold Th2 (NO in step S108a), the estimated order is set to three and is stored in the memory area storing the estimated order information not shown in step S108b, and the order estimating process is ended.

In the order estimating process of steps S108a to S108e, two types of threshold values of the threshold value Th1 used to distinguish the order 1 from the order 2 or greater and the threshold value Th2 used to distinguish the order 2 from the order 3 are used. By using these threshold values, it is possible to set the high order advantageous for the AR spectrum estimation precision in the case of plural targets. Accordingly, the invention can be applied to the setting unique to the in-vehicle radar using the AR spectrum estimation.

Referring to FIG. 10, in step S109, the order estimating unit 632A determines whether the order estimated in step S108 is three. When it is determined in step S109 that the estimated order is three, the process of step S112 is performed.

When it is determined in step S109 that the estimated order is not three, the process of changing the order of the normal equation is performed which is the process corresponding to the fourth means of steps S110 and S111.

In step S110, the normal equation creating unit 641 performs a normal equation creating process of creating a normal equation in the present detection cycle on the basis of the order estimated by the order estimating unit 632A in step S108.

In step S111, the normal equation filter unit 642 performs the averaging process of averaging the normal equation in the present detection cycle created by the normal equation creating unit 641 in step S110.

Figure 13:
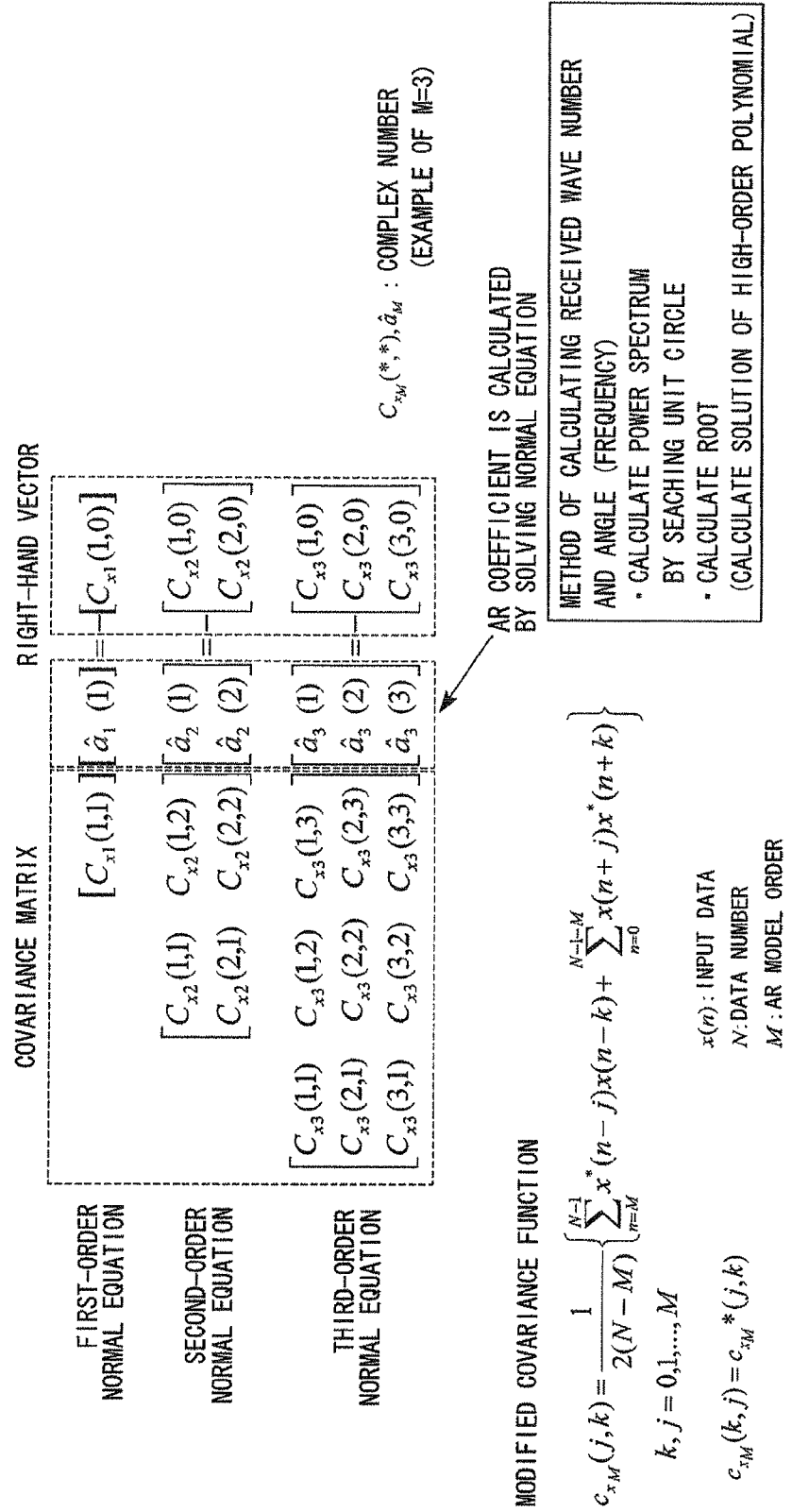
FIG. 13 is a diagram illustrating various orders of normal equations in the first embodiment.

FIG. 13 is a diagram illustrating the normal equations of various orders in the first embodiment.

The normal equations having a covariance matrix, an AR coefficient, and a right-hand vector as constituent parts are shown in FIG. 13. The orders of the normal equations are from one to three.

When it is determined as the order determination result in step S109 that the order should be lower than the initially-set order (the order three in the first embodiment), the normal equation creating unit 641 creates a lower-order normal equation than the initially-set order. This is a part corresponding to the change based on the order estimation result and the lower order is one of order two and order one in the first embodiment.

By storing the data acquired in step S101 as the complex data used to create the normal equation, it is possible to flexibly cope with the order change. This shows that it is superior to apply the AR spectrum estimation to the azimuth detecting unit by actively using the feature that the processing load up to the creation of the normal equation in the AR spectrum estimating process is markedly light. When it is determined that the estimated order is three, the normal equation created in step S102 and averaged in step S103 is used in the subsequent steps without being subjected to the processes of steps S110 and S111.

Referring to FIG. 10 again, in step S112, the AR coefficient calculating unit 643A calculates the AR coefficient and the variance of the input white noise from the normal equation averaged in step S111 or S103.

In step S113, the power spectrum calculating unit 644 calculates the power spectrum on the basis of the AR coefficient and the variance of the input white noise calculated in step S112.

In step S114, the power spectrum calculating unit 644 detects the number of targets and the angles indicating the directions of the targets on the basis of the calculated power spectrum.

Second Embodiment

Another example of the spectrum estimating process using the AR spectrum estimating method known as a high-resolution algorithm will be described below in more detail with reference to the accompanying drawings.

A second embodiment of the invention includes second means instead of the first means described in the first embodiment. The second means creates a correlation matrix used to calculate the eigenvalues in a way unlike the first means.

Figure 14:
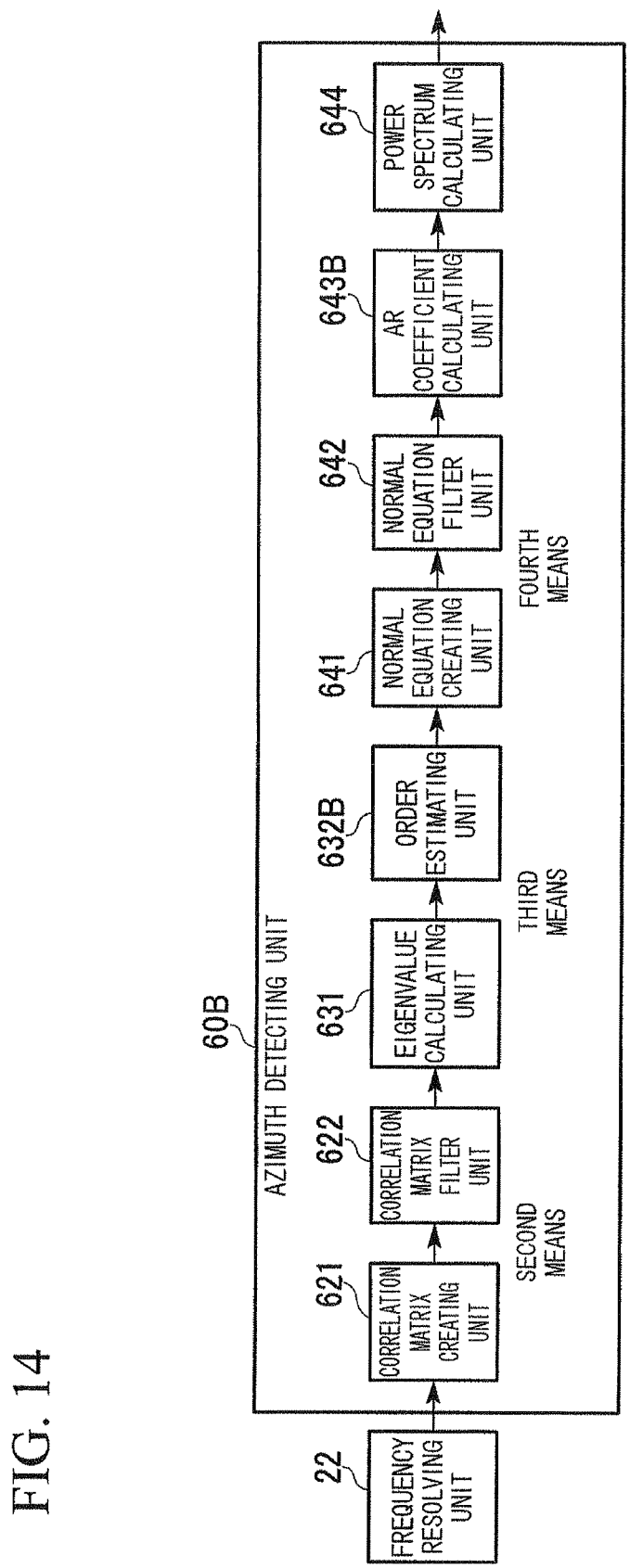
FIG. 14 is a block diagram illustrating the configuration of an azimuth detecting unit according to a second embodiment of the invention.

FIG. 14 is a block diagram illustrating the configuration of an azimuth detecting unit in the second embodiment.

The azimuth detecting unit 60B shown in FIG. 14 is an example of the azimuth detecting unit 60 shown in FIG. 1.

The azimuth detecting unit 60B includes a correlation matrix creating unit 621, a correlation matrix filter unit 622, an eigenvalue calculating unit 631, an order estimating unit 6328, a normal equation creating unit 641, a normal equation filter unit 642, an AR coefficient calculating unit 643B, and a power spectrum calculating unit 644. The same elements as shown in FIG. 7 are referenced by the same reference signs, and when not particularly described, the normal equation creating unit 611, the normal equation filter unit 612, the order estimating unit 632A, and the AR coefficient calculating unit 643A are replaced with the correlation matrix creating unit 621, the correlation matrix filter unit 622, the order estimating unit 632B, and the AR coefficient calculating unit 643B.

In the second embodiment, the correlation matrix creating unit 621 and the correlation matrix filter unit 622 serve as the second means, the eigenvalue calculating unit 631 and the order estimating unit 632B serve as the third means, and the normal equation creating unit 641 and the normal equation filter unit 642 serve as the fourth means.

The correlation matrix creating unit 621 of the azimuth detecting unit 60B creates a correlation matrix necessary to estimate the order of the normal equation of the AR spectrum estimating process in the subsequent steps. The correlation matrix creating unit 621 creates the correlation matrix derived from the complex data corresponding to the beat frequencies (one or both of the ascending and the descending) frequency-resolved by the frequency resolving unit 22.

The correlation matrix filter unit 622 performs an averaging process on the correlation matrix in the "present detection cycle" created by the correlation matrix creating unit 621.

The eigenvalue calculating unit 631 performs a unitary transform on the correlation matrix averaged by the correlation matrix filter unit 622. The other operation of the eigenvalue calculating unit 631 is the same as described in the first embodiment.

The order estimating unit 632B determines the eigenvalues normalized by the eigenvalue calculating unit 631 on the basis of a predetermined threshold value and selects the order (the secondary order) of the process in the subsequent step on the basis of the determination result.

The AR coefficient calculating unit 643B calculates the AR coefficient and the variance $\sigma^2$ of the input white noise derived from the normal equation averaged by the normal equation filter unit 642. In this way, the AR coefficient calculating unit 643B can derive the AR coefficient and the variance $\sigma^2$ of the input white noise based on the complex data of the detection beat frequency as a beat frequency from which the presence of a target is detected for each antenna by the detection cycles. The AR coefficient calculating unit 643B outputs the derived AR coefficient and the derived variance $\sigma^2$ of the input white noise to the power spectrum calculating unit 644.

Figure 15:
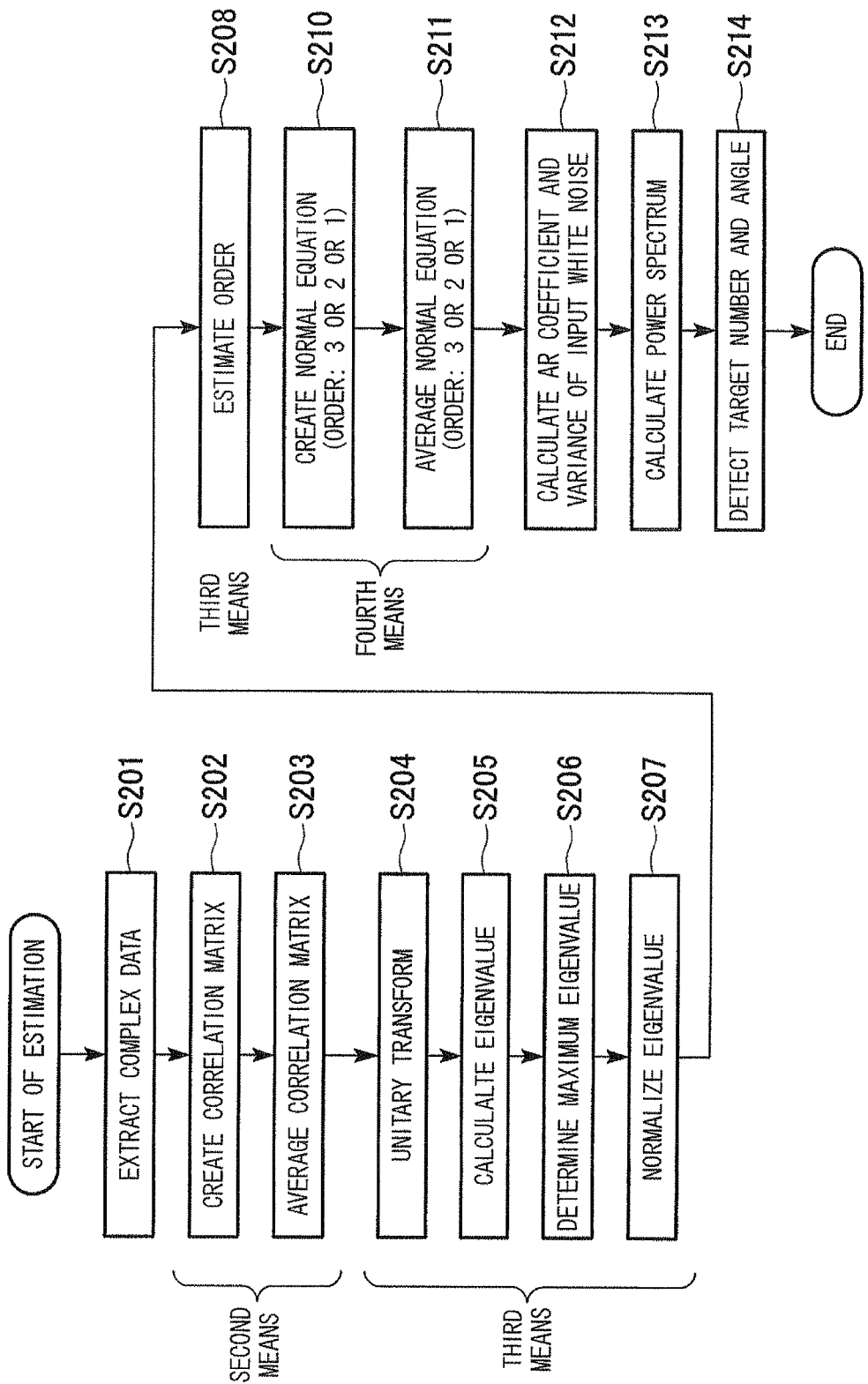
FIG. 15 is a flowchart illustrating a flow of processes in the second embodiment.

The description will be made with reference to the flowchart shown in FIG. 15. The flow of processes is repeatedly performed for each control cycle (see FIG. 8) and for individual targets selected by the peak detection through the use of the entire configuration of the radar. Steps S201 to S214 shown in FIG. 15 correspond to steps S101 to S114 shown in FIG. 10 and the description will be centered on the steps of performing processes other than described in the first embodiment.

In step S202, the correlation matrix creating unit 621 creates the correlation matrix of the order matched with the maximum order of the AR model for each acquisition. In the second embodiment, the maximum order is set to three.

In step S203, the correlation matrix filter unit 622 averages the elements of the correlation matrix created in step S202.

The processes of steps S202 and S203 correspond to the second means in the second embodiment, and since the maximum order of the covariance matrix of the AR model in the subsequent step is three, an order three correlation matrix is created as the correlation matrix used to calculate the eigenvalues in the subsequent step.

When the order of the created correlation matrix is three, the complex data corresponding to at least three channels is sufficient. If the complex data corresponding to five channels are provided, the complex data can be used to enhance precision.

The correlation creating method will be described below with reference to FIG. 16.

Figure 16:
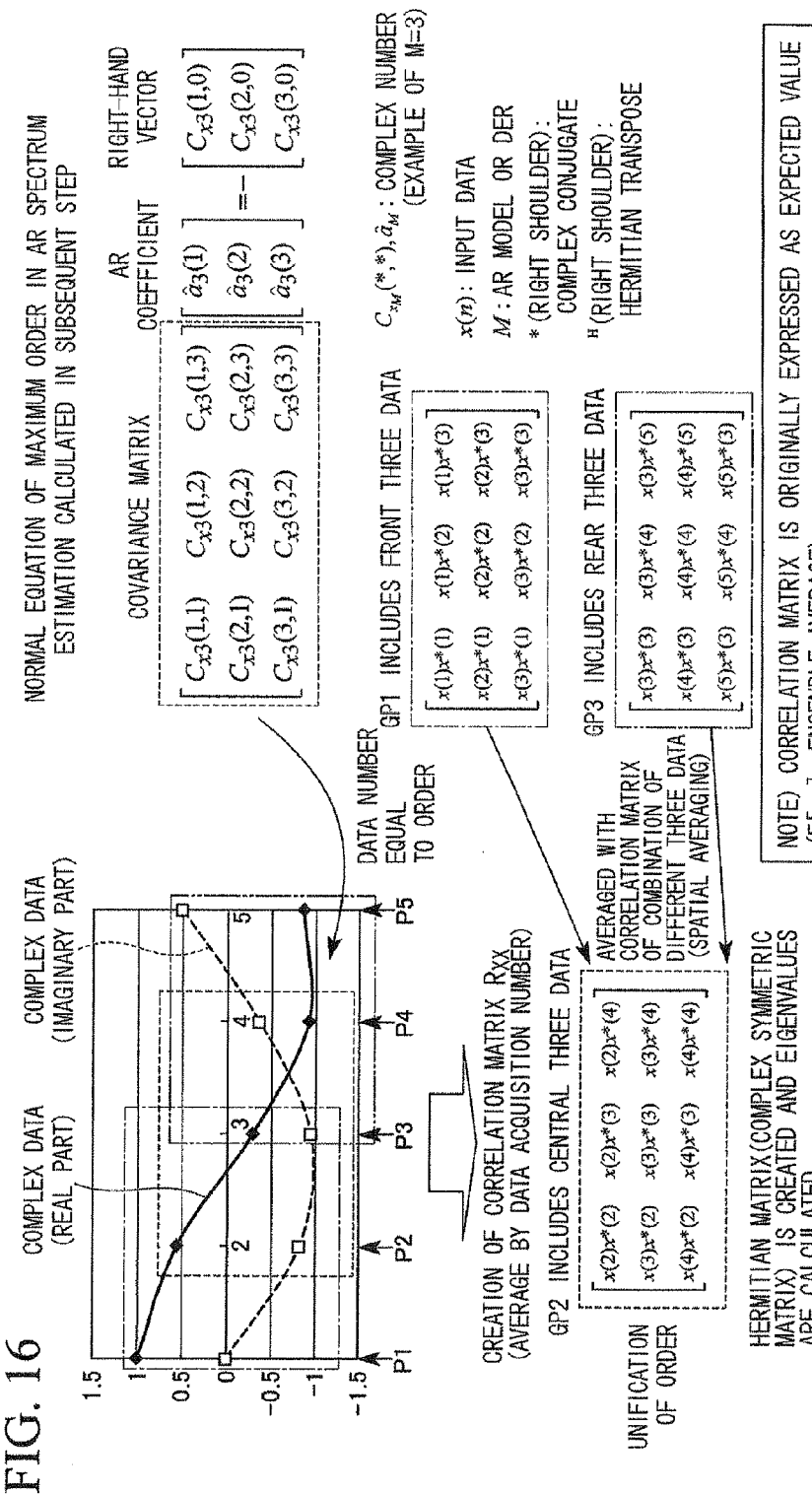
FIG. 16 is a diagram illustrating a correlation matrix creating method according to the second embodiment.

FIG. 16 is a diagram illustrating the correlation matrix creating method of the second embodiment.

The graph shown in FIG. 16 shows the complex data corresponding to five channels into a real part and an imaginary part. The complex data corresponding to five channels are used for the AR spectrum estimation performed in the subsequent step.

An example where the correlation matrix of the order 3 is created from five pieces of complex data (channels) will be described.

P1 to P5 shown in the drawing are points representing the original data of the five pieces of complex data. These pieces of data are classified, for example, into three continuous groups. The classified groups are three groups of GP1 to GP3.

For example, the group GP1 includes the complex data P1, P2, and P3 (front three pieces of data), the group GP2 includes the complex data P2, P3, and P4 (central three pieces of data), and the group GP3 includes the complex data P3, P4, and P5 (rear three pieces of data). Each group includes three pieces of complex data and the correlation matrix can be created for each group.

Since the correlation matrices created for each group are matched with each other in the order, the elements of the correlation matrices are averaged in correspondence with each other to obtain a correlation matrix $R_{xx}$ which is obtained by averaging (=spatially averaging) the correlation matrices. The correlation matrices in which the complex data P1, P2, P3, P4, and P5 are inversed may be created and may be added to an average number (=forward and backward spatial average). The eigenvalues are calculated on the basis of the correlation matrix $R_{xx}$ in the subsequent step.

The correlation matrix obtained by the averaging is a symmetric matrix (Herimitian matrix) having the complex data and the order thereof is limited to the maximum order of the normal equation used for the AR spectrum estimation performed in the subsequent step. By limiting the order in this way, it is possible to perform the eigenvalue calculation with a light computational load on a small correlation matrix.

The correlation matrices corresponding to the acquisition number by which data is acquired in the same control cycle are averaged (step S203).

Here, as described in FIG. 16, since the correlation matrix is an originally-expected value (ensemble average), the larger acquisition number causes an ideal correlation matrix but the data cannot be sampled (=acquired) enough to provide a sufficient expected value in a practical system. In the in-vehicle radar, since a target successively moves, data cannot be acquired (=sampled) sufficiently. This is true of the case where the covariance matrix of the AR model is used in the first means.

The processes of steps S210 and S211 will be described with reference to FIG. 15 again.

The processes of steps S210 and S211 correspond to the fourth means in the second embodiment.

The fourth means in the second embodiment is different from the fourth means in the first embodiment, in that the normal equation is created for any order on the basis of the order estimated by the third means. In the first embodiment, the maximum order of normal equation is created in advance to calculate the eigenvalues. Accordingly, when the estimated order is the maximum order, a new normal equation is not created but the normal equation created in advance can be used. In the second embodiment, since the eigenvalues are calculated on the basis of the correlation matrix, it is necessary to create the normal equation for all the orders (the orders 1 to 3 in the second embodiment).

Third Embodiment

An electronic scanning radar apparatus according to a third embodiment of the invention will be described below with reference to the accompanying drawings.

Figures 17, 18A, 18B:
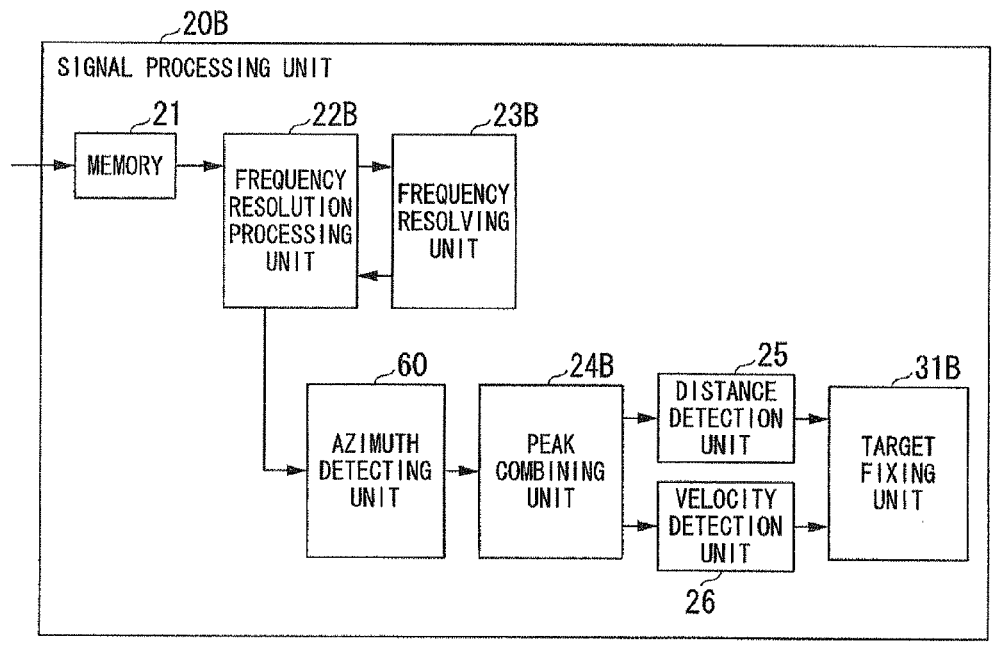
FIG. 17 is a block diagram illustrating the configuration of an electronic scanning radar apparatus according to a third embodiment of the invention.
FIG. 18A is a diagram illustrating a table stored in a memory.
FIG. 18B is a diagram illustrating a table stored in the memory.

FIG. 17 is a block diagram illustrating the configuration of the electronic scanning radar apparatus according to the third embodiment.

A signal processing unit 20B in the third embodiment performs the azimuth estimating process using a high-resolution algorithm, similarly to the first embodiment. The same elements as the first embodiment shown in FIG. 1 will be referenced by the same reference signs and the following description will be centered on the differences from the first embodiment.

The frequency resolving unit 22B of the signal processing unit 20B transforms the beat signals of the ascending region and the descending region for each antenna into complex data and outputs the frequency points indicating the beat frequencies thereof and the complex data to the peak detecting unit 23B.

The peak detecting unit 23B detects the peak values of the ascending region and the descending region and the frequency points at which the peak values are present and outputs the frequency points to the frequency resolving unit 22B.

The frequency resolving unit 22B outputs the complex data corresponding to the ascending region and the descending region to the azimuth detecting unit 60.

These complex data are target groups (beat frequencies having peaks in the ascending region and the descending region) of the ascending region and the descending region.

The azimuth detecting unit 60 estimates the order on the basis of the supplied complex data.

Here, the function of the peak detecting unit 23B can be replaced with the maximum eigenvalue determination (step S106a) in the model order estimating process of the azimuth detecting unit, and thus the peak detecting unit may be deleted.

The azimuth detecting unit 60 detects the angle θ for the AR coefficient of the ascending region and the AR coefficient of the descending region and outputs the detected angles to the peak combining unit 24B as the tables shown in FIGS. 18A and 18B.

The peak combining unit 24B makes combinations of the same angles on the basis of the information of the tables shown in FIGS. 18A and 18B and outputs the combinations of the beat frequencies of the ascending region and the descending region to the distance detecting unit 25 and the velocity detecting unit 26.

The distance detecting unit 25 calculates the distance on the basis of the beat frequencies of the ascending region and the descending region in the combinations, similarly to the first embodiment.

The velocity detecting unit 26 calculates the relative velocity on the basis of the beat frequencies of the ascending region and the descending region in the combinations, similarly to the first embodiment.

Here, the distance detecting unit 25 and the velocity detecting unit 26 calculate the values of the distance and the relative velocity on the basis of the combinations of the beat frequencies of the ascending region and the descending region.

The target fixing unit 27B fixes the pair of peaks of the ascending region and the descending region and fixes a target.

Fourth Embodiment

An electronic scanning radar apparatus according to a fourth embodiment of the invention will be described below with reference to the accompanying drawings.

Figure 19:
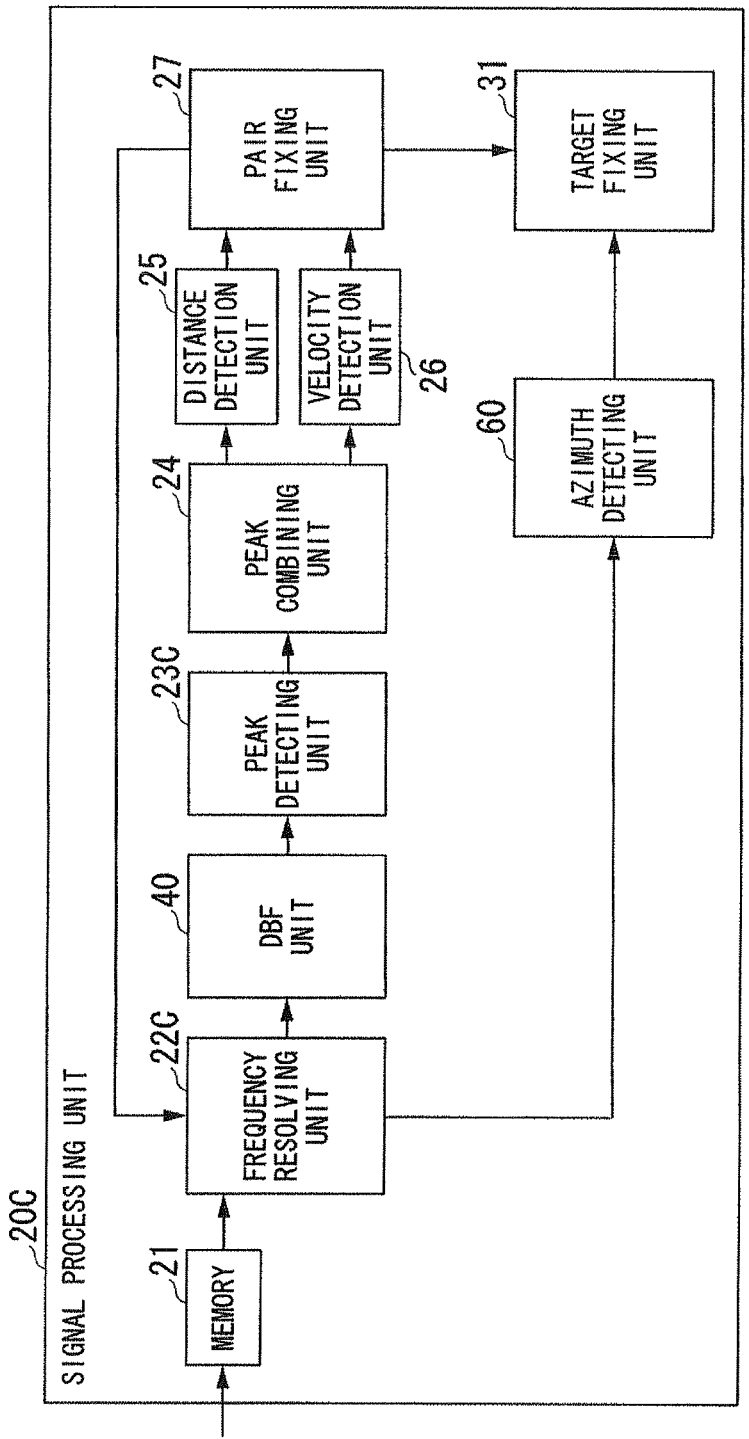
FIG. 19 is a block diagram illustrating the configuration of an electronic scanning radar apparatus according to a fourth embodiment of the invention.

FIG. 19 is a block diagram illustrating the configuration of the electronic scanning radar apparatus according to the fourth embodiment.

A signal processing unit 20C in the fourth embodiment performs an azimuth estimating process first using a DBF (Digital Beam Forming) with a resolution lower than that of the high-resolution algorithm such as the AR spectrum estimating process and then performs the azimuth estimating process using the high-resolution algorithm including the AR spectrum estimating process using the AR coefficient, unlike the first embodiment. The same elements as the first embodiment shown in FIG. 1 will be referenced by the same reference signs and the following description will be centered on the differences from the first embodiment.

As shown in the drawing, this embodiment is different from the first embodiment, in that a DBF unit 40 is disposed between the frequency resolving unit 22C and the peak detecting unit 23C in the first embodiment shown in FIG. 1 and the azimuth in which the received wave arrives is estimated first using the DBF as described above.

The frequency resolving unit 22C frequency-transforms the ascending region (ascending) and the descending region (descending) of the triangular wave into discrete times through the use of frequency resolution on the basis of sampled data of the beat signals stored in the memory 21. That is, the frequency resolving unit 22C resolves the beat signals into beat frequencies having a predetermined frequency bandwidth, calculates complex data based on the beat signals resolved for each beat frequency, and outputs the calculated complex data to the DBF unit 40.

The DBF unit 40 Fourier-transforms the complex data corresponding to each antenna in the arrangement direction of the antennas, that is, Fourier-transforms the complex data in a spatial axis.

The DBF unit 40 depends on the angle, that is, calculates spatial complex data for the angular channels corresponding to the angle resolution and outputs the calculated spatial complex data to the peak detecting unit 23C for each beat frequency.

Accordingly, the spectrum represented by the spatial complex data (in the unit of beat frequency) for each angular channel output from the DBF unit 40 depends on the DOA estimation of the received wave based on a beam scanning resolution.

Since the complex data is Fourier-transformed in the arrangement direction of the antennas, the same advantage as the configuration in which the complex data of the angular channels are added can be achieved and the complex data for each angular channel is improved in the S/N ratio, thereby enhancing the precision in detecting the peak values, similarly to the first embodiment.

The complex data and the spatial complex data are all calculated form the ascending region and the descending region, similarly to the first embodiment.

The peak detecting unit 23C detects a peak for each angular channel on the basis of the DBF result after the processing of the DBF unit 40, and outputs the detected peak values of the channels to the peak combining unit 24 for each angular channel. That is, in the case of the Fourier transform in the spatial axis with a 16 resolution, the number of angular channels is 15.

Similarly to the first embodiment, the peak combining unit 24 combines the peak values with the beat frequencies having the peak values in the ascending region and the descending region and outputs the combinations to the distance detecting unit 25 and the velocity detecting unit 26 for each angular channel.

The pair fixing unit 27 creates the table shown in FIG. 5 for each angular channel using the distance r and the relative velocity v sequentially input from the distance detecting unit 25 and the velocity detecting unit 26 and determines the combination of peaks of the ascending region and the descending region corresponding to each target for each angular channel, similarly to the first embodiment. Here, since the resolution of the DBF represents that a target is present over plural angular channels, the peaks of the ascending region and the descending region for each angular channel can be appropriately combined in consideration of the agreement with neighboring angular channels (matrices).

The pair of the peaks of the ascending region and the descending region is fixed and the target group number indicating the fixed distance r and the fixed relative velocity v is generated to create the table shown in FIG. 20.

FIG. 20 is a diagram illustrating a table storing the fixed pairs of the peaks of the ascending region and the descending region.

Since the pair fixing unit 27 can acquire information of the angular channels for each target in addition to the distance r and the relative velocity v and can calculate a longitudinal position and a lateral position, the table, which is shown in FIG. 20, having the results corresponding to the target group in the present detection cycle is created, in which the longitudinal positions and the lateral positions are included in the table shown in FIG. 6.

The DBF unit 40 in the fourth embodiment detects the presence and the azimuth of a target on the basis of the complex data by the use of the digital beam forming (DBF) which enhances the receiving sensitivity in a desired direction to the received wave. The azimuth detecting unit 60 detects the azimuth of a target using the AR spectrum estimating process as a high-resolution algorithm.

Accordingly, by detecting the azimuth using the DBF indicating a stable beam spectrum with a low resolution before the azimuth detection with high precision performed by the azimuth detecting unit 60, it is possible to improve the estimation precision.

By estimating the azimuth through the use of the logical product (AND logic) based on the azimuth information from the azimuth detecting unit 60 and the azimuth information from the DBF unit 40, it is possible to improve the reliability in detecting a direction, to share the azimuth information, or to use the angle information of the DBF because the poor angle resolution does not cause a particular problem at a short distance.

Fifth Embodiment

An electronic scanning radar apparatus according to a fifth embodiment of the invention will be described below with reference to the accompanying drawings.

Figure 21:
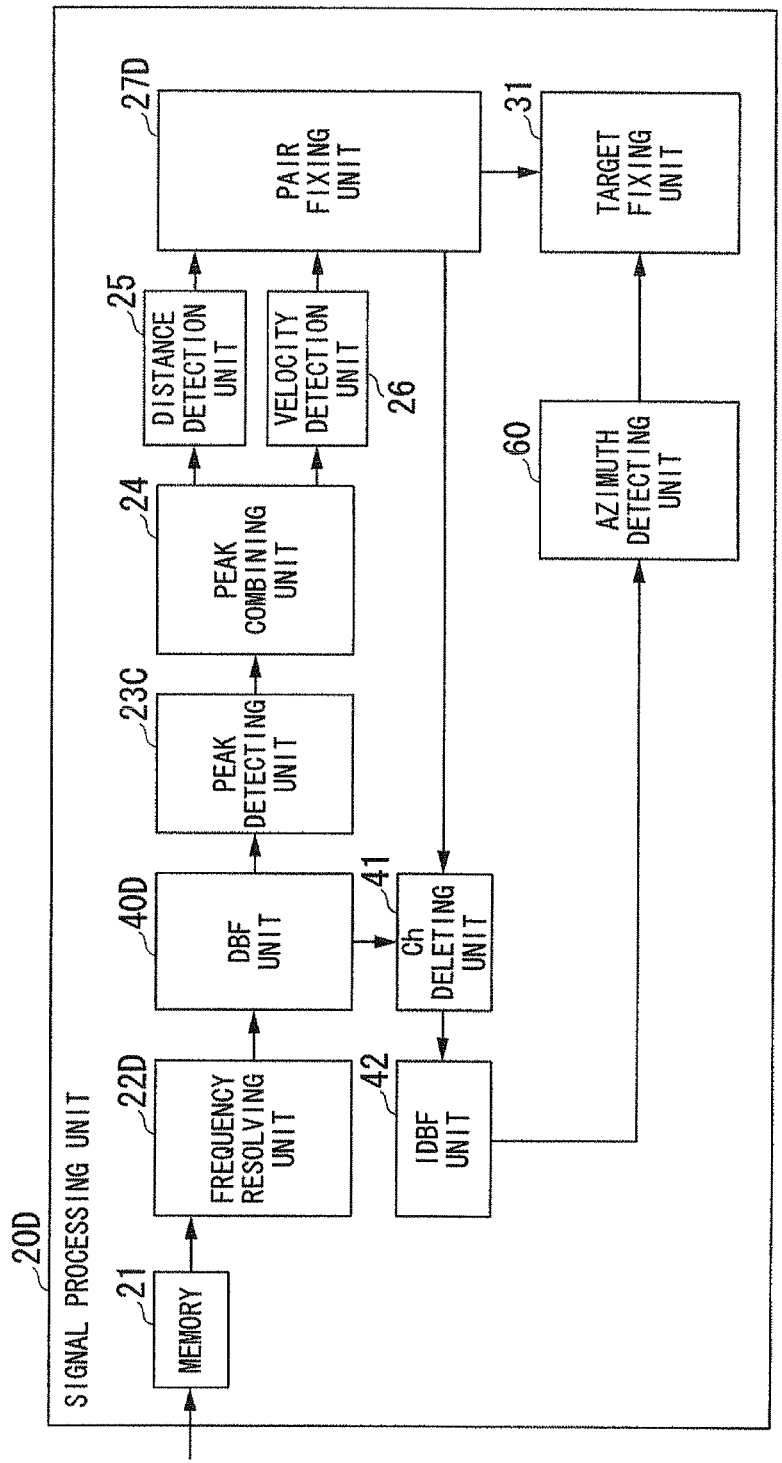
FIG. 21 is a block diagram illustrating the configuration of an electronic scanning radar apparatus according to a fifth embodiment of the invention.

FIG. 21 is a block diagram illustrating the configuration of the electronic scanning radar apparatus according to the fifth embodiment.

A signal processing unit 20D in the fifth embodiment performs an azimuth estimating process first using a DBF (Digital Beam Forming) with a resolution lower than that of the high-resolution algorithm such as the AR spectrum estimating process and performs an IDBF (Inverse DBF, that is, the inverse Fourier transform in a spatial axis) with a narrowed angle range of a target to return the data to complex data in the frequency axis, whereby the precision of the azimuth estimation to be performed later using the high-resolution algorithm is improved, unlike the first embodiment. The same elements as the fourth embodiment shown in FIG. 19 will be referenced by the same reference signs and the following description will be centered on the differences from the third embodiment.

In the fifth embodiment, a channel (Ch) deleting unit 41 and an IDBF unit 42 are added to the configuration of the fourth embodiment.

The frequency resolving unit 22D frequency-transforms the ascending region (ascending) and the descending region (descending) of the triangular wave into discrete times through the use of frequency resolution on the basis of sampled data of the beat signals stored in the memory 21. That is, the frequency resolving unit 22D resolves the beat signals into beat frequencies having a predetermined frequency bandwidth, calculates complex data based on the beat signals resolved for each beat frequency, and outputs the calculated complex data to the DBF unit 40D.

The DBF unit 40D performs a spatial-axis Fourier transform, similarly to the fourth embodiment, and outputs spatial complex data to the peak detecting unit 23C and the Ch deleting unit 41.

Figure 22A:
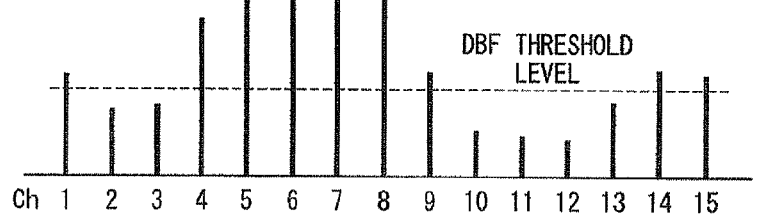
FIG. 22A is a conceptual diagram illustrating a spectrum intensity process in 15 angular channels as an example.

Here, DBF unit 40D performs the spatial-axis Fourier transform in the arrangement direction of the receiving antennas, for example, with a 16-point resolution in the fifth embodiment, as shown in FIG. 22A, generates a spectrum for each of 15 angular channels as a result, and outputs the generated spectra to the Ch deleting unit 41.

The Ch deleting unit 41 performs a process of detecting whether levels of the spectra of the spatial complex data corresponding to the peak frequency points (for example, the descending region) of the DBF target fixed by the pair fixing unit 27D are continuous within a predetermined angle range and is greater than the level of a predetermined DBF threshold and replacing the spectrum of the angular channel not greater than the DBF threshold with "0" and outputs the narrowed spatial complex data.

Figure 22B:
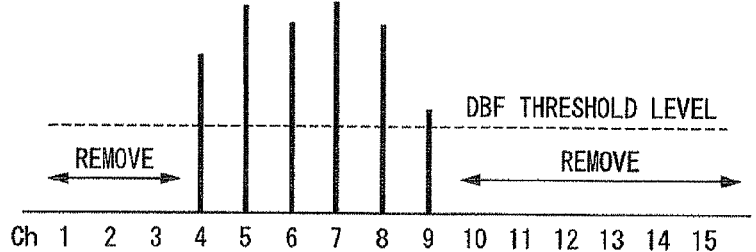
FIG. 22B is a conceptual diagram illustrating a spectrum intensity process in the angular channels shown in FIG. 22A.

In the above-mentioned process, for example, when four neighboring angular channels have a level continuously greater than the DBF threshold as shown in FIG. 22B, the Ch deleting unit 41 determines that one or more targets are present in the range, leaves the spectra of the angular channels, and replaces the intensities of the spectra of the other angular channels with "0".

The IDBF unit 42 narrows the spectra, that is, generates the spatial complex data in which only the data of the angular channels continuously greater than the DBF threshold value out of a predetermined number of angular channels are left and the intensities of the other angular channels are replaced with "0". The IDBF unit 42 performs the inverse spatial-axis Fourier transform on the replaced spatial complex data to return the spatial complex data to the complex data in the frequency axis and outputs the resultant complex data to the azimuth detecting unit 60.

Figure 22C:
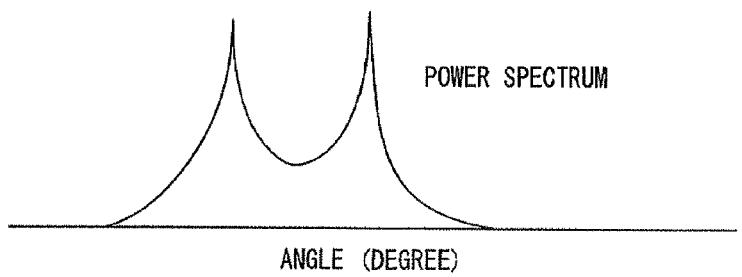
FIG. 22C is a conceptual diagram illustrating calculation of a power spectrum from the spectrum intensities in the angular channels shown in FIG. 22B.

In order to calculate a normal equation (or a correlation matrix) from the input complex data, the azimuth detecting unit 60 can calculate a normal equation (or a correlation matrix) from which the noise component is reduced by removing components of road-side objects. In FIG. 22C, the normal equation of a target group (referred to as a target group since two or more targets may be present in practice) with the DBF resolution shown in FIG. 22B is created using the above-mentioned method and the targets are further separated using a high-resolution algorithm.

Figure 23A:
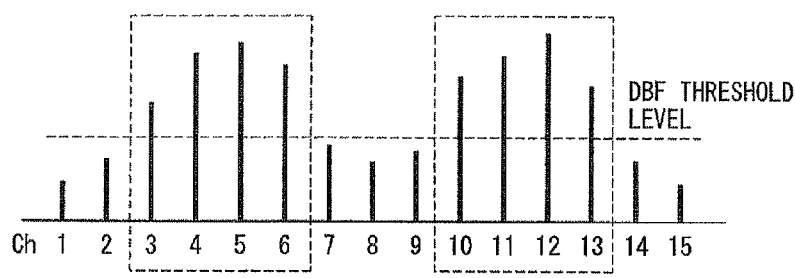
FIG. 23A is a conceptual diagram illustrating a spectrum intensity process in the angular channels.

As shown in FIG. 23A, when a received wave including reflected components from plural target groups is received, plural angular channels greater than the DBF threshold level out of the continuous angular channels are present in the spatial complex data output from the DBF unit 40D.

Figure 23B:
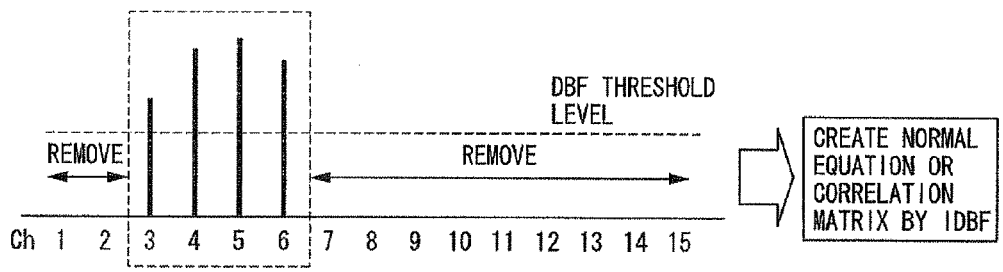
FIG. 23B is a conceptual diagram illustrating a spectrum intensity process in the angular channels.
Figure 23C:
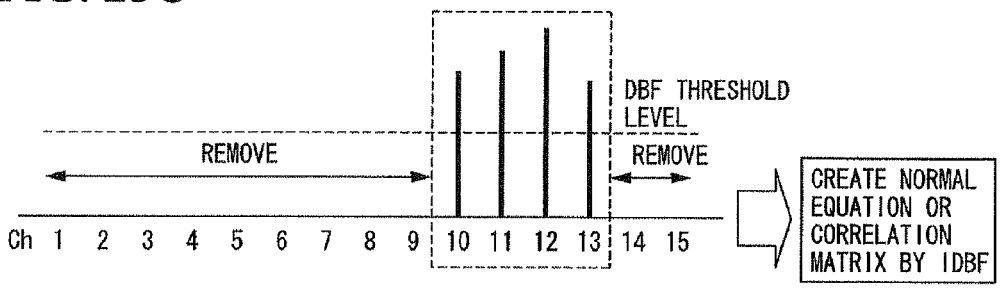
FIG. 23C is a conceptual diagram illustrating a spectrum intensity process in the angular channels.

The Ch deleting unit 41 divides the input spatial complex data into other spatial complex data identified in the angular channel regions. The Ch deleting unit 41 extracts the angular channel regions in which the levels of the spectra of the adjacent angular channels are continuously greater than the DBF threshold level in the predetermined angular channel range. The Ch deleting unit 41 replaces the intensities of the spectra other than the extracted angular channel regions with "0". As shown in FIGS. 23B and 23C, the Ch deleting unit 41 divides the input spatial complex data into other spatial complex data identified in the unit of angular channel regions.

Here, the pair fixing unit 27D calculates the distance, the relative velocity, the longitudinal position, and the lateral position, similarly to the first embodiment, and outputs the calculated information to the Ch deleting unit 41.

The Ch deleting unit 41 selects the spatial complex data corresponding to the frequency point of the DBF target, performs the above-mentioned Ch deletion thereon, and outputs the resultant spatial complex data to the IDBF unit 42.

The IDBF unit 42 performs the inverse spatial-axis Fourier transform on the input spatial complex data and outputs the acquired complex data in the frequency axis to the azimuth detecting unit 60.

The DBF unit 40D in the fifth embodiment calculates the spatial complex data indicating the intensity of the spectrum for each angular channel corresponding to the desired direction set on the basis of the digital beam forming. The DBF unit 40D detects the presence of a target and defines the detected target as a DBF detection target, when the intensities of the spectra of the adjacent angular channels are greater than a predetermined DBF threshold level within a predetermined angular channel width range. The DBF unit 40D replaces the spectrum intensities of the angular channels in which the presence of a target is not detected with "0". The Ch deleting unit 41 outputs the resultant data as new spatial complex data. The IDBF unit 42 generates reproduced complex data by performing the inverse DBF process on the new spatial complex data. The normal equation creating unit 611 creates a normal equation from the reproduced complex data.

When plural DBF detection targets are detected, the Ch deleting unit 41 in the fifth embodiment divides the spectra by the angular channels corresponding to the DBF detection targets and generates the spatial complex data corresponding to the number of DBF detection targets. The IDBF unit 42 generates reproduced complex data for each DBF detection target by performing the inverse DBF process on the spatial complex data for each DBF detection target. The normal equation creating unit 611 calculates a normal equation for each DBF detection target on the basis of the reproduced complex data for each DBF detection target.

By the above-mentioned processes, it is possible to narrow the detection direction range when calculating the spectra in the AR spectrum estimating process of the azimuth detecting unit 60 and to enhance the resolution, compared with the first to fourth embodiments.

By employing the above-mentioned configuration, it is like that the received waves divided with the reflected components of the target groups are virtually received in the normal equation (or the correlation matrix) used for the calculation of the AR coefficient in the azimuth detecting unit 60. Accordingly, for example, even when the received wave containing reflected components from more targets than the number of receiving antennas and the set order is received, the AR coefficient can be correctly calculated.

Sixth Embodiment

In a sixth embodiment of the invention, another example will be described with reference to the configuration of the electronic scanning radar apparatus shown in FIG. 1.

Figure 24:
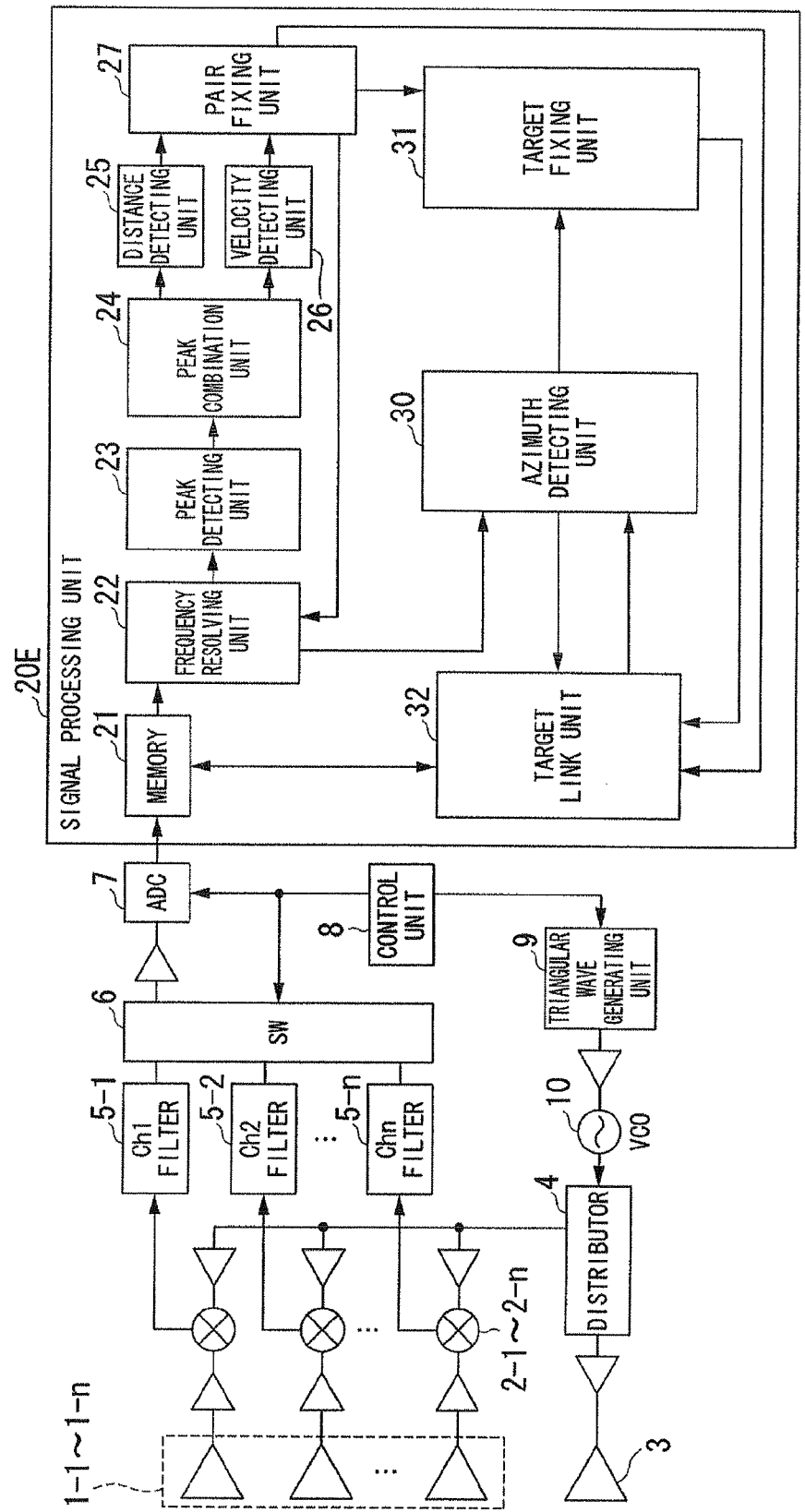
FIG. 24 is a block diagram illustrating the configuration of an electronic scanning radar apparatus according to a sixth embodiment of the invention.

FIG. 24 is a block diagram illustrating a part of the configuration of an electronic scanning radar apparatus.

The electronic scanning radar apparatus shown in FIG. 24 includes a signal processing unit 20E instead of the signal processing unit 20A shown in FIG. 1. The same elements as shown in FIG. 1 are referenced by the same reference signs.

The signal processing unit 20E includes a memory 21, a frequency resolving unit 22, a peak detecting unit 23, a peak combining unit 24, a distance detecting unit 25, a velocity detecting unit 26, a pair fixing unit 27, an azimuth detecting unit 30, a target fixing unit 31, and a target link unit 32.

The target fixing unit 31 binds the azimuth of the target detected by the azimuth detecting unit 30 to the distance r, the relative velocity v, and the frequency point, which is shown in FIG. 6, input from the pair fixing unit 27 and outputs the resultant information to the target link unit 32.

The target link unit 32 binds the target in the past detection cycle stored in the memory 21 and outputs the complex data recorded in the past detection cycle (FIG. 26) for each target to the azimuth detecting unit 30.

The target link unit 32 adds the identification information of the distance, the relative velocity, and the azimuth output from the target fixing unit 31 to the complex data acquired in the present detection cycle (FIG. 26) and records the resultant data in the memory 21.

The azimuth detecting unit 30 performs a spectrum estimating process using the AR spectrum estimating method as the high-resolution algorism or the method such as the MUSIC method. In the spectrum estimating process, the azimuth detecting unit 30 performs an averaging process on the normal equation created on the basis of the complex data acquired in the present detection cycle and the past detection cycle and performs the spectrum estimating process using the AR coefficient of the averaged normal equation and the variance of the input white noise. The azimuth detecting unit 30 detects the azimuth of the corresponding target on the basis of the result of the spectrum estimating process and outputs the detected azimuth to the target fixing unit 31.

Hereinafter, the configurational example where the AR spectrum estimating method known as a high-resolution algorithm is used in the spectrum estimation process will be described below in more detail.

Figure 25:
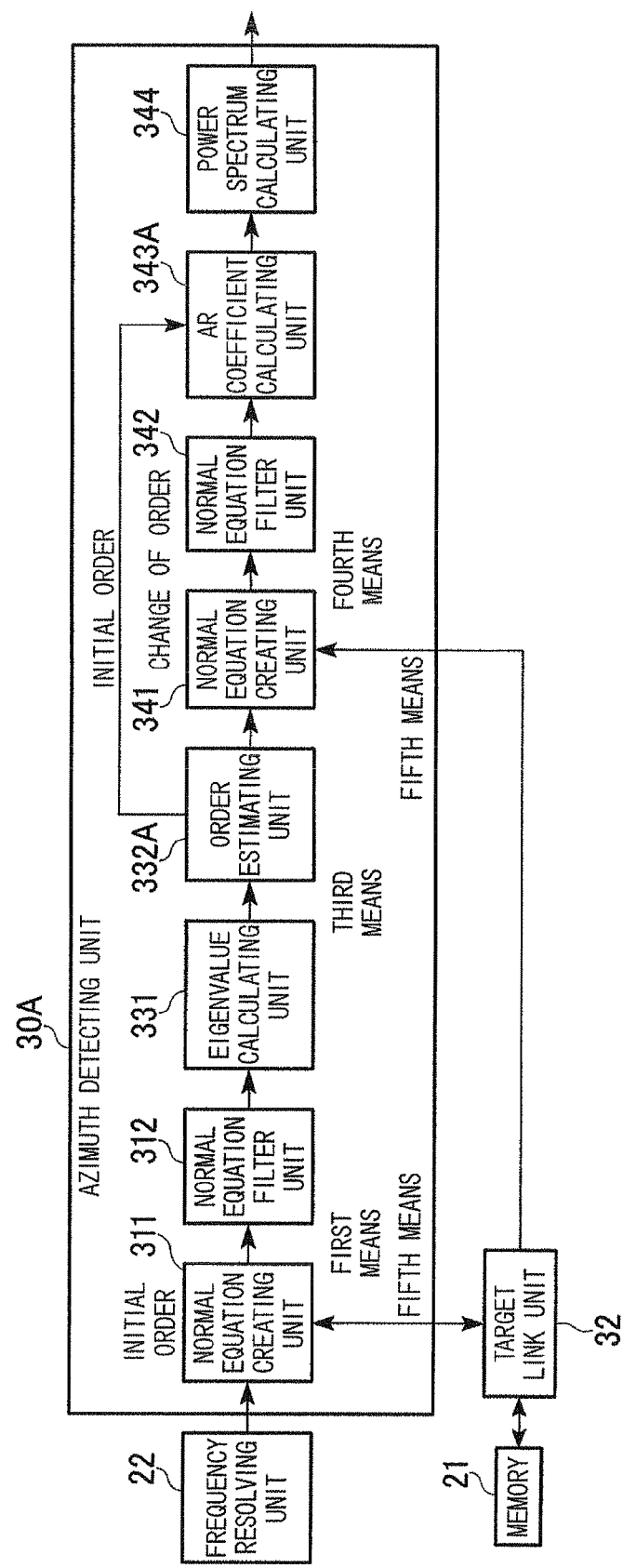
FIG. 25 is a block diagram illustrating the configuration of an azimuth detecting unit according to the sixth embodiment of the invention.

FIG. 25 is a block diagram illustrating the configuration of the azimuth detecting unit in the sixth embodiment.

The azimuth detecting unit 30A shown in FIG. 25 is an example of the azimuth detecting unit 30 shown in FIG. 24.

The azimuth detecting unit 30A includes a normal equation creating unit 311, a normal equation filter unit 312, an eigenvalue calculating unit 331, an order estimating unit 332A, a normal equation creating unit 341, a normal equation filter unit 342, an AR coefficient calculating unit 343A, and a power spectrum calculating unit 344.

In the sixth embodiment, the normal equation creating unit 311 and the normal equation filter unit 312 serve as first means, the eigenvalue calculating unit 331 and the order estimating unit 332A serve as third means, the normal equation creating unit 341 and the normal equation filter unit 342 serve as fourth means, and the normal equation creating unit 311 and the normal equation creating unit 341 serve as fifth means.

The normal equation creating unit 311 of the azimuth detecting unit 30A creates a normal equation necessary for estimating the order of a normal equation used for the AR spectrum estimating process in the subsequent step. The normal equation creating unit 311 creates a normal equation derived from the complex data corresponding to the beat frequencies (one or both of the ascending region and the descending region) frequency-resolved by the frequency resolving unit 22.

The azimuth detecting unit 30A acquires the complex data from the frequency resolving unit 22, creates the normal equation, outputs the acquired complex data to the target link unit 32, and stores the complex data in the memory 21. The azimuth detecting unit 30A acquires the complex data stored in the memory 21 via the target link unit 32. Accordingly, the azimuth detecting unit 30A creates the normal equations corresponding to the respective complex data on the basis of the complex data acquired in the "present detection cycle" and the complex data acquired in the "past detection cycle".

The normal equation filter unit 312 performs an averaging process on the normal equation in the "present detection cycle" and the normal equation in the "past detection cycle" created by the normal equation creating unit 311.

The eigenvalue calculating unit 331 performs a unitary transform on a matrix (a covariance matrix or a self-correlation matrix) which is a constituent part of the normal equation averaged by the normal equation filter unit 312. The eigenvalue calculating unit 331 calculates eigenvalues of the matrix (the covariance matrix or the self-correlation matrix) having been subjected to the unitary transform and determines the eigenvalue (the maximum eigenvalue) having the maximum value. The eigenvalue calculating unit 331 normalizes the calculated eigenvalues on the basis of the determined maximum eigenvalue, when the calculated eigenvalues are equal to or greater than a predetermined threshold value.

The order estimating unit 332A determines the eigenvalue normalized by the eigenvalue calculating unit 331 on the basis of a predetermined threshold value and selects the processing order (the secondary order) in the subsequent step on the basis of the determination result.

As a normal equation necessary for the AR spectrum estimating process, the normal equation creating unit 341 creates a normal equation (the secondary order normal equation) on the basis of the order estimated by the order estimating unit 332A. The normal equation creating unit 341 creates a normal equation derived from the complex data corresponding to the beat frequencies (one or both of the ascending region and the descending region) frequency-resolved by the frequency resolving unit 22. The normal equation creating unit 341 creates the normal equation on the basis of the complex data acquired from the frequency resolving unit 22 in the "past detection cycle" and stored in the memory 21.

The normal equation filter unit 342 performs an averaging process of averaging the normal equations created by the normal equation creating unit 341 on the basis of the complex data in the "present detection cycle" and the "past detection cycle".

The AR coefficient calculating unit 343A calculates the AR coefficient derived from the normal equation averaged by the normal equation filter unit 342 or 312 and the variance $\sigma^2$ of the input white noise. In this way, the AR coefficient calculating unit 343A can derive the AR coefficient based on the complex data of the detection beat frequency which is the beat frequency from which the presence of a target and the variance $\sigma^2$ of the input white noise for each antenna in each detection cycle. The AR coefficient calculating unit 343A outputs the derived AR coefficient and the derived variance $\sigma^2$ of the input white noise to the power spectrum calculating unit 344.

The power spectrum calculating unit 344 calculates the DOA of the received wave from the power spectrum derived on the basis of the AR coefficient and the variance $\sigma^2$ of the input white noise.

Figure 26:
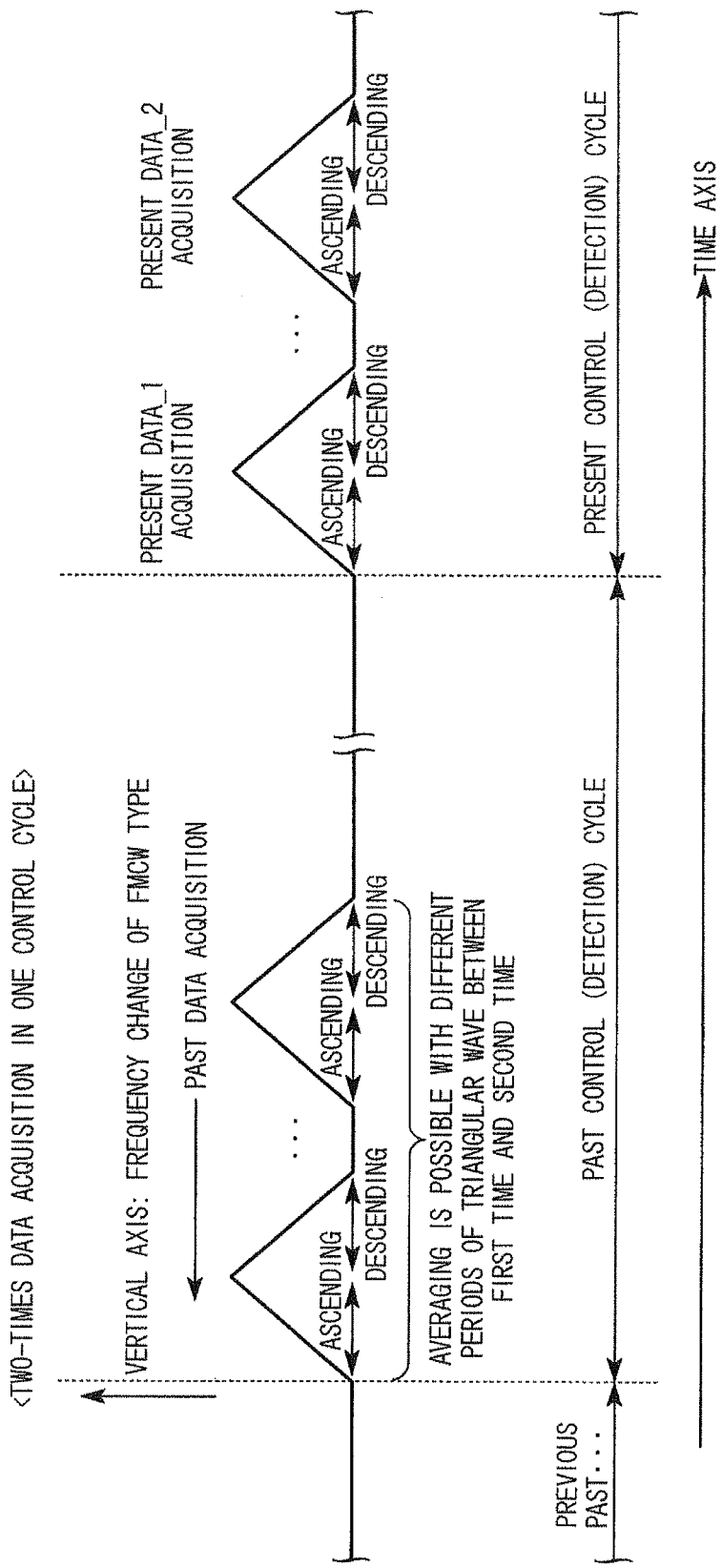
FIG. 26 is a timing diagram illustrating a data acquisition process in detection cycles.

FIG. 26 is a timing diagram illustrating a data acquiring process in the detection cycles.

The past control (detection) cycles performed previously to the present control (detection) cycle are shown in FIG. 26.

In each cycle, at least one data acquisition is performed and the one data acquisition is indicated by a triangular waveform. The triangular waveform represents a signal modulated by the FMCW method, and the ascending at the rising timing and the descending at the falling timing are detected.

The individual data acquisition is repeatedly performed at such a time gap not to interfere with each other and the frequency modulation period of the triangular wave may not be constant.

For example, two times of data acquisition are performed in the present control (detection) cycle, the first data acquisition is represented by "present data_1 acquisition", and the second data acquisition is represented by "present data_2 acquisition". Two times of data acquisition are performed in the past control (detection) cycle, the first data acquisition is represented by "past data_1 acquisition", and the second data acquisition is represented by "past data_2 acquisition".

In the sixth embodiment, various averaging processes in the subsequent steps are performed on the basis of the plural pieces of complex data acquired in the same cycle, in each of the present detection cycle and the past detection cycle.

The control (detection) cycle in which data is presently acquired is referred to as "present control (detection) cycle" and the control (detection) cycle in which data was acquired previously to the "present control (detection) cycle" is referred to as "past control (detection) cycle".

Figure 27:
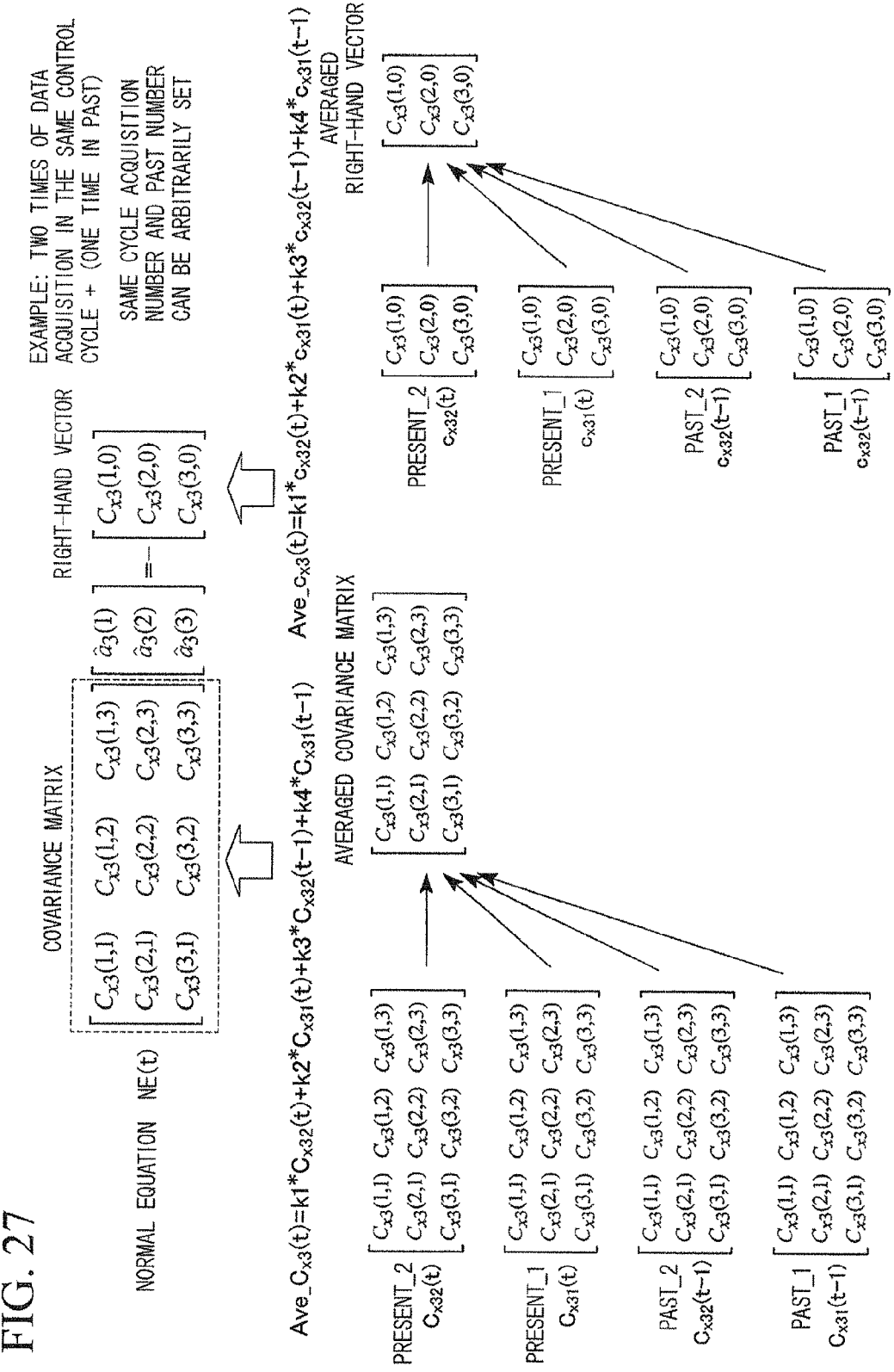
FIG. 27 is a diagram illustrating a normal equation based on the acquired complex data and an averaging process thereof.

FIG. 27 is a diagram illustrating the configuration of a normal equation based on the acquired complex data and the averaging process thereof.

The normal equation shown in FIG. 27 includes as constituent parts a covariance matrix which is a M-th-order normal matrix, an AR coefficient of M rows and 1 column, and a right-hand vector of M rows and 1 column.

The covariance matrix and the right-hand vector are created on the basis of the acquired complex data. The AR coefficient is calculated by solving the normal equation.

As shown in FIG. 26, data are acquired plural times in plural control (detection) cycles. The covariance matrix $C_{xxk}(t)$ and the right-hand vector $c_{xxk}(t)$ are created in the acquisition order of the acquired complex data.

In FIG. 26, the number of times that data is acquired in one control (detection) cycle is set to two. To correspond to the times of data acquisition in the present control (detection) cycle, the covariance matrices $C_{xx1}(t)$ and $C_{xx2}(t)$ and the right-hand vectors $c_{xx1}(t)$ and $c_{xx2}(t)$ are expressed in the order of "present_1" and "present_2". To correspond to the times of data acquisition in the past control (detection) cycle, the covariance matrices $C_{xx1}(t-1)$ and $C_{xx2}(t-1)$ and the right-hand vectors $c_{xx1}(t-1)$ and $c_{xx2}(t-1)$ are expressed in the order of "past_1" and "past_2".

In the sixth embodiment, the process of averaging the normal equation to be described later is performed on the basis of the complex data acquired plural times in the same control (detection) cycle, in each of the present control (detection) cycle and the past control (detection) cycle. By averaging the elements of the covariance matrices $C_{xxk}(t)$ and the right-hand vectors $c_{xxk}(t)$ corresponding to four times of "present_1", "present_2", "past_1", and "past_2", the averaging process is performed.

A computational expression for calculating an averaged covariance matrix Ave_$C_{xxk}(t)$ through the process of averaging the normal equation is expressed by Expression 13.

$$\text{Ave\_}C_{xx}(t) = k1^* C_{xx2}(t) + k2^* C_{xx1}(t) + k3^* C_{xx2}(t-1) + k4^* C_{xx1}(t-1) \quad (13)$$

In Expression 13, k1* to k4* represent weighting coefficients.

A computational expression for calculating an averaged right-hand vector Ave_$c_{xxk}(t)$ through the process of averaging the normal equation is expressed by Expression 14.

$$\text{Ave\_}c_{xx}(t) = k1^* c_{xx2}(t) + k2^* c_{xx1}(t) + k3^* c_{xx2}(t-1) + k4^* c_{xx1}(t-1) \quad (14)$$

When the eigenvalues are calculated on the basis of the averaged normal equation, the eigenvalues of the covariance matrix in the averaged normal equation are calculated.

A specific process of averaging the normal equations in the present detection cycle and the past detection cycle in the sixth embodiment will be described below. This averaging process is mainly performed by the normal equation filter units 312 and 342 of the azimuth detecting unit 30A and the target link unit 32 in FIG. 25.

FIG. 28 is a diagram illustrating a table stored in the memory 21.

To perform the process of averaging the normal equation in the normal equation filter units 312 and 342, the target link unit 32 performs the following process of linking the present target group (t), a target (t) predicted from the fixed past target data, and the target (t−1) fixed in the past for each target in the table shown in FIG. 28.

In FIG. 28, t−1 is the result of the (previous) detection cycle previous by one cycle.

As the results of the detection cycles, for each fixed target, the distance r, the longitudinal position long_d (a position in the direction perpendicular to the arrangement direction of antennas), the lateral position late_d (a position in the direction parallel to the arrangement direction of antennas), the relative velocity velo (that is, v) to the target, the ascending peak frequency point f_up, the complex data x_up_1 and x_up_2 of the ascending peak frequencies, the descending peak frequency point f_dwn, and the complex data x_dwn_1 and x_dwn_2 of the descending peak frequencies are stored in the memory 21 in the table format shown in FIG. 28 (Accurately, the memory areas of the complex data x_up_1 and x_up_2 of the ascending peak frequencies and the complex data x_dwn_1 and x_dwn_2 of the descending peak frequencies are greater than the other memory areas, but are shown in the same area for the purpose of easy understanding of the table). Here, the longitudinal position long_d and the lateral position late_d of a target are calculated from the angle of the target (the angle of the DOA of the received wave) and the distance r. When the angle is $\theta$ and the distance is r, the longitudinal position long_d is calculated by r·cos $\theta$ and the lateral position late_d is calculated by r·sin $\theta$.

The target link unit 32 predicts the distance r, the longitudinal position long_d, the lateral position late_d, the relative velocity, and the peak frequency point for each target in the present cycle from the distance r, the longitudinal position long_d, the lateral position late_d, the relative velocity veto, and the peak frequency point of a target fixed in the past in advance. For example, the prediction of the longitudinal position long_d, the lateral position late_d, and the peak frequency point is carried out within a movable range after the detection cycle on the basis of the distance r, the longitudinal position long_d, the lateral position late_d, and the peak frequency point in the previous detection cycle. The prediction of the relative velocity can be carried out by calculating the variation slope of the relative velocity in any past cycle.

For example, the target link unit 32 forms a predetermined movable range, a predetermined frequency point range, and a relative velocity range to correspond to the distance r, the longitudinal position long-d, the lateral position late_d, the peak frequency point, and the relative velocity predicted from the results fixed in the past, performs a linking process depending on whether the values calculated in the present cycle are within the ranges, and determines that they are different targets when the calculated values are not within the ranges.

When the target in the present detection cycle is linked to the past target in the table shown in FIG. 28, the target link unit 32 transfers the result of the present detection cycle to the result of (t−1) and calculates the prediction result of the subsequent cycle.

When a past target not linked to the results of the present target groups is present, the target link unit 32 clears all the information of the past target.

Accordingly, in a detection cycle in which a target is within the distance range to be influenced by multi path and no peak is not detected in the beat frequency, the filter effect using the results of the past target groups is reset. In the sixth embodiment shown in FIG. 28, the result of a target in one past detection cycle is stored in the memory 21.

When a past target not linked to the targets in the present detection cycle is detected, the target link unit 32 may hold the result of the fixed past target by a predetermined cycle number.

Since the stored results are sequentially updated, the prediction results based on the past results are sequentially updated. The target link unit 32 may use the past data other than the number of cycles in which no peak is detected due to the influence of multipath or the like for the filtering process, when no target is detected due to the influence of multipath or the like but the past target is associated with a next or later cycle.

Like the extrapolation method in tracking control, in a detection cycle in which a peak value is not detected, the presence of a target may be maintained using the prediction result as the result in the present detection cycle.

In the method of calling complex data shown in the drawing, the target link unit 32 can select an estimation range on the basis of distance point information corresponding to a previously detected target, thereby enhancing the processing efficiency. That is, the target link unit 32 can define the estimation range on the basis of the relative velocity and the angle about a target when referring to the stored complex data. In the next detection cycle, it is possible to select the estimation range based on the distance point information corresponding to the previously detected target. Accordingly, the target link unit 32 can enhance the processing efficiency. Therefore, the target link unit 32 can refer to the complex data corresponding to the distance point within the defined range, thereby enhancing the call precision.

Figure 29:
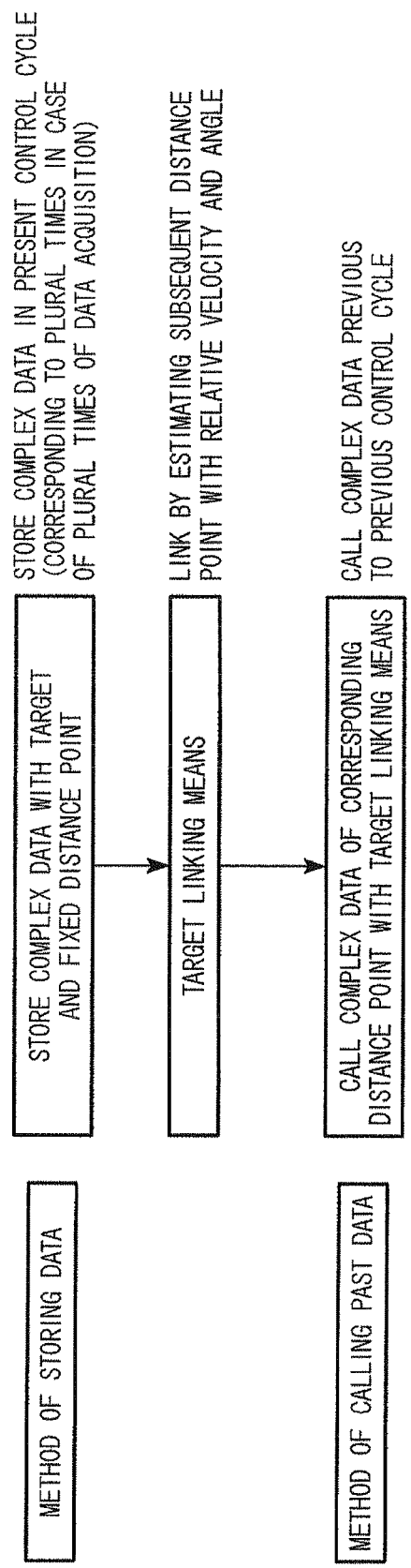
FIG. 29 is a diagram illustrating methods of storing and calling complex data.

FIG. 29 is a diagram illustrating the methods of storing and calling complex data.

In the method of storing an AR coefficient shown in the drawing, the target link unit 32 performs a correlation with the distance point finally fixed as a target and stores the complex data in the memory 21.

Accordingly, the azimuth detecting unit 30 can perform the linking to the target using the distance point information as a key.

Figure 30:
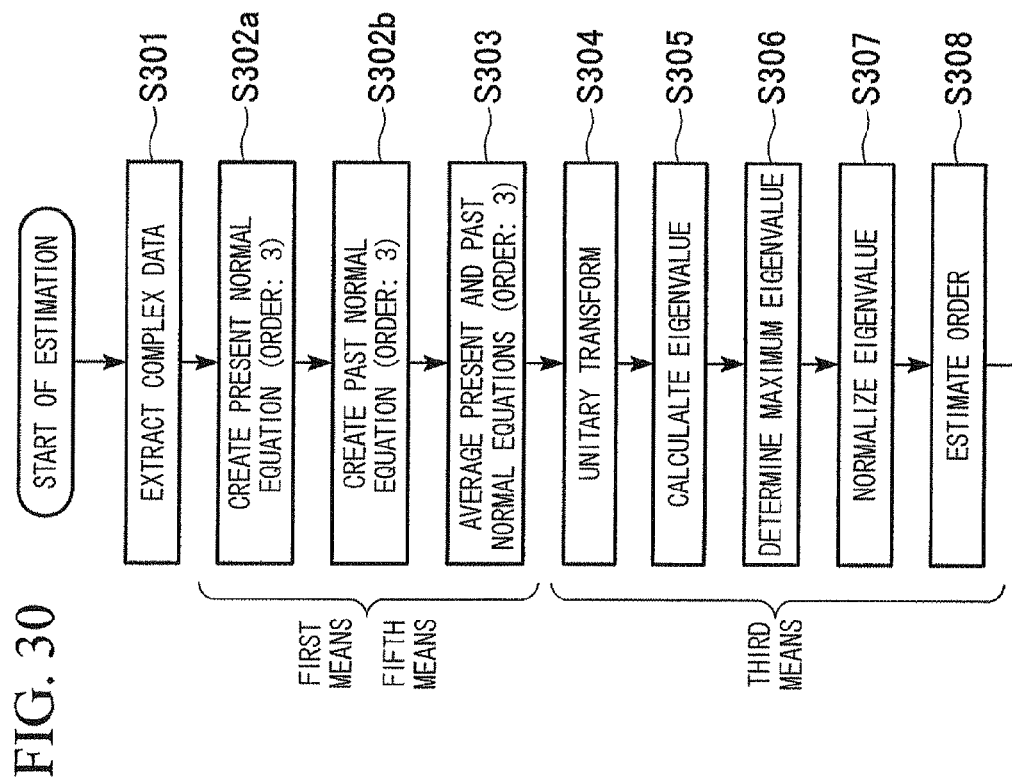
FIG. 30 is a flowchart illustrating a flow of processes in the sixth embodiment.

The description will be made with reference to the flowchart shown in FIG. 30. The flow of processes is repeatedly performed for each control cycle (see FIG. 26) and for individual targets selected by the peak detection through the use of the entire configuration of the radar.

In step S301, the complex data for each channel (CH) is acquired one or more times in the same control cycle. The frequency resolving unit 22 reads the beat signals based on the received wave stored in the memory 21 and frequency-transforms the beat signal for each antenna.

The acquired complex data are complex data frequency-transformed in the present detection cycle and the previous detection cycle and may be processed separately in the ascending and the descending by individually using one or both of the ascending data and the descending data of the frequency-modulated triangular wave.

In step S302a, the normal equation creating unit 311 creates the normal equation of the order corresponding to the maximum order of the AR model for each acquisition time on the basis of the complex data acquired in the present detection cycle. In the sixth embodiment, the maximum order is set to three.

In step S302b, the normal equation creating unit 311 creates the normal equation of the order corresponding to the maximum order of the AR model for each acquisition time on the basis of the complex data acquired in the past detection cycle. In the sixth embodiment, the maximum order is set to three.

In step S303, the normal equation filter unit 312 averages the elements of the covariance matrix and the right-hand vector (cross-correlation vector) of the normal equation created in step S302b.

The processes of steps S302 and S303 correspond to the first means in the sixth embodiment and the covariance matrix of the modified covariance method is itself used as the correlation matrix used to calculate the eigenvalues in the subsequent step. The covariance matrix of the AR model is the same Herimitian matrix (complex symmetric matrix) as the correlation matrix to be described later and the eigenvalues have the same features. Therefore, it is possible to calculate the eigenvalues using the maximum order of the AR model.

The processes of steps S304 and S309 correspond to the third means in the sixth embodiment.

In step S304, the eigenvalue calculating unit 331 performs a unitary transform to transform the created covariance matrix into a real correlation matrix (symmetric matrix).

In step S305, the eigenvalue calculating unit 331 calculates the eigenvalues of the unitary-transformed matrix. Details of steps S304 and S305 are shown in FIG. 11 according to the first embodiment.

In step S306, the order estimating unit 332A calculates the maximum eigenvalue out of the eigenvalues of the correlation matrix $R_{XX}$ transformed in step S305, In step S307, the order estimating unit 332A normalizes the values of the elements with reference to the calculated maximum value, that is, divides the values of the elements by the maximum value.

In step S308, the order for optimizing the spectrum estimating process to be performed in the subsequent stage is estimated.

The series of processes of steps S306 to S308 is referred to as a model order estimating process. The details of the model order estimating process are referred to the first embodiment.

In step S309, the order estimating unit 332A determines whether the order estimated in step S308 is three. When it is determined in step S309 that the estimated order is three, the process of step S312 is performed.

When it is determined in step S309 that the estimated order is not three, the process of changing the order of the normal equation is performed, which corresponds to the fourth means and the fifth means of steps S310 and S311.

In step S310a, the normal equation creating unit 341 performs the normal equation creating process of creating a normal equation on the basis of the complex data acquired in the present detection cycle to correspond to the order (order one or order two in the sixth embodiment) estimated by the order estimating unit 332A in step S308.

In step S310b, the normal equation creating unit 341 performs the normal equation creating process of creating a normal equation on the basis of the complex data acquired in the past detection cycle to correspond to the order (order one or order two in the sixth embodiment) estimated by the order estimating unit 332A in step S308.

In step S311, the normal equation filter unit 342 performs the averaging process of averaging the normal equations created by the normal equation creating unit 341 in steps S310a and S310b. The details of the process of averaging the normal equations are referred to FIG. 27.

When it is determined as the order determination result in step S309 that the order should be lower than the initially-set order (order three in the sixth embodiment), the normal equation creating unit 341 creates a lower-order normal equation than the initially-set order. This is a part corresponding to the change based on the order estimation result and the lower order is one of order two and order one in the sixth embodiment.

By storing the data acquired in step S301 as the complex data used to create the normal equation, it is possible to flexibly cope with the order change. When it is determined that the estimated order is three, the normal equation created in step S302 and averaged in step S303 is used in the subsequent steps without being subjected to the processes of steps S310 and S311.

In step S312, the AR coefficient calculating unit 343A calculates the AR coefficient and the variance of the input white noise from the normal equation averaged in step S311 or S303.

In step S313, the power spectrum calculating unit 344 calculates the power spectrum on the basis of the AR coefficient and the variance of the input white noise calculated in step S312.

In step S314, the power spectrum calculating unit 344 detects the number of targets and the angles indicating the directions of the targets on the basis of the calculated power spectrum.

Seventh Embodiment

Another example of the spectrum estimating process using the AR spectrum estimating method known as a high-resolution algorithm will be described below in more detail with reference to the accompanying drawings.

A seventh embodiment of the invention includes second means instead of the first means described in the sixth embodiment. The second means creates a correlation matrix used to calculate the eigenvalues in a way unlike the first means.

Figure 31:
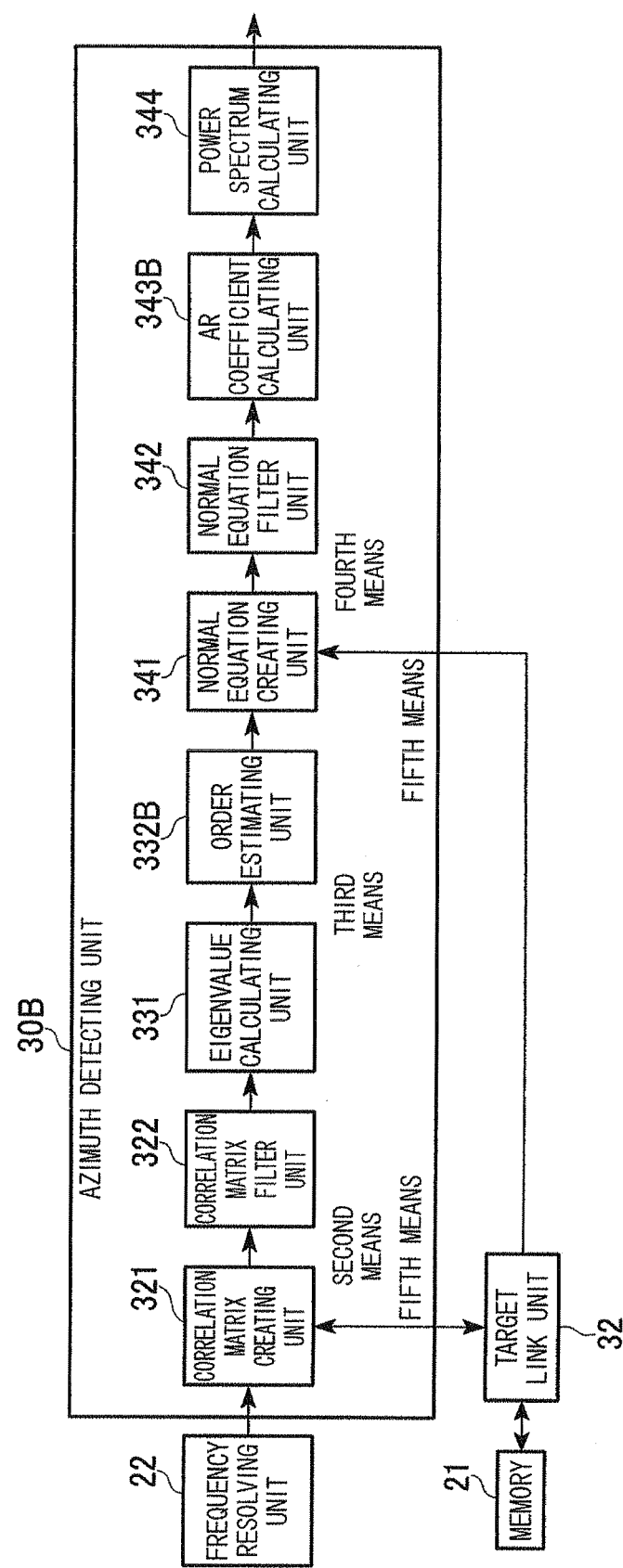
FIG. 31 is a block diagram illustrating the configuration of an azimuth detecting unit according to a seventh embodiment of the invention.

FIG. 31 is a block diagram illustrating the configuration of an azimuth detecting unit in the seventh embodiment.

The azimuth detecting unit 30B shown in FIG. 31 is an example of the azimuth detecting unit 60 shown in FIG. 1.

The azimuth detecting unit 30B includes a correlation matrix creating unit 321, a correlation matrix filter unit 322, an eigenvalue calculating unit 331, an order estimating unit 332B, a normal equation creating unit 341, a normal equation filter unit 342, an AR coefficient calculating unit 343B, and a power spectrum calculating unit 344. The same elements as shown in FIG. 25 are referenced by the same reference signs, and when not particularly described, the normal equation creating unit 311, the normal equation filter unit 312, the order estimating unit 332A, and the AR coefficient calculating unit 343A are replaced with the correlation matrix creating unit 321, the correlation matrix filter unit 322, the order estimating unit 332B, and the AR coefficient calculating unit 343B.

In the seventh embodiment, the correlation matrix creating unit 321 and the correlation matrix filter unit 322 serve as the second means, the eigenvalue calculating unit 331 and the order estimating unit 332B serve as the third means, the normal equation creating unit 341 and the normal equation filter unit 342 serve as the fourth means, the correlation matrix creating unit 321 and the normal equation creating unit 341 serve as the fifth means.

The correlation matrix creating unit 321 of the azimuth detecting unit 30B creates a correlation matrix necessary to estimate the order of the normal equation of the AR spectrum estimating process in the subsequent steps. The correlation matrix creating unit 321 creates the correlation matrix derived from the complex data corresponding to the beat frequencies (one or both of the ascending and the descending) frequency-resolved by the frequency resolving unit 22.

The azimuth detecting unit 30B acquires the complex data from the frequency resolving unit 22, creates the correlation matrix and the normal equation, outputs the acquired complex data to the target link unit 32, and stores the complex data in the memory 21. The azimuth detecting unit 30B acquires the complex data stored in the memory 21 via the target link unit 32. Accordingly, the azimuth detecting unit 30B creates the correlation matrix and the normal equations corresponding to the respective complex data on the basis of the complex data acquired in the "present detection cycle" and the complex data acquired in the "past detection cycle".

The correlation matrix filter unit 322 performs an averaging process on the correlation matrix in the "present detection cycle" and the correlation matrix in the "past detection cycle" created by the correlation matrix creating unit 321.

The eigenvalue calculating unit 331 performs a unitary transform on the correlation matrix averaged by the correlation matrix filter unit 322. The other processes of the eigenvalue calculating unit 331 are the same as in the first embodiment.

The order estimating unit 332B determines the eigenvalue normalized by the eigenvalue calculating unit 331 on the basis of a predetermined threshold value and selects the processing order (the secondary order) in the subsequent step on the basis of the determination result.

The AR coefficient calculating unit 343B calculates the AR coefficient and the variance $\sigma^2$ of the input white noise derived from the normal equation averaged by the normal equation filter unit 342. In this way, the AR coefficient calculating unit 343B can derive the AR coefficient and the variance $\sigma^2$ of the input white noise based on the complex data of the detection beat frequency as a beat frequency from which the presence of a target is detected for each antenna by the detection cycles. The AR coefficient calculating unit 343B outputs the derived AR coefficient and the derived variance $\sigma^2$ of the input white noise to the power spectrum calculating unit 344.

Figure 32:
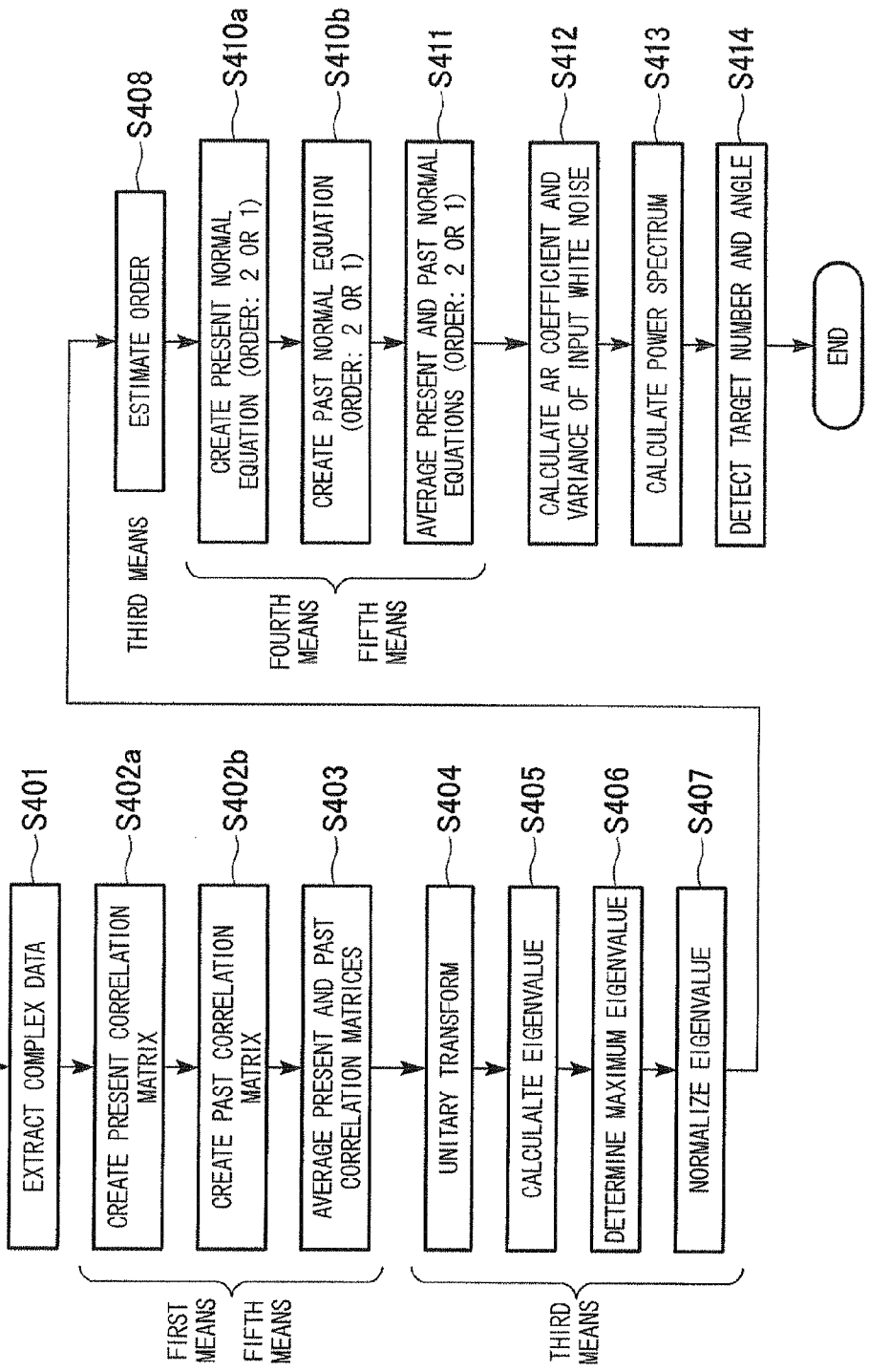
FIG. 32 is a flowchart illustrating a flow of processes in the seventh embodiment.

The description will be made with reference to the flowchart shown in FIG. 32. The flow of processes is repeatedly performed for each control cycle (see FIG. 26) and for individual targets selected by the peak detection through the use of the entire configuration of the radar. Steps S401 to S414 shown in FIG. 32 correspond to steps S301 to S314 shown in FIG. 30 and the description will be centered on the steps of performing processes other than described in the sixth embodiment.

In step S402a, the correlation matrix creating unit 321 creates the correlation matrix of the order matched with the maximum order of the AR model for each acquisition on the basis of the complex data acquired in the present detection cycle. In the seventh embodiment, the maximum order is set to three.

In step S402b, the correlation matrix creating unit 321 creates the correlation matrix of the order matched with the maximum order of the AR model for each acquisition on the basis of the complex data acquired in the past detection cycle. In the seventh embodiment, the maximum order is set to three.

In step S403, the correlation matrix filter unit 322 averages the elements of the correlation matrix created in step S402.

The processes of steps S402 and S403 correspond to the second means in the seventh embodiment. Since the maximum order of the covariance matrix of the AR model in the subsequent step is three, a order three correlation matrix is created as the correlation matrix used to calculate the eigenvalues in the subsequent step.

When the order of the created correlation matrix is three, the complex data corresponding to at least three channels is sufficient. If the complex data corresponding to five channels are provided, the complex data can be used to enhance the precision.

The process of averaging the correlation matrix will be described with reference to FIG. 33.

Figure 33:
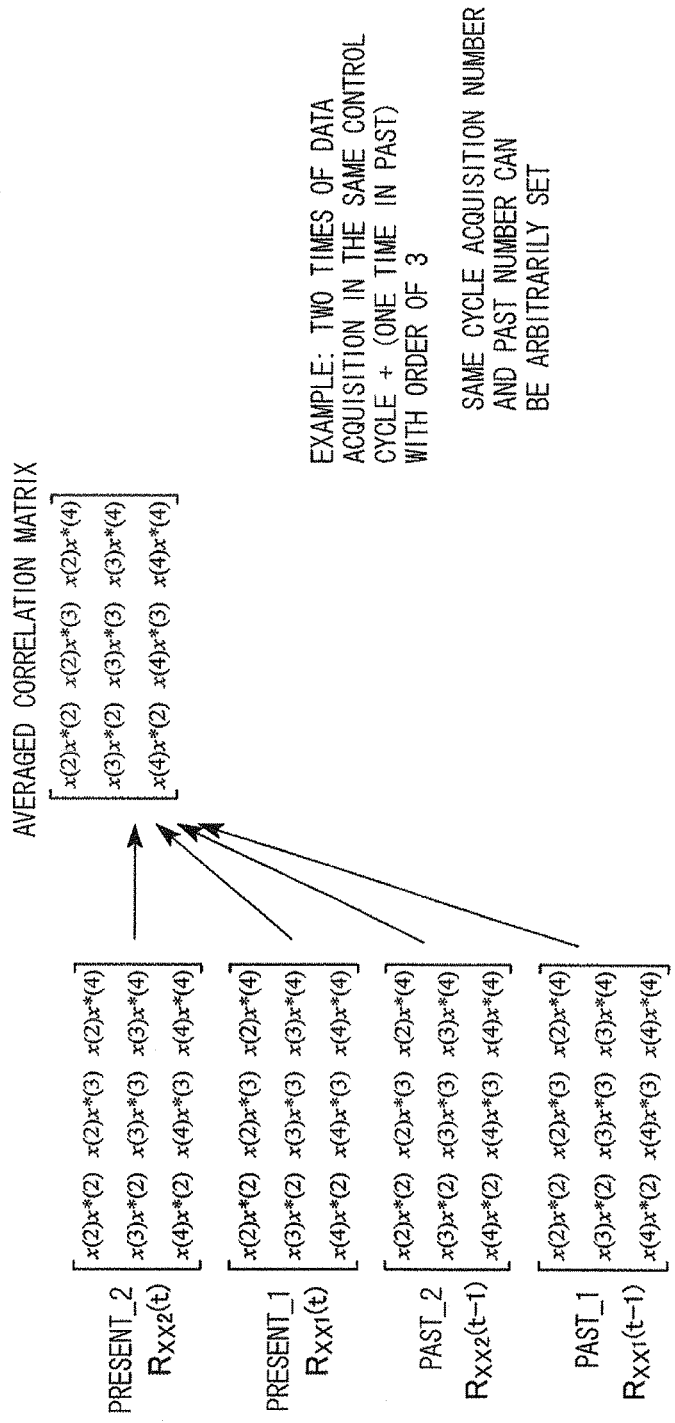
FIG. 33 is a diagram illustrating a correlation matrix averaging process.

FIG. 33 is a diagram illustrating the configuration of the correlation matrix based on the acquired complex data and the averaging process thereof.

The correlation matrix shown in FIG. 33 is a order three square matrix.

The correlation matrix is created on the basis of the acquired complex data. The specific creation method is referred to the second embodiment.

As shown in FIG. 26, complex data are acquired in plural control (detection) cycles. The correlation matrices $R_{xxk}(t)$ are created in the acquisition order of the acquired complex data.

In FIG. 26, the number of times that data is acquired in one control (detection) cycle is set to two. To correspond to the times of data acquisition in the present control (detection) cycle, the correlation matrices $R_{xx1}(t)$ and $R_{xx2}(t)$ are expressed in the order of "present_1" and "present_2". To correspond to the times of data acquisition in the past control (detection) cycle, the correlation matrices $R_{xx1}(t-1)$ and $R_{xx2}(t-1)$ are expressed in the order of "past_1" and "past_2".

In the seventh embodiment, the process of averaging the correlation matrix to be described later is performed on the basis of the complex data acquired plural times in the same control (detection) cycle, in each of the present control (detection) cycle and the past control (detection) cycle. By averaging the elements of the correlation matrices $R_{xxk}(t)$ corresponding to four times of "present_1", "present_2", "past_1", and "past_2", the averaging process is performed.

A computational expression for calculating an averaged correlation matrix Ave_$R_{xxk}(t)$ through the process of averaging the correlation matrix $R_{xx}$ is expressed by Expression 15.

$$\text{Ave\_}R_{XX}(t) = k1 * R_{xx2}(t) + k2 * R_{XX1}(t) + k3 * R_{xx2}(t-1) + k4 * R_{XX1}(t-1) \qquad (15)$$

The correlation matrix obtained by the averaging is a symmetric matrix (Herimitian matrix) having the complex data and the order thereof is limited to the maximum order of the normal equation used for the AR spectrum estimation performed in the subsequent step. By limiting the order in this way, it is possible to perform the eigenvalue calculation with a light computational load on a small correlation matrix.

The correlation matrices corresponding to the acquisition number by which data is acquired in the same control cycle are averaged (step S403).

The processes of steps S410a, S410b, and S411 will be described with reference to FIG. 32 again.

The processes of steps S410a, S410b, and S411 correspond to the fourth means and the fifth means in the seventh embodiment.

The fourth means and the fourth means in the seventh embodiment are different from the fourth means and the fifth means in the sixth embodiment, in that the normal equation is created for any order on the basis of the order estimated by the third means. In the sixth embodiment, the maximum order of normal equation is created in advance to calculate the eigenvalues. Accordingly, when the estimated order is the maximum order, a new normal equation is not created but the normal equation created in advance can be used. In the seventh embodiment, since the eigenvalues are calculated on the basis of the correlation matrix, it is necessary to create the normal equations for all the orders (the orders 1 to 3 in the seventh embodiment).

Eighth Embodiment

An electronic scanning radar apparatus according to an eighth embodiment of the invention will be described below with reference to the accompanying drawings.

Figure 34:
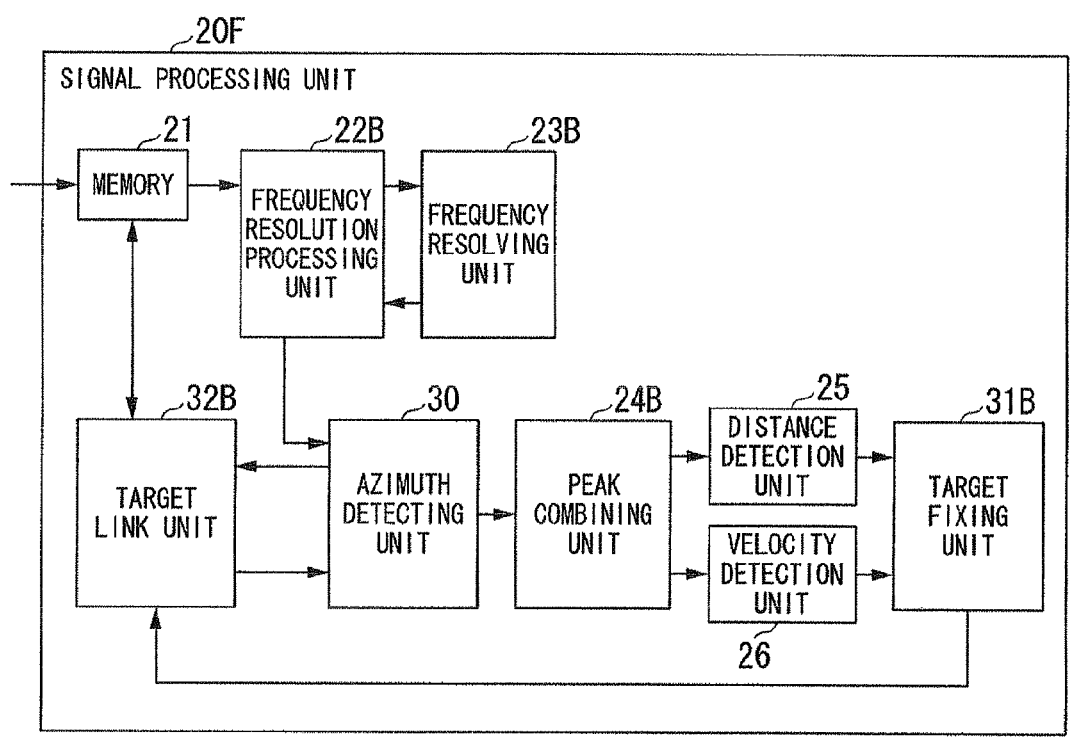
FIG. 34 is a block diagram illustrating the configuration of an electronic scanning radar apparatus according to an eighth embodiment of the invention.

FIG. 34 is a block diagram illustrating the configuration of the electronic scanning radar apparatus according to the eighth embodiment.

In the eighth embodiment, the azimuth is estimated using a high-resolution algorithm, similarly to the sixth and seventh embodiments. The same elements as the sixth and seventh embodiments shown in FIG. 24 will be referenced by the same reference signs and the following description will be centered on the differences from the sixth embodiment.

The frequency resolving unit 22B of the signal processing unit 20F transforms the beat signals of the ascending region and the descending region for each antenna into complex data and outputs the frequency points indicating the beat frequencies thereof and the complex data to the peak detecting unit 23B.

The peak detecting unit 23B detects the peak values of the ascending region and the descending region and the frequency points at which the peak values are present and outputs the frequency points to the frequency resolving unit 22B.

The frequency resolving unit 22B outputs the complex data corresponding to the ascending region and the descending region to the azimuth detecting unit 30B.

These complex data are target groups (beat frequencies having peaks in the ascending region and the descending region) of the ascending region and the descending region. Here, the function of the peak detecting unit 23B can be replaced with the maximum eigenvalue determination (step S106a) in the model order estimating process of the azimuth detecting unit, and thus the peak detecting unit may be deleted.

Since the target link unit 32B needs to link both target groups of the ascending and the descending to the previously fixed target, the table shown in FIG. 35 is stored in the memory 21.

The target link unit 32B links the present detection cycle to the past detection cycle through the same process as the target link unit 32 shown in FIG. 24.

The azimuth detecting unit 30 performs the processes of estimating the order of the normal equation and averaging the normal equation, which are described in the sixth and seventh embodiment, in the ascending region and the descending region.

The azimuth detecting unit 30 detects the angle θ for the AR coefficient of the ascending region and the AR coefficient of the descending region and outputs the detected angles to the peak combining unit 24B as the tables shown in FIGS. 36A and 36B.

The peak combining unit 24B makes combinations of the same angles on the basis of the information of the tables shown in FIGS. 36A and 36B and outputs the combinations of the beat frequencies of the ascending region and the descending region to the distance detecting unit 25 and the velocity detecting unit 26.

The distance detecting unit 25 calculates the distance on the basis of the beat frequencies of the ascending region and the descending region in the combinations, similarly to the first embodiment.

The velocity detecting unit 26 calculates the relative velocity on the basis of the beat frequencies of the ascending region and the descending region in the combinations, similarly to the first embodiment.

Here, the distance detecting unit 25 and the velocity detecting unit 26 calculate the values of the distance and the relative velocity by combination of the ascending region and the descending region, since it is not necessary to perform the averaging and filter processes on the present detection cycle and the past detection cycle like the direction detection.

The target fixing unit 31B fixes the complex data of the ascending region and the descending region and the frequency point, the distance, the relative velocity, and the azimuth in the ascending region and the descending region as the present status.

The target link unit 32B stores the frequency points of the ascending region and the descending region and the complex data, the distance, the longitudinal position, the lateral position, and the relative velocity each of the ascending region and the descending region, which are input from the target fixing unit 31B, in the table shown in FIG. 35 for each target through the same processes as in the sixth and seventh embodiments.

Ninth Embodiment

An electronic scanning radar apparatus according to a ninth embodiment of the invention will be described below with reference to the accompanying drawings.

Figure 37:
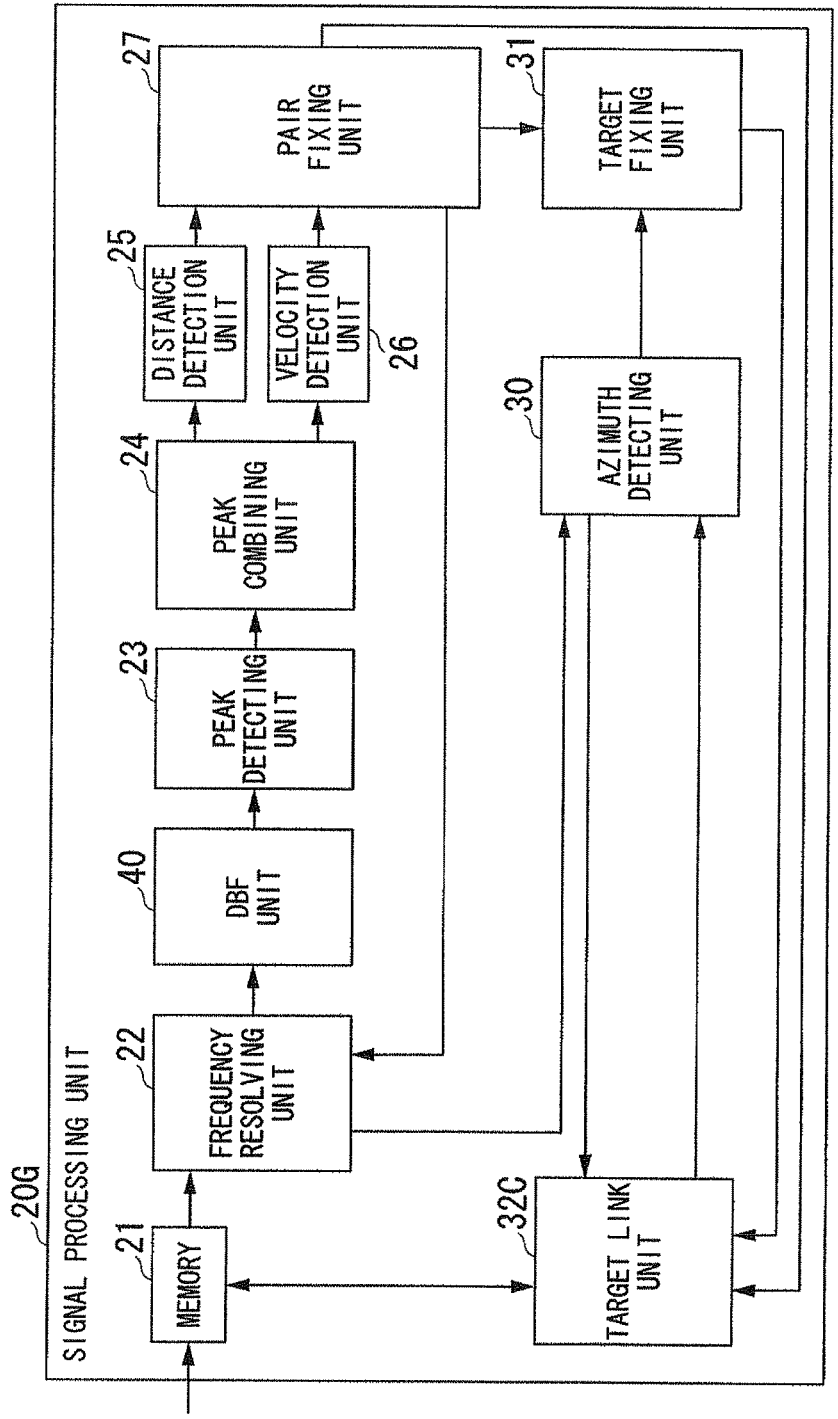
FIG. 37 is a block diagram illustrating the configuration of an electronic scanning radar apparatus according to a ninth embodiment of the invention.

FIG. 37 is a block diagram illustrating the configuration of the electronic scanning radar apparatus according to the ninth embodiment.

In the ninth embodiment, unlike the first embodiment, an azimuth estimating process is performed first using a DBF (Digital Beam Forming) with a resolution lower than that of the high-resolution algorithm such as the AR spectrum estimating process and then the azimuth estimating process using an averaged normal equation is performed using the high-resolution algorithm including the AR spectrum estimating process using the AR coefficient, unlike the first embodiment.

The same elements as the first embodiment shown in FIG. 1 will be referenced by the same reference signs and the following description will be centered on the differences from the first embodiment.

As shown in the drawing, this embodiment is different from the first embodiment, in that a DBF unit 40 is disposed between the frequency resolving unit 22 and the peak detecting unit 23 in the first embodiment shown in FIG. 1 and the azimuth in which the received wave arrives is estimated first using the DBF as described above.

Similarly to the sixth embodiment, the frequency resolving unit 22 resolves (time-axis Fourier transform) the input beat signals and outputs the frequency points indicating the beat frequencies and the complex data to the DBF unit 40.

The DBF unit 40 Fourier-transforms the complex data corresponding to each antenna in the arrangement direction of the antennas, that is, Fourier-transforms the complex data in a spatial axis.

The DBF unit 40 depends on the angle, that is, calculates spatial complex data for the angular channels corresponding to the angle resolution and outputs the calculated spatial complex data to the peak detecting unit 23 for each beat frequency.

Accordingly, the spectrum represented by the spatial complex data (in the unit of beat frequency) for each angular channel output from the DBF unit 40 depends on the DOA estimation of the received wave based on a beam scanning resolution.

Since the complex data is Fourier-transformed in the arrangement direction of the antennas, the same advantage as the configuration in which the complex data of the angular channels are added can be achieved and the complex data for each angular channel is improved in the S/N ratio, thereby enhancing the precision in detecting the peak values, similarly to the first embodiment.

The complex data and the spatial complex data are all calculated form the ascending region and the descending region, similarly to the sixth embodiment.

The peak detecting unit 23 detects a peak for each angular channel on the basis of the DBF result after the processing of the DBF unit 40, and outputs the detected peak values of the channels to the peak combining unit 24 for each angular channel. That is, in the case of the Fourier transform in the spatial axis with a 16 resolution, the number of angular channels is 15.

Similarly to the sixth embodiment, the peak combining unit 24 combines the peak values with the beat frequencies having the peak values in the ascending region and the descending region and outputs the combinations to the distance detecting unit 25 and the velocity detecting unit 26 for each angular channel.

The pair fixing unit 27 creates the table shown in FIG. 5 for each angular channel using the distance r and the relative velocity v sequentially input from the distance detecting unit 25 and the velocity detecting unit 26 and determines the combination of peaks of the ascending region and the descending region corresponding to each target for each angular channel, similarly to the first embodiment. Here, since the resolution of the DBF represents that a target is present over plural angular channels, the peaks of the ascending region and the descending region for each angular channel can be appropriately combined in consideration of the agreement with neighboring angular channels (matrices). The pair of the peaks of the ascending region and the descending region is fixed and the target group number indicating the fixed distance r and the fixed relative velocity v is output to the target fixing unit 31 to create the table shown in FIG. 38.

FIG. 38 is a diagram illustrating a table storing the fixed pairs of the peaks of the ascending region and the descending region.

Since the pair fixing unit 27 can acquire information of the angular channels for each target in addition to the distance r and the relative velocity v and can calculate the longitudinal position and the lateral position, the table, which is shown in FIG. 38, having the results corresponding to the target groups in the present detection cycle is created, in which the longitudinal positions and the lateral positions are included in the table shown in FIG. 6.

The target link unit 32C performs the process of linking the target in the present detection cycle to the target in the past detection cycle shown in FIG. 28 using the information of the table shown in FIG. 38. In addition, since the longitudinal position and the lateral position in addition to the distance, the relative velocity, and the peak frequency point are used as the linking parameters, it is possible to perform the linking process with higher precision.

The azimuth detecting unit 30 performs the processes of estimating the order of the normal equation and averaging the normal equation, which are described in the sixth and seventh embodiment.

By estimating the azimuth through the use of the AND logic based on the azimuth information from the azimuth detecting unit 30 and the azimuth information from the DBF unit, it is possible to improve the reliability in detecting a direction, to share the azimuth information, or to use the angle information of the DBF because the poor angle resolution does not cause a particular problem at a short distance.

Tenth Embodiment

An electronic scanning radar apparatus according to a tenth embodiment of the invention will be described below with reference to the accompanying drawings.

Figure 39:
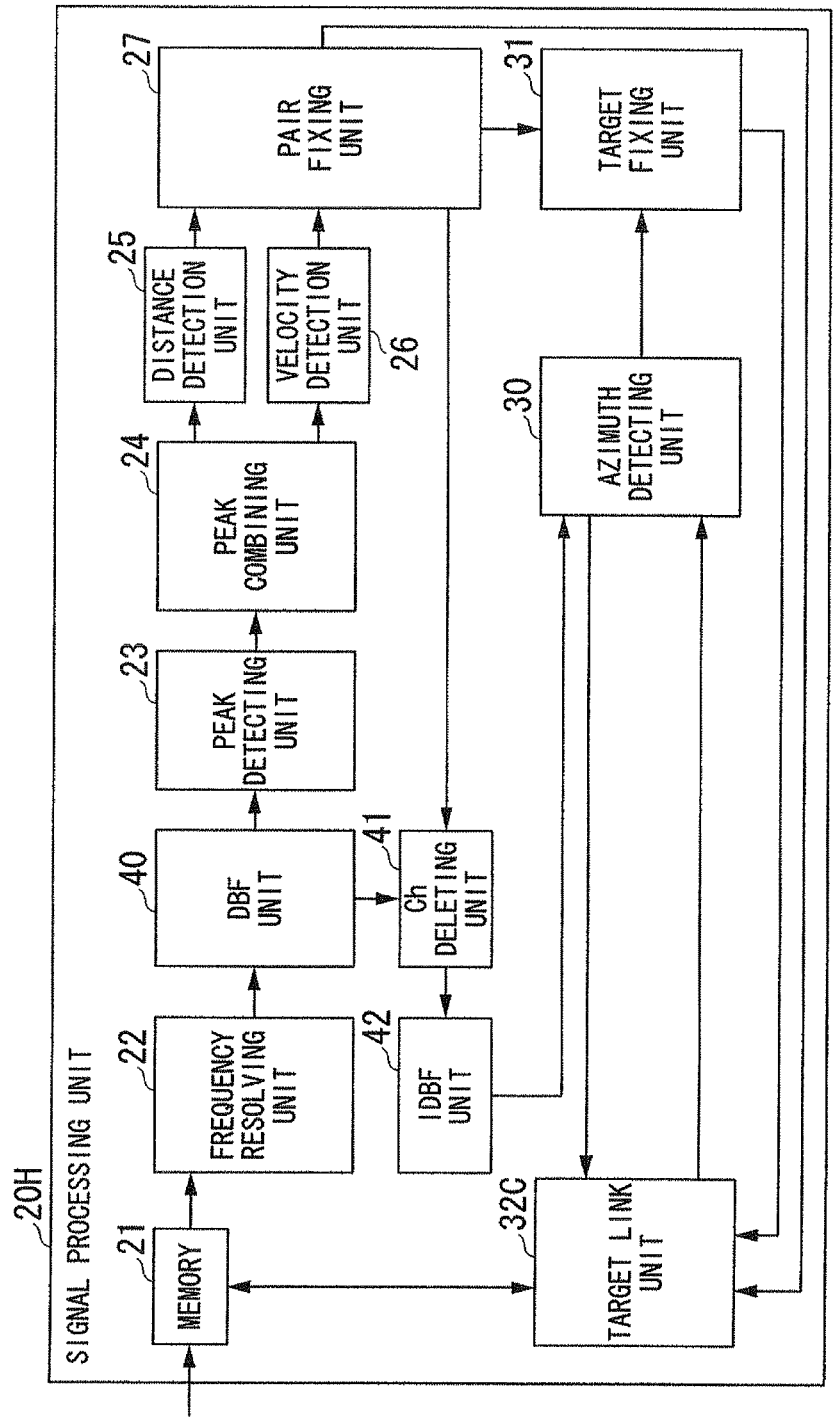
FIG. 39 is a block diagram illustrating the configuration of an electronic scanning radar apparatus according to a tenth embodiment of the invention.

FIG. 39 is a block diagram illustrating the configuration of the electronic scanning radar apparatus according to the tenth embodiment.

In the tenth embodiment, an azimuth estimating process is performed first using a DBF (Digital Beam Forming) with a resolution lower than that of the high-resolution algorithm such as the AR spectrum estimating process to narrow the angle range of the target and an IDBF (Inverse DBF, that is, the inverse Fourier transform in a spatial axis) is then performed to return the data to complex data in the frequency axis, whereby the precision of the azimuth estimation to be performed later using the high-resolution algorithm is improved, unlike the first embodiment. The same elements as the ninth embodiment shown in FIG. 37 will be referenced by the same reference signs and the following description will be centered on the differences from the fifth embodiment.

In the tenth embodiment, a channel (Ch) deleting unit 41 and an IDBF unit 42 are added to the configuration of the fifth embodiment.

The DBF unit 40 performs a spatial-axis Fourier transform, similarly to the ninth embodiment, and outputs spatial complex data to the peak detecting unit 23C and the Ch deleting unit 41.

Figure 40A:
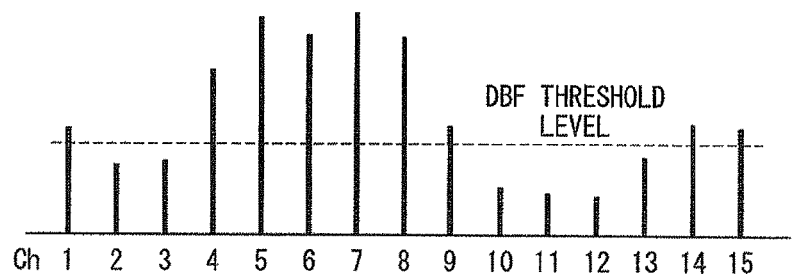
FIG. 40A is a conceptual diagram illustrating a spectrum intensity process in 15 angular channels as an example.

Here, DBF unit 40 performs the spatial-axis Fourier transform in the arrangement direction of the receiving antennas, for example, with a 16-point resolution in the tenth embodiment, as shown in FIG. 40A, generates a spectrum for each of 15 angular channels as a result, and outputs the generated spectra to the Ch deleting unit 41.

The Ch deleting unit 41 performs a process of detecting whether levels of the spectra of the spatial complex data corresponding to the peak frequency points (for example, the descending region) of the DBF target fixed by the pair fixing unit 27 are continuous within a predetermined angle range and is greater than the level of a predetermined DBF threshold and replacing the spectrum of the angular channel not greater than the DBF threshold with "0" and outputs the narrowed spatial complex data.

Figure 40B:
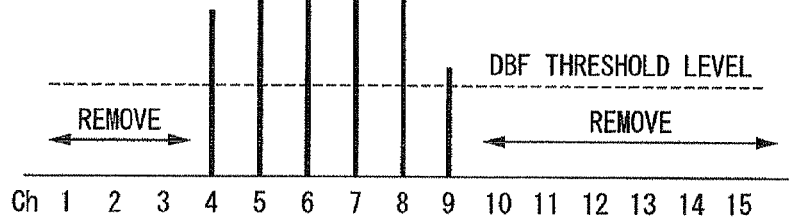
FIG. 40B is a conceptual diagram illustrating a spectrum intensity process in the angular channels shown in FIG. 40A.

In the above-mentioned process, for example, when four neighboring angular channels have a level continuously greater than the DBF threshold as shown in FIG. 40B, the Ch deleting unit 41 determines that one or more targets are present in the range, leaves the spectra of the angular channels, and replaces the intensities of the spectra of the other angular channels with "0".

The IDBF unit 42 narrows the spectra, that is, performs the inverse spatial-axis Fourier transform the spatial complex data in which only the data of the angular channels continuously greater than the DBF threshold value out of a predetermined number of angular channels are left and the intensities of the other angular channels are replaced with "0" on the replaced spatial complex data to return the spatial complex data to the complex data in the frequency axis and outputs the resultant complex data to the azimuth detecting unit 30.

Figure 40C:
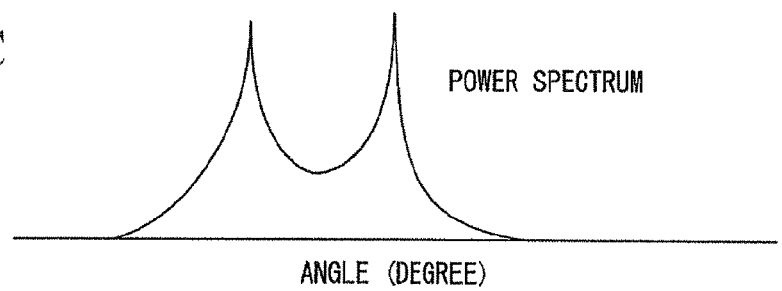
FIG. 40C is a conceptual diagram illustrating calculation of a power spectrum from the spectrum intensities in the angular channels shown in FIG. 40B.

In order to calculate a normal equation (or a correlation matrix) from the input complex data, the azimuth detecting unit 30 can calculate a normal equation (or a correlation matrix) from which the noise component is reduced by removing components of road-side objects. In FIG. 40C, the normal equation of a target group (referred to as a target group since two or more targets may be present in practice) with the DBF resolution shown in FIG. 40B is created using the above-mentioned method and the targets are further separated using a high-resolution algorithm.

Figure 41A:
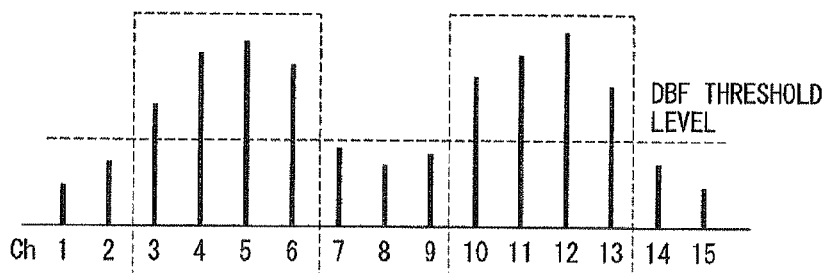
FIG. 41A is a conceptual diagram illustrating a spectrum intensity process in the angular channels.

As shown in FIG. 41A, when a received wave including reflected components from plural target groups is received, plural angular channels greater than the DBF threshold level out of the continuous angular channels are present in the spatial complex data output from the DBF unit 40.

Figure 41B:
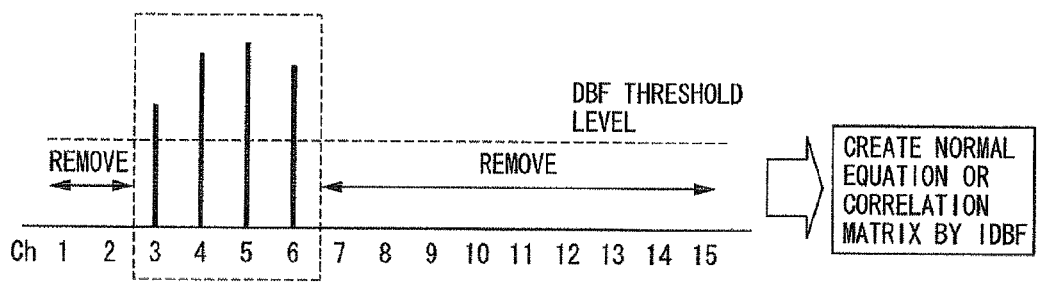
FIG. 41B is a conceptual diagram illustrating a spectrum intensity process in the angular channels.
Figure 41C:
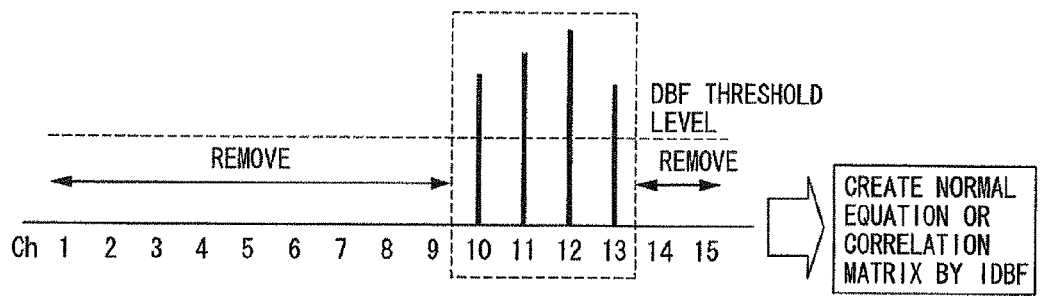
FIG. 41C is a conceptual diagram illustrating a spectrum intensity process in the angular channels.

The Ch deleting unit 41 extracts the angular channel regions, in which the levels of the spectra of the adjacent angular channels are continuously greater than the DBF threshold level in the predetermined angular channel range, from the input spatial complex data, replaces the intensities of the spectra other than the extracted angular channel regions with "0", and divides the input spatial complex data into other spatial complex data identified in the angular channel regions, as shown in FIGS. 41B and 41C.

Here, the pair fixing unit 27 calculates the distance, the relative velocity, the longitudinal position, and the lateral position, similarly to the fifth embodiment and outputs the calculated information to the Ch deleting unit 41 and the target link unit 32.

The Ch deleting unit 41 selects the spatial complex data corresponding to the frequency point of the DBF target, performs the above-mentioned Ch deletion thereon, and outputs the resultant spatial complex data to the IDBF unit 42.

The IDBF unit 42 performs the inverse spatial-axis Fourier transform on the input spatial complex data and outputs the acquired complex data in the frequency axis to the azimuth detecting unit 30.

The target link unit 32C extracts the complex data in the past detection cycle corresponding to the distance, the relative velocity, the longitudinal position, and the lateral position from the table stored in the memory 21 and shown in FIG. 28 and outputs the extracted complex data to the azimuth detecting unit 30.

By the above-mentioned processes, it is possible to narrow the detection direction range when calculating the spectra in the AR spectrum estimating process of the azimuth detecting unit 30 and to enhance the resolution, compared with the first to fifth embodiments.

By employing the above-mentioned configuration, it is like that the received waves divided with the reflected components of the target groups are virtually received in the normal equation used for the calculation of the AR coefficient in the azimuth detecting unit 30. Accordingly, for example, even when the received wave containing reflected components from more targets than the maximum order of the normal equation is received, the AR coefficient can be correctly calculated.

The azimuth detecting unit 30 performs the processes of estimating the order of the normal equation and averaging the normal equation, which are described in the sixth and seventh embodiments.

(Direction Estimation Characteristics in Embodiments)

The direction estimation characteristics of the electronic scanning radar apparatus according to the first to tenth embodiments will be described below.

FIGS. 42A and 42B and FIGS. 43A and 43B are diagrams illustrating the model order estimation characteristics and the azimuth estimation characteristics of the electronic scanning radar apparatus according to the embodiments.

FIG. 42A shows the order estimation result when the number of target vehicles is one.

The horizontal axis represents the distance to the target and the vertical axis represents the normalized eigenvalues. The graph shows the determination result of the normalized eigenvalues using two threshold values Th1 and Th2 depending on the distance to the target. Here, the plot of a region surrounded with dotted lines in the graph is stopped. This region means that the maximum eigenvalue is equal to or less than the threshold value and the order estimating process is cancelled.

When the number of target vehicles is one, it is possible to maintain the detection ability by performing the estimation with an estimated order of one or two. When a high-order (for example, order three) normal equation is used for a single target, an incorrect peak may be generated. As shown in the graph, the estimation is preferably performed with an estimated order of one or two.

FIG. 42B shows the order estimation result when the number of target vehicles is two.

The horizontal axis represents the distance to the target and the vertical axis represents the normalized eigenvalues. The graph shows the determination result of the normalized eigenvalues using two threshold values Th1 and Th2 depending on the distance to the target, similarly to FIG. 42A.

When the number of target vehicles is two, it is possible to maintain the detection ability by performing the estimation with an estimated order of two or three. When an order two or order three normal equation is used for two targets, the peaks can be separated and detected, thereby obtaining a good detection result.

Figure 43A:
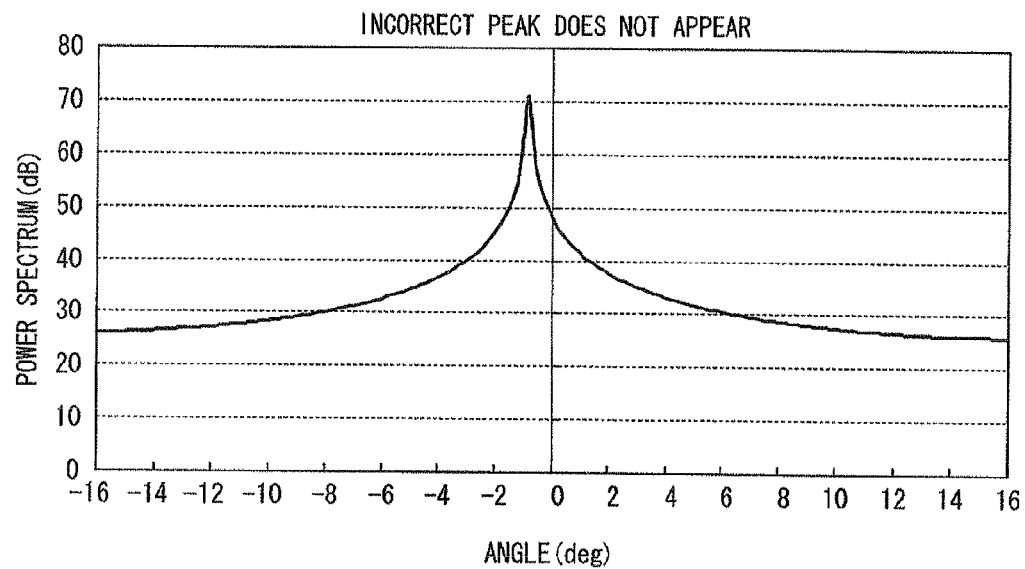
FIG. 43A is a diagram illustrating a direction estimation characteristic when an order estimation is performed in the electronic scanning radar apparatus according to the first to tenth embodiments.
Figure 43B:
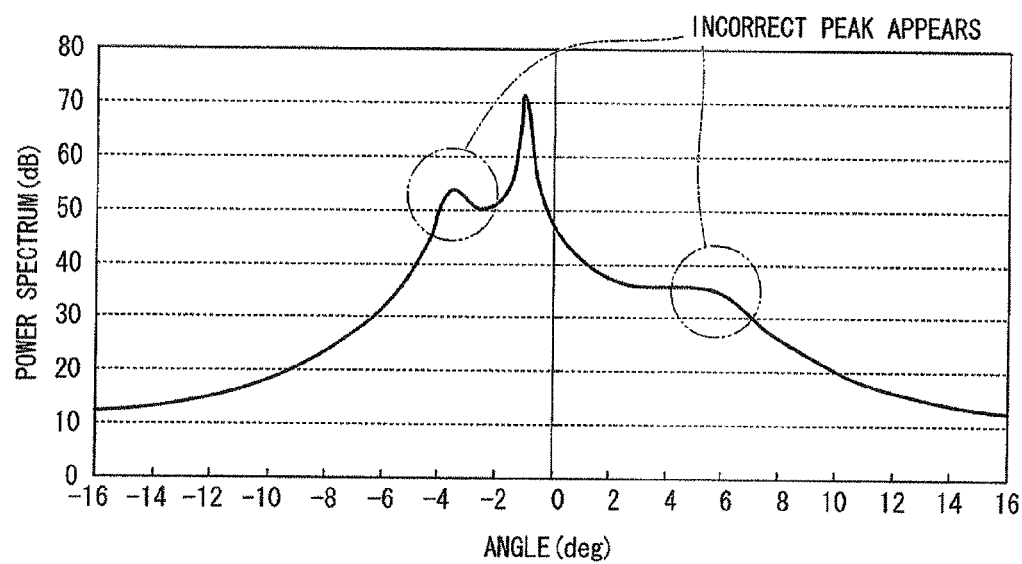
FIG. 43B is a diagram illustrating a direction estimation characteristic when an order estimation is not performed in the electronic scanning radar apparatus according to the first to tenth embodiments.

FIG. 43A shows a spectrum when a single vehicle is detected with an order of one using the order estimation according to the embodiments. FIG. 43B shows a spectrum when a single vehicle is detected with an order of three without using the order estimation according to the embodiments. In the example shown in FIG. 43B, incorrect peaks are detected. In the example shown in FIG. 43A, it is possible to obtain a good detection result without any incorrect peak.

In the electronic scanning radar apparatus according to the embodiments, it is possible to estimate the order of the computational expression (normal equation) used to perform the spectrum estimating process using a low-order method with a light computational load on the basis of the complex data of the detection beat frequency in the azimuth detecting unit 30. By performing the spectrum estimating process on the basis of the estimated order, it is possible to improve the detection precision.

According to the invention, by employing the first means, the correlation matrix of which the eigenvalues should be calculated is not newly created and includes elements of covariance functions using almost all the channels CHs. Accordingly, it is possible to calculate the eigenvalues with high precision. By employing the first or second means, since the covariance matrix or correlation matrix having the same order as the maximum detectable number of targets has only to be created, it is possible to calculate the eigenvalues with a light computational load using a relatively low order of matrix. For example, it is possible to calculate the eigenvalues with an order lower than the order of the correlation matrix created using the MUSIC method. This is because the calculation of a MUSIC spectrum in the subsequent step requires one or more white noise component vectors searching the orthogonality to a mode vector in addition to the same number of vectors as the maximum detectable number of targets. In the case of the MUSIC method, it is necessary to calculate an eigenvector in principle. However, in the method according to the invention, since it is not necessary to calculate an eigenvector (the spectrum is calculated using the AR spectrum estimating method), the eigenvalues can be calculated with a lighter computational load. That is, by employing the first and second means, it is possible to estimate the model order for estimating an AR spectrum with a relative light computational load using the calculation of eigenvalues.

When the first and second means are combined with the fifth means, the storage of the complex data with a small memory capacity can be coped with as a storage type.

Thanks to the third means, by determining the maximum eigenvalue or the total sum of all the eigenvalues (or the sum of diagonal elements of the original correlation matrix), it is possible to achieve a configuration in which no peak is detected in the previous step (for example, a case where the angle within the range of the overall distance points or any distance point is estimated in spectrum), or to determine whether the eigenvalues should calculated using different threshold values even after a peak is detected, and to estimate the order regardless of the distance to the target by normalizing the eigenvalues. By employing plural threshold values for the eigenvalues, it is possible to perform the set order estimation specific to an in-vehicle radar using the AR spectrum estimation.

Thanks to the fourth means, it is possible to calculate functions serving as the elements of a matrix and a vector flexibly on the basis of the determined order by actively using the feature that the processing load from the order determining step to the creation of the normal equation is markedly light.

By combination with the fifth means, the first, second, and fourth means can be adaptable as a storage type and the storage of the complex data with a small memory capacity can be coped with.

Thanks to the fifth means, it is possible to improve the precision of the covariance matrix or the correlation matrix used to calculate the eigenvalues in the previous stage and to improve the precision in calculating the AR coefficient in the subsequent stage.

It has been stated that the first to sixth embodiments are applied to the FMCW type radar, but the embodiments may be applied to other antennas of the FMCW type.

The invention can employ types such as a multi-frequency CW and a pulse radar other than the FMCW type.

In the above-mentioned embodiments, peaks of a power spectrum are calculated to calculate the number of targets and the azimuth. However, since the estimation can be performed using a spectrum created without multiplying the variance value of the input white noise thereby, it is possible to skip the calculation of the variance of the input white noise. The azimuth may be estimated at the pole by calculating a root of a high-order equation instead of a power spectrum.

A program for realizing the functions of the signal processing units 20A to 20H in FIGS. 1, 7, 14, 17, 19, 21, 24, 25, 31, 34, 37, and 39 may be recorded into a computer-readable recording medium and the program recorded in the recording medium may be read and executed by a computer apparatus, thereby performing the signal process of detecting an azimuth from a received wave. The "computer apparatus" includes an OS and hardware such as peripherals. The "computer apparatus" also includes a WWW system having a homepage provision environment (or display environment). The "computer-readable recording medium" include a portable medium such as a flexible disc, a magneto-optical disc, a ROM, or a CD-ROM and a storage device, such as a hard disk incorporated into a computer system. The "computer-readable recording medium" also includes a device temporarily storing a program, such as an internal volatile memory (RAM) of a computer system serving as a server or a client when the program is transmitted through a network such as the Internet or a communication link such as a telephone line.

The program may be transmitted from a computer system having the program stored in a storage device thereof or the like to another computer system through a transmission medium or by carrier waves in the transmission medium. The "transmission medium" which transmits a program means a medium having a function of transmitting information and examples thereof include a network (communication network) such as the Internet and a communication link (communication line) such as a telephone line. The program may realize some of the above-described functions. The program may realize the above-described functions in combination with a program already recorded in a computer system, that is, the program may be a differential file (differential program).

In the embodiments, for example, when it is determined in step S106 that the maximum eigenvalue is smaller than the predetermined threshold value, it is determined that the reliability of the acquired information (complex data) is low and the order estimating process of the next step is not performed on the corresponding target, thereby preventing incorrect information from being provided.

For example, even when the processes of estimating the order and estimating the azimuth in the subsequent steps, information of a target in the corresponding cycle is not detected, and the target is lost, it is possible to similarly maintain the lost information of the target by using the extrapolation method with tracking which is typically performed in the subsequent steps as a recognition process of the radar. According to this technique, since it is possible to prevent a target from being lost, the idea that it is more desirable to cancel the incorrect estimation than to output the incorrect azimuth detection result is preferable. The idea that the azimuth detection should not be cancelled as much as possible may be right in some cases. In this case, the order estimation in the subsequent step is not performed but the order can be forcibly allocated to an order of a predetermined value (for example, one of the maximum order and the minimum order). By performing the model order estimating process including the maximum eigenvalue determination, it is effective, for example, in the case where it is determined whether the targets of which the peak is detected should be additionally subjected to the azimuth detection for each target or in the configuration in which the peak should be detected. An example of the configuration in which the peak should not be detected is a process configuration in which the azimuth detection is unconditionally performed on the overall points or any distance point.

As described above, according to the invention, a receiving unit includes a plurality of antennas receiving a reflected wave arriving from a target having reflected a transmitted wave as a received wave. A beat signal generating unit generates beat signals from the transmitted wave and the received wave. A frequency resolving unit resolves the beat signals in beat frequencies having a predetermined frequency bandwidth and calculates complex data based on the resolved beat signals for each beat frequency. An azimuth calculating unit estimates an order of a normal equation used to calculate a DOA of the received wave on the basis of eigenvalues of a primary order matrix having complex data calculated from the beat signals as elements, creates a secondary order normal equation based on the estimated order, and calculates the DOA of the received wave on the basis of the created secondary order normal equation.

Accordingly, since the azimuth detecting unit uses the complex data of the detection beat frequency as a beat frequency at which the presence of a target is detected and the normal equation created on the basis of the complex data, calculates the DOA of the received wave on the basis of the normal equation, determines the order of the normal equation on the basis of the matrix created from the complex data, and calculates the DOA of the received wave on the basis of the determined order of normal equation, it is possible to provide an electronic scanning radar apparatus and a received wave direction estimating program which can detect the DOA of a received wave with high precision without lowering the detection precision.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electronic scanning apparatus mounted on a moving object, comprising:
a receiving unit configured to include a plurality of antennas receiving a reflected wave arriving from a target having reflected a transmitted wave as a received wave;
a beat signal generating unit configured to generate beat signals from the transmitted wave and the received wave;
a frequency resolving unit configured to resolve the beat signals in beat frequencies having a predetermined frequency bandwidth and calculate complex data based on the resolved beat signals for each beat frequency; and
an azimuth calculating unit configured to estimate an order of a normal equation used to calculate a DOA of the received wave on the basis of eigenvalues of a primary order matrix having complex data calculated from the beat signals as elements, create a secondary order normal equation based on the estimated order, and calculate the DOA of the received wave based on the created secondary order normal equation.

2. The electronic scanning radar apparatus according to claim 1, wherein the azimuth calculating unit calculates the DOA of the received wave based on the secondary order normal equation by the use of an AR spectrum estimating method using an autoregressive model.

3. The electronic scanning radar apparatus according to claim 1, wherein the azimuth calculating unit calculates the eigenvalues from the primary order matrix created on the basis of the complex data calculated on the basis of the beat signals.

4. The electronic scanning radar apparatus according to claim 1, wherein the azimuth calculating unit calculates the eigenvalues from a matrix as a constituent part of a primary order normal equation which has the same order as the highest order capable of being applied to the normal equation and which is the normal equation created on the basis of the complex data calculated on the base of the beat signals.

5. The electronic scanning radar apparatus according to claim 1, wherein the azimuth calculating unit determines a correlation matrix having the same order as the highest order capable of being applied to the secondary order of the normal equation to be the primary order matrix.

6. The electronic scanning radar apparatus according to claim 1, wherein the azimuth calculating unit calculates the eigenvalues from an averaged matrix obtained by averaging a plurality of the primary order matrices.

7. The electronic scanning radar apparatus according to claim 1, wherein the azimuth calculating unit calculates the eigenvalues from a matrix as a constituent part of an averaged normal equation obtained by averaging a plurality of the primary order normal equations.

8. The electronic scanning radar apparatus according to claim 6, wherein the azimuth calculating unit creates the averaged matrix used to calculate the eigenvalues from the complex data acquired in a present detection cycle of detection cycles in which a process of calculating the DOA of the received wave is repeatedly performed.

9. The electronic scanning radar apparatus according to claim 7, wherein the azimuth calculating unit creates the averaged normal equation used to calculate the eigenvalues from the complex data acquired in the present detection cycle of the detection cycles in which a process of calculating the DOA of the received wave is repeatedly performed.

10. The electronic scanning radar apparatus according to claim 1, wherein the azimuth calculating unit performs an unitary transform on the primary order matrix before calculating the eigenvalues.

11. The electronic scanning radar apparatus according to claim 1, wherein the azimuth calculating unit selects the secondary order on the basis of the values of the eigenvalues and creates the selected secondary order normal equation.

12. The electronic scanning radar apparatus according to claim 11, wherein the azimuth calculating unit creates a normal equation or an averaged normal equation which is the normal equation used to calculate the DOA of the received wave and which includes the primary order normal equation or the secondary order normal equation from the complex data acquired in the present detection cycle of the detection cycles in which a process of calculating the DOA of the received wave is repeatedly performed.

13. The electronic scanning radar apparatus according to claim 1, wherein the azimuth calculating unit normalizes the eigenvalues on the basis of the maximum value of the eigenvalues when a value calculated from the eigenvalues is equal to or greater than a predetermined threshold value.

14. The electronic scanning radar apparatus according to claim 13, wherein the value calculated from the eigenvalues is any one of the maximum value of the eigenvalues, the sum of all the eigenvalues in the present detection cycle of the detection cycles in which a process of calculating the DOA of the received wave is repeatedly performed, and the sum of diagonal elements of the primary order matrix.

15. The electronic scanning radar apparatus according to claim 13, wherein the azimuth calculating unit determines the normalized eigenvalues on the basis of a predetermined threshold value and selects the secondary order on the basis of the determination result.

16. The electronic scanning radar apparatus according to claim 1, wherein the azimuth calculating unit selects the secondary order on the basis of the results of determination of the value calculated from the eigenvalues using a plurality of threshold values.

17. The electronic scanning radar apparatus according to claim 1, wherein the azimuth calculating unit stops an order estimating process of the secondary order of a normal equation on the basis of the value of the primary order matrix.

18. The electronic scanning radar apparatus according to claim 17, wherein the azimuth calculating unit determines whether the order estimating process of the secondary order of a normal equation should be stopped on the basis of any one of the maximum value of the eigenvalues, the total sum of the eigenvalues, and the sum of diagonal elements of the primary order matrix.

19. The electronic scanning radar apparatus according to claim 17, wherein the azimuth calculating unit stops the process of calculating the DOA of the received wave when the order estimating process is stopped.

20. The electronic scanning radar apparatus according to claim 17, wherein the azimuth calculating unit forcibly designates the secondary order to a predetermined order when the order estimating process is stopped.

21. The electronic scanning radar apparatus according to claim 1, further comprising:
a storage unit configured to store the complex data based on the beat signals detected in a detection cycle in which a process of calculating the DOA of the received wave is repeatedly performed; and
a target link unit configured to link the target detected in a present detection cycle and a past detection cycle previous to the present detection cycle and store the complex data correlated with the linked target in the storage unit.

22. The electronic scanning radar apparatus according to claim 21, wherein the storage unit stores the distance from the linked target and the relative velocity of the linked target detected in the past detection cycle in correlation with the complex data, and
wherein the target link unit links a target in the present detection cycle to a target which is detected in the past detection cycle corresponding to the present detection cycle in time series and which corresponds to the target in the present detection cycle.

23. The electronic scanning radar apparatus according to claim 21, wherein when linking targets detected in the present detection cycle and the past detection cycle, the target link unit determines whether the targets detected in the present detection cycle and the past detection cycle correspond to each other on the basis of the determination result on whether the distance and the relative velocity acquired from the detection beat frequencies in the present detection cycle are included in a distance range and a relative velocity range calculated on the basis of the distance and the relative velocity acquired in the past detection cycle.

24. The electronic scanning radar apparatus according to claim 21, wherein the azimuth calculating unit creates an averaged matrix and an averaged normal equation used to calculate the eigenvalues so as to include the complex data acquired in the past detection cycle.

25. The electronic scanning radar apparatus according to claim 21, wherein the azimuth calculating unit creates an averaged normal equation which is a normal equation used to calculate the DOA of the received wave and which includes the primary order normal equation or the secondary order normal equation so as to include the complex data acquired in the past detection cycle.

26. The electronic scanning radar apparatus according to claim 1, further comprising a target detecting unit configured to detect peak values from intensity values of the beat frequencies to detect the presence of the target,
wherein the azimuth calculating unit calculates the DOA of the received wave on the basis of the complex data corresponding to the target of which the presence is detected by the target detecting unit.

27. The electronic scanning radar apparatus according to claim 21, further comprising a DBF unit configured to detect the presence and the azimuth of the target through the use of a digital beam forming process which enhances the receiving sensitivity in a desired direction to the received wave on the basis of the complex data,
wherein the target detecting unit detects the azimuth of the target on the basis of the digital beam forming process in the beat frequencies in the present detection cycle, and
wherein the target link unit links targets in the present and past detection cycles to each other on the basis of the distance, the relative velocity, and the azimuth.

28. The electronic scanning radar apparatus according to claim 27, wherein the DBF unit calculates spatial complex data indicating a spectrum intensity of each angular channel corresponding to the desired direction set on the basis of the digital beam forming process,
wherein the electronic scanning radar apparatus further comprises:
a channel deleting unit configured to recognize the presence of a target when the spectrum intensities of the adjacent angular channels are greater than a predetermined DBF threshold value in a predetermined width range of the angular channels, replace the spectrum intensity of an angular channel in which the presence of a target is not detected with "0", and output new spatial complex data; and
an IDBF unit configured to create reproduced complex data by performing an inverse DBF process on the new spatial complex data, and
wherein the normal equation creating unit creates the normal equation from the reproduced complex data.

29. The electronic scanning radar apparatus according to claim 28, wherein the channel deleting unit recognizes the target of which the presence is recognized as a DBF detection target and divides the spectrum for each of the angular channels corresponding to a plurality of the DBF detection targets and creates the spatial complex data corresponding to the number of DBF detection targets when the plurality of DBF detection targets are detected,
wherein the IDBF unit creates reproduced complex data for each DBF detection target by performing the inverse DBF process on the spatial complex data for each DBF detection target, and
wherein the normal equation creating unit calculates the normal equation for each DBF detection target on the basis of the reproduced complex data for each DBF detection target.

30. A received wave direction estimating method using an electronic scanning radar apparatus mounted on a moving object, comprising:
- a receiving step of causing a receiving unit to receive a reflected wave arriving from a target having reflected a transmitted wave as a received wave through the use of a plurality of antennas;
- a beat signal generating step of causing a beat signal generating unit to generate beat signals from the transmitted wave and the received wave;
- a frequency resolving step of causing a frequency resolving unit to resolve the beat signals in beat frequencies having a predetermined frequency bandwidth and to calculate complex data based on the resolved beat signals for each beat frequency; and
- an azimuth detecting step of causing an azimuth calculating unit to estimate an order of a normal equation used to calculate a DOA of the received wave on the basis of eigenvalues of a primary order matrix having complex data calculated from the beat signals as elements, to create a secondary order normal equation based on the estimated order, and to calculate the DOA of the received wave on the basis of the created secondary order normal equation.

31. A program causing a computer to control a received wave direction estimating procedure using an electronic scanning radar apparatus mounted on a moving object, the received wave direction estimating procedure comprising:
- a receiving process of receiving a reflected wave arriving from a target having reflected a transmitted wave as a received wave through the use of a plurality of antennas;
- a beat signal generating process of generating beat signals from the transmitted wave and the received wave;
- a frequency resolving process of frequency-resolving the beat signals in beat frequencies having a predetermined frequency bandwidth and calculating complex data based on the resolved beat signals for each beat frequency; and
- an azimuth detecting order estimating process of a normal equation used to calculate a DOA of the received wave on the basis of eigenvalues of a primary order matrix having complex data calculated from the beat signals as elements, creating a secondary order normal equation based on the estimated order, and calculating the DOA of the received wave on the basis of the created secondary order normal equation.

* * * * *